(12) United States Patent
Miyamoto et al.

(10) Patent No.: US 7,916,471 B2
(45) Date of Patent: Mar. 29, 2011

(54) STORAGE DEVICE

(75) Inventors: Kenichi Miyamoto, Odawara (JP); Shinichi Nishiyama, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 195 days.

(21) Appl. No.: 12/273,694

(22) Filed: Nov. 19, 2008

(65) Prior Publication Data
US 2010/0053879 A1   Mar. 4, 2010

(30) Foreign Application Priority Data

Sep. 1, 2008   (JP) .................... 2008-224145

(51) Int. Cl.
*H05K 7/20* (2006.01)
*G06F 1/16* (2006.01)

(52) U.S. Cl. ........... 361/679.5; 361/679.31; 361/679.48; 361/679.49; 361/694; 361/695

(58) Field of Classification Search ............. 361/679.31, 361/679.48, 679.49, 679.5, 694, 695
See application file for complete search history.

(56) References Cited

U.S. PATENT DOCUMENTS

| | | | | | |
|---|---|---|---|---|---|
| 5,854,738 | A  * | 12/1998 | Bowler | ................. | 361/695 |
| 5,973,921 | A  * | 10/1999 | Lin | ................. | 361/695 |
| 6,269,001 | B1 * | 7/2001 | Matteson et al. | ............. | 361/695 |
| 6,775,139 | B2 * | 8/2004 | Hsueh | ................. | 361/697 |
| 6,876,549 | B2 * | 4/2005 | Beitelmal et al. | ............. | 361/692 |
| 6,888,725 | B2 * | 5/2005 | Kubo et al. | ................. | 361/719 |
| 6,961,242 | B2 * | 11/2005 | Espinoza-Ibarra et al. | ... | 361/695 |
| 7,012,807 | B2 * | 3/2006 | Chu et al. | ................. | 361/699 |
| 7,016,191 | B2 * | 3/2006 | Miyamoto et al. | ....... | 361/679.33 |
| 7,043,739 | B2 * | 5/2006 | Nishiyama et al. | ......... | 720/600 |
| 7,054,155 | B1 * | 5/2006 | Mease et al. | ................. | 361/695 |
| 7,236,361 | B2 * | 6/2007 | Cote et al. | ................. | 361/695 |
| 7,580,259 | B2 * | 8/2009 | Hsiao | ................. | 361/695 |
| 2003/0223193 | A1 * | 12/2003 | Smith et al. | ................. | 361/687 |
| 2004/0130868 | A1 * | 7/2004 | Schwartz et al. | ............. | 361/687 |
| 2007/0006239 | A1 | 1/2007 | Kasahara et al. | | |
| 2007/0274039 | A1 * | 11/2007 | Hamlin | ................. | 361/695 |
| 2008/0043426 | A1 | 2/2008 | Nishiyama et al. | | |
| 2008/0180903 | A1 * | 7/2008 | Bisson et al. | ................. | 361/687 |
| 2009/0109619 | A1 * | 4/2009 | Wise et al. | ................. | 361/695 |

FOREIGN PATENT DOCUMENTS

| | | | |
|---|---|---|---|
| EP | 1793384 A2 * | 6/2007 | |
| JP | 10268979 A * | 10/1998 | |
| JP | 2007-11931 | 1/2007 | |
| JP | 2008-47249 | 2/2008 | |

* cited by examiner

*Primary Examiner* — Anatoly Vortman
(74) *Attorney, Agent, or Firm* — Brundidge & Stanger, P.C.

(57) ABSTRACT

In a storage device accommodating a plurality of memory devices in a general-purpose chassis provided from both surface sides thereof, a cooling device is provided on the front of the memory devices. This cooling device is allowed to freely move to leave available the area in front of the memory devices, thereby enabling maintenance and replacement of the memory devices from the both surface sides of the chassis. With such a storage device of a type using a general-purpose chassis, and inserting therein a plurality of memory devices from the both surface sides thereof, even if a cooling device is located on the front of the chassis, the memory devices can be subjected to maintenance and replacement.

16 Claims, 45 Drawing Sheets

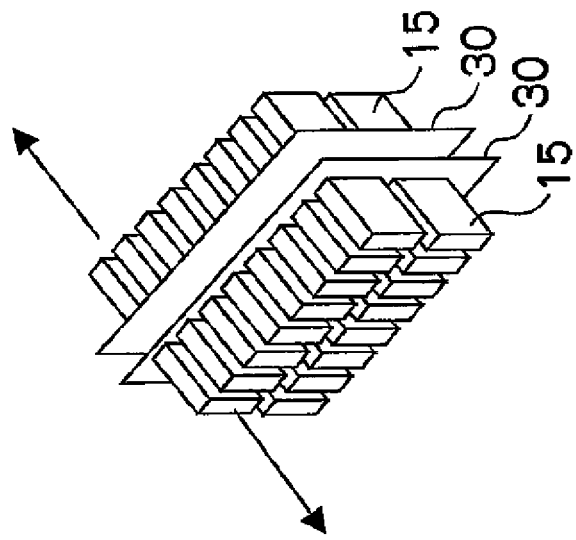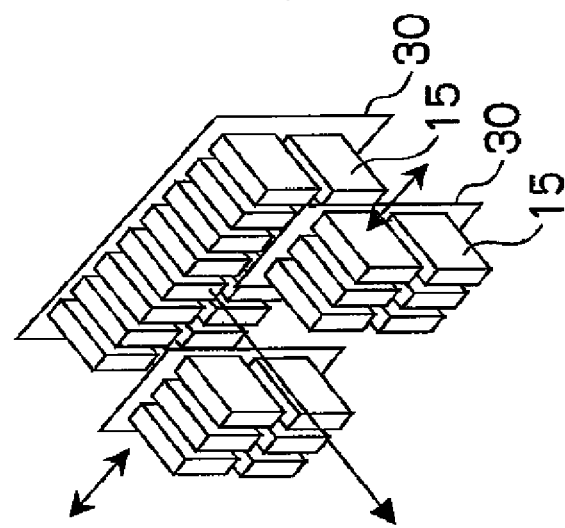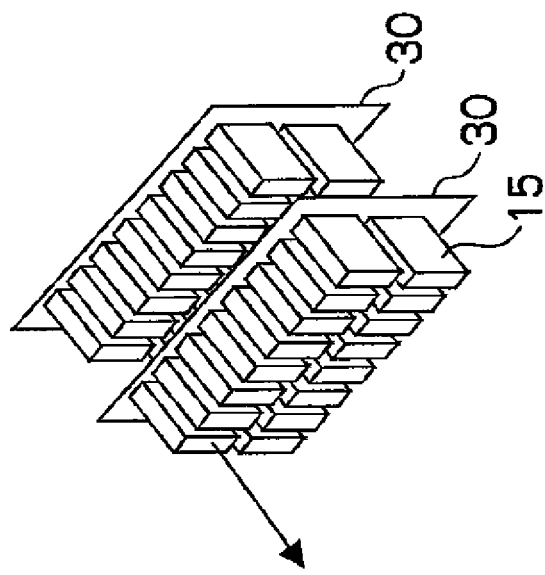

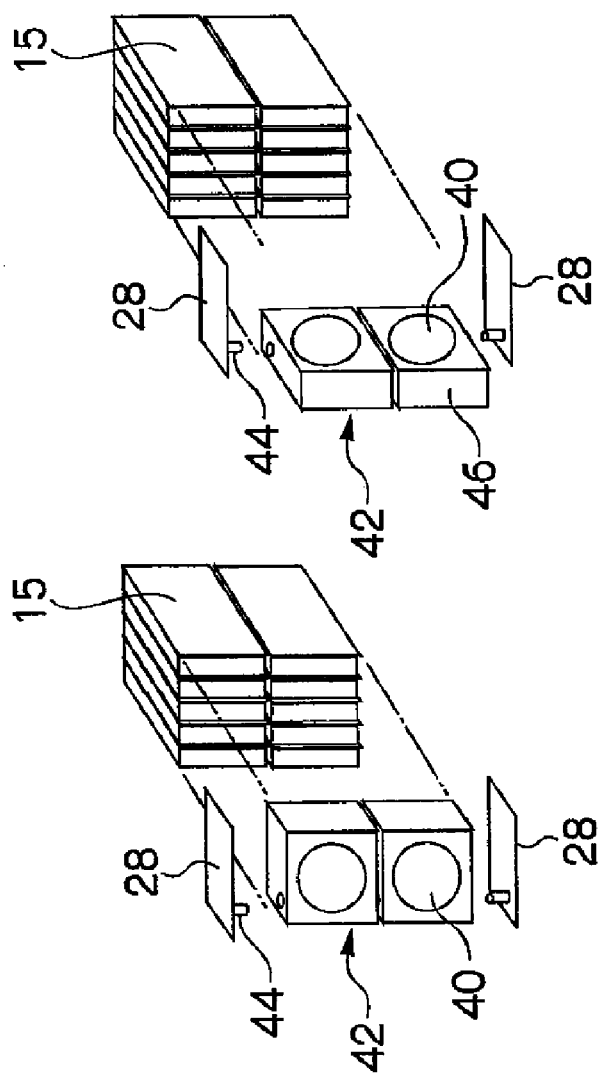
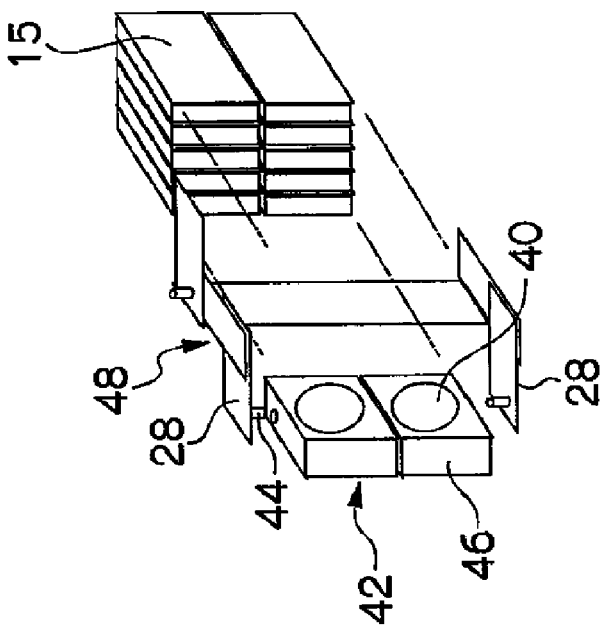

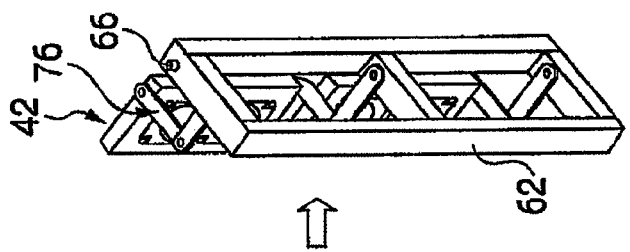
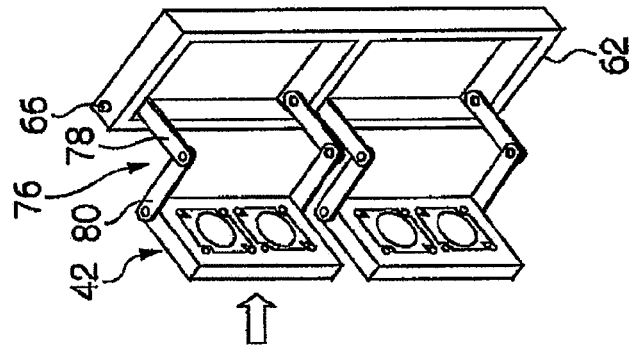
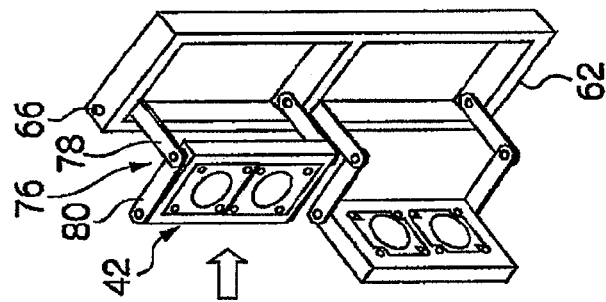
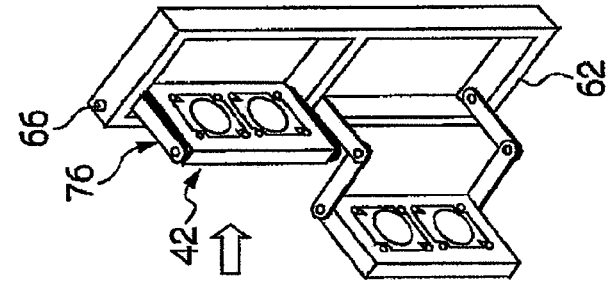
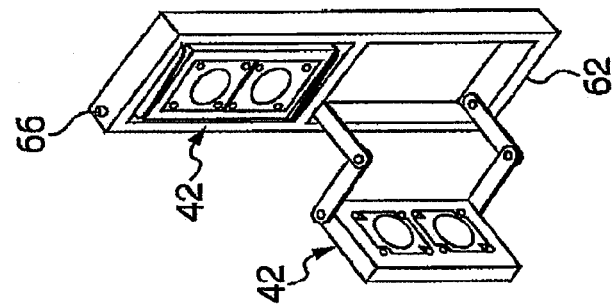

FIG. 15

| RAID GROUP No. | HDD No. |
|---|---|
| RAID-1 | D01 D02 D03 D04 |
| RAID-2 | D05 D06 D07 D08 |
| RAID-3 | D09 D10 D11 D12 |
| . | . |
| . | . |
| . | . |
| RAID-20 | D77 D78 D79 D80 |

FIG. 17

| FAN No. | HDD No. |
|---|---|
| F-1 | D01 D05 D09 D13 D17 |
| F-2 | D21 D25 D29 D33 D37 |
| F-3 | D41 D45 D49 D53 D57 |
| . | . |
| . | . |
| . | . |
| F-16 | D64 D68 D72 D76 D80 |

FIG. 18

| 1P (PARITY) -HDD | 3D (DATA) -HDD | CLOSED HDD No. | STOPPED FAN No. |
|---|---|---|---|
| D01 | D02 D03 D04 | D01 | F1 |
| | | D02 | F5 |
| | | D03 | F9 |
| | | D04 | F13 |
| D05 | D06 D07 D08 | D05 | F1 |
| | | D06 | F5 |
| | | D07 | F9 |
| | | D08 | F13 |
| . | . | . | . |
| . | . | . | . |
| . | . | . | . |
| D77 | D78 D79 D80 | D77 | F4 |
| | | D78 | F8 |
| | | D79 | F12 |
| | | D80 | F16 |

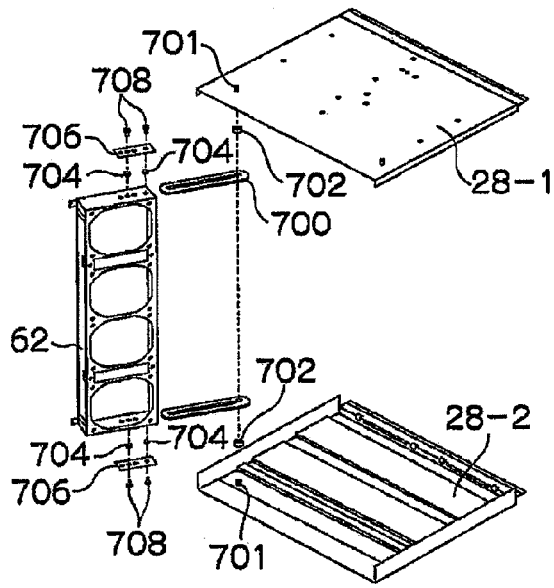
FIG. 25A
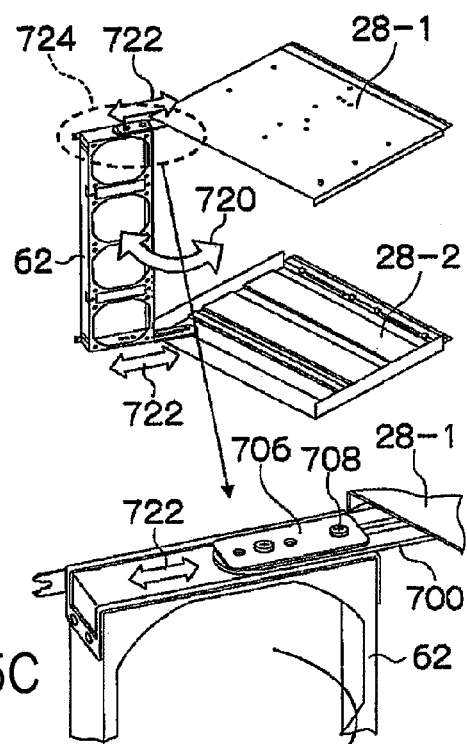
FIG. 25B
FIG. 25C
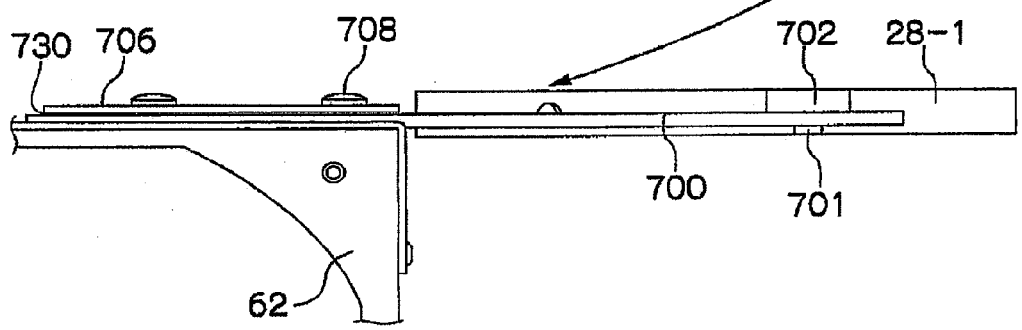
FIG. 25D

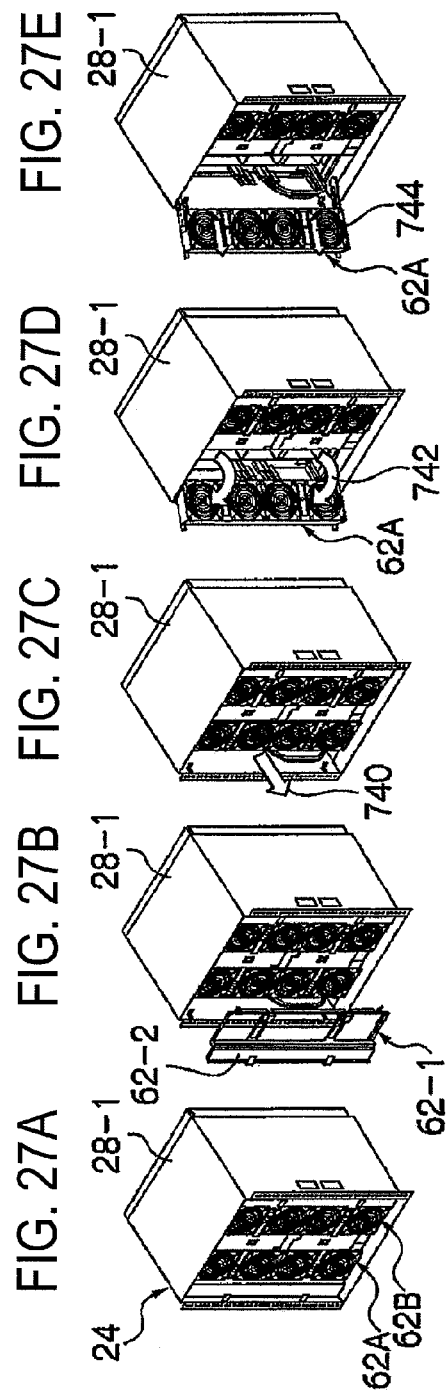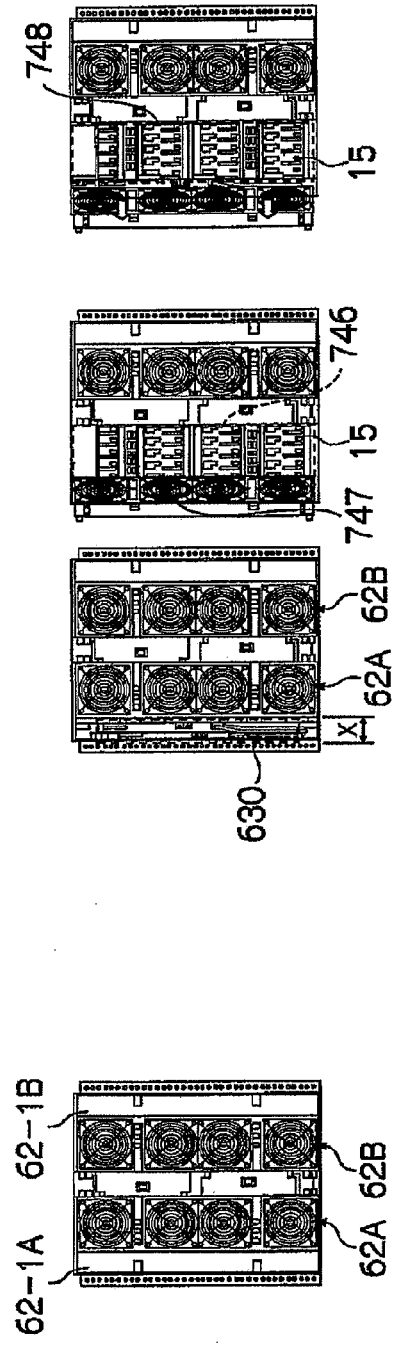

STORAGE DEVICE

CROSS REFERENCES TO RELATED APPLICATIONS

This application relates to and claims priority from Japanese Patent Application No. 2008-224145, filed on Sep. 1, 2008, the entire disclosure of which is incorporated herein by reference.

BACKGROUND OF THE INVENTION

1. Field of the Invention

The present invention relates to storage devices and, more specifically, to a storage device that carries a general-purpose chassis including a plurality of hard disk drives provided thereinto from both surface sides thereof.

2. Description of the Related Art

A system handling a large amount of data like a big data center or others performs data management using a host computer and a storage device. The storage device carries therein a plurality of hard disk drives arranged in an array, and manages these hard disk drives by RAID (Redundant Array of Independent Disks), thereby protecting data.

In relation to the increasing amount of data for handling, the number of hard disk drives for mounting in the storage device is also increasing. As an example, Patent Document 1 (JP-A-2008-47249) describes a storage device in which a plurality of hard disk drives are mounted in a chassis provided specifically therefor.

With the storage device of such a type, the hard disk drives are cooled during a process of flowing air provided from the outside into the chassis over an air-flow path formed inside of the chassis, and the air is exhausted from a fan unit disposed on the upper surface of the chassis.

Patent Document 2 (JP-A-2007-11931) also describes a storage device of a type including a general-purpose rack as an alternative to a specifically-provided chassis, and to the rack, a user sequentially adds a module mounted with a hard disk drive.

The problem with such a storage device utilizing the general-purpose chassis is that a fan for air exhaustion use cannot be disposed on the upper surface of the rack, and the rack cannot be formed therein with an air-flow path. The storage device is thus so configured that a hard disk drive is combined with a power supply and a fan, and the resulting module is accommodated in the rack.

The module is provided into the rack in such a manner that the hard disk drive is facing the front of the rack. The air is sucked from the front of the module into the rack, and is exhausted from the rear of the module.

SUMMARY OF THE INVENTION

Even with such a storage device using a chassis of a general-purpose rack type, with the increasing amount of data for handling, the number of hard disk drives will be increased for mounting in the chassis. If the hard disk drives are to be piled up one by one in the chassis, for increasing the packing density of the hard disk drives, the general-purpose chassis has to be large in size so as to be able to accommodate therein the hard disk drives in the height direction thereof.

Instead of piling up the hard disk drives as such for increasing the packing density thereof, it is preferable to insert the hard disk drives into the general-purpose chassis from both front and rear surface sides of the chassis.

The issue here is that mounting a previous modular unit into a chassis from both surface sides thereof is difficult due to the large size of the modular unit. In consideration thereof, a fan may not be combined in the modular unit but disposed at least one surface side of the chassis, and may cool hard disk drives disposed in the chassis from the both surface sides thereof.

If the fan is disposed on the front of the chassis, however, the fan may become an obstacle for an operator of the storage device to perform maintenance and replacement on the hard disk drives in the chassis.

Another problem is that the cooling performance is not high enough for the hard disk drives located on the rear surface side of the chassis. This is because the air passing therethrough is high in temperature as have been passed through the hard disk drives on the front surface side of the chassis.

Due to the reasons as such, in the storage device of a type using a general-purpose chassis, the hard disk drives have not been provided into the chassis from the both surface sides thereof.

In consideration thereof, an object of the invention is to enable, in a storage device in which memory devices are provided into a general-purpose chassis from both surface sides thereof, maintenance and replacement of the memory devices even if a cooling device is located on the front of the chassis.

Another object of the invention is to provide a storage device offering satisfactory cooling performance with respect to memory devices provided into a chassis from both surface sides thereof.

Still another object of the invention is to enable, in a storage device in which memory devices are provided into a general-purpose chassis from both surface sides thereof and a cooling device is disposed to oppose the chassis, drive control over the cooling device at the time of maintenance thereof.

An aspect of the invention is directed to enable, in a storage device in which memory devices are provided into a general-purpose chassis from both surface sides thereof and a cooling device is provided on the front of the memory devices, maintenance and replacement of the memory devices from the both surface sides of the chassis by configuring the cooling device to be able to move to leave the front area of the memory devices available for use.

Another aspect of the invention is directed to lead, in a storage device in which memory devices are provided into a general-purpose chassis from both surface sides thereof, outside air guided into the chassis to the memory devices facing the rear surface side of the chassis without passing through the memory devices facing the front surface side of the chassis.

According to the aspects of the invention, in a storage device of a type using a general-purpose chassis, and providing memory devices from both side surfaces thereof, even if a cooling device is located on the front of the chassis, the memory devices can be ready for maintenance and replacement.

Further, according to the aspects of the invention, the storage device provided thereby can offer satisfactory cooling performance to the memory devices in the chassis provided from the both side surfaces thereof.

Still further, according to the aspects of the invention, in the storage device in which the memory devices are provided in the general-purpose chassis from both side surfaces thereof, even if the cooling device is disposed opposing the chassis, the cooling device can be controllably driven at the time of maintenance thereof.

BRIEF DESCRIPTION OF THE DRAWINGS

FIGS. 3A to 3C are each a general perspective view showing an exemplary layout of a plurality of hard disk drives in the modular unit.

FIGS. 4A to 4C are perspective views showing how a cooling device is rotated in front of the modular unit;

FIGS. 7A to 7E are perspective views showing how the cooling device is rotated in front of the modular unit;

FIG. 15 is a management table for the RAID groups;

FIG. 17 is a management table showing the correlation between the fans and the hard disk drives;

FIG. 18 is a management table for use to identify the hard disk drives configuring any specific RAID group, and a fan supposed to be stopped in operation when any of the hard disk drives is closed in the RAID group;

FIGS. 25A to 25D are perspective views and others of a fan unit for illustrating any other embodiment for moving the fan unit away from the modular unit at the time of maintenance check, and including a mechanism of sliding the fan unit with respect to the modular unit;

FIGS. 27A to 27I are perspective views of the cooling device and the modular unit, showing the operation of the moving mechanism of the cooling device of FIG. 25A;

FIG. 31A is an overall perspective view of a pair of modular units opposing each other in a general-purpose chassis, FIG. 31B is a general plan view of an area enclosed by a line II of FIG. 31A, and FIG. 31C is a general plan view of an area enclosed by a line III of FIG. 31A;

FIG. 32A is a plan view of the fan box (unit cover) being not opened, and FIG. 32B is a plan view of the fan box being opened;

DESCRIPTION OF THE PREFERRED EMBODIMENT

Figure 1:
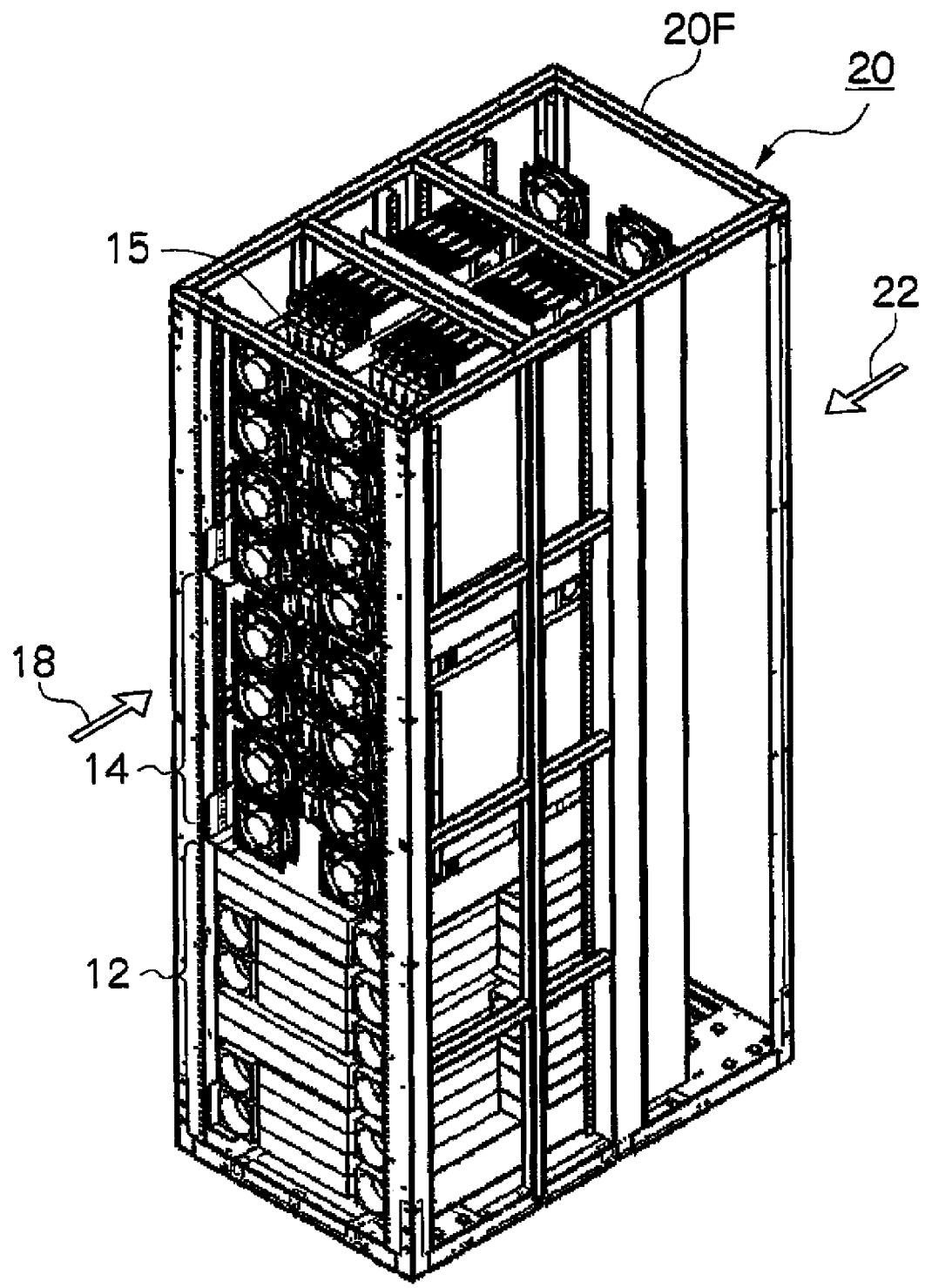
FIG. 1 is a perspective view of a storage device in its entirety in an embodiment of the invention.

Described next is an embodiment of the invention by referring to the accompanying drawings. FIG. 1 is a perspective view of a storage device 10 in its entirety. The storage device is provided with a general-purpose chassis (rack) 20 of the configuration of a frame 20F, which is entirely shaped like a rectangle, i.e., rack-mount. The chassis 20 is to be disposed on the floor surface in an office or others, and is configured like a rectangular parallelepiped with a height of about the average height of people. Herein, the rack is a generic name of storage equipment configured by columns and shelves for industrial commodity.

The chassis 20 has therein a space for a user to mount, to the frame, a memory unit and a control unit configured by a plurality of hard disk drives. The control unit (DKC: Disk Control) 12 processes an IO (Input/Output) request coming from a host computer, and executes a request for data writing or reading to/from a unit including a plurality of hard disk drives each being a memory device, i.e., DKU: Disk Unit.

In the lower portion of the chassis 20, the DKC 12 is loaded. In the upper half portion of the chassis, there is a unit of the hard disk drives, i.e., DKU. The DKU is configured by a plurality of modular units 14, where the modular units 14 are sequentially loaded by the user into the space located above the DKC on the rack.

The modular unit 14 is provided with a plurality of hard disk drives 15. The modular unit 14 is mounted in the rack from the front surface side of the rack 20 as indicated by arrow 18, and from the rear surface side thereof as indicated by arrow 22.

Figure 2:
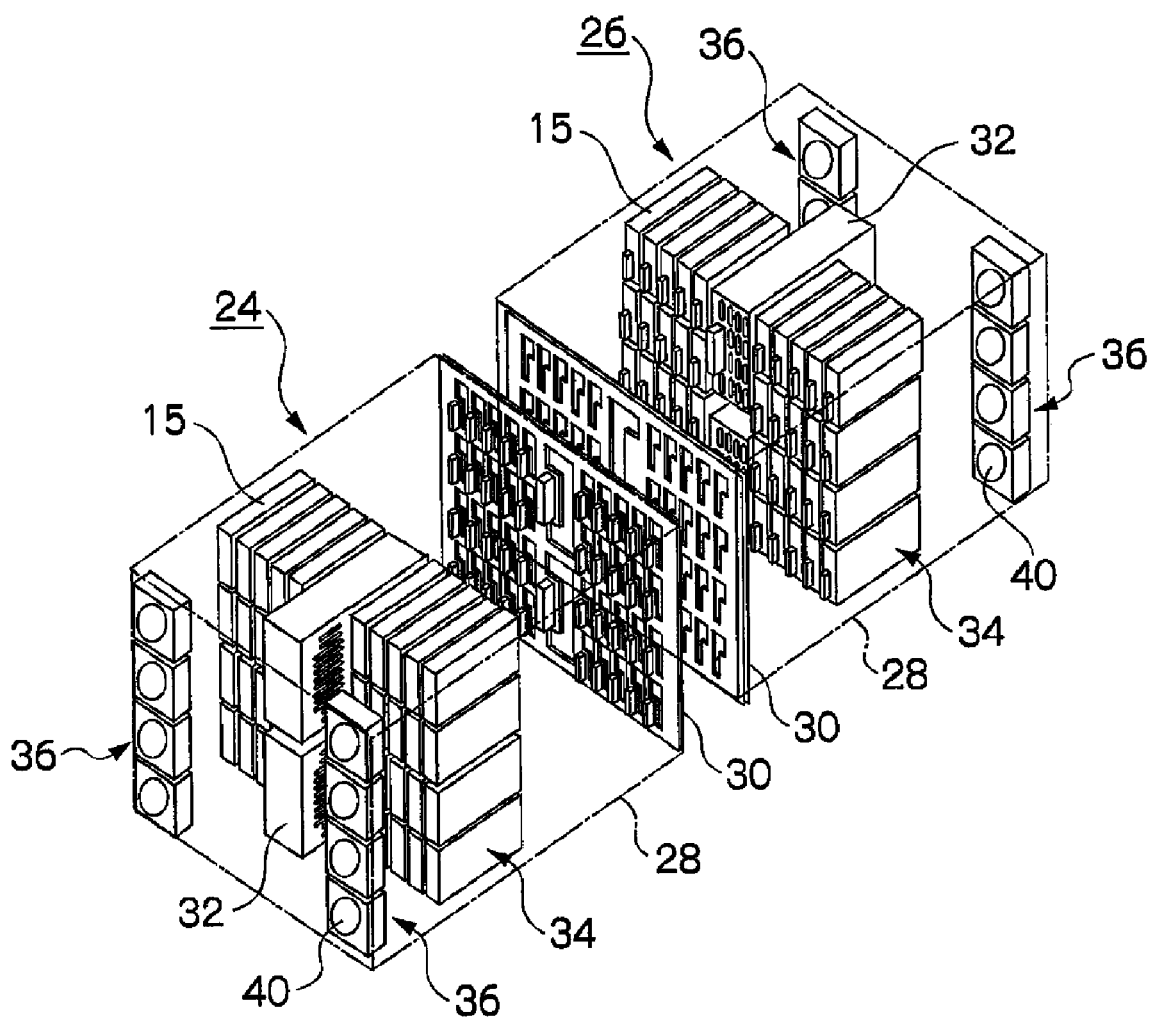
FIG. 2 is an exploded perspective view of a modular unit including hard disk drives.

FIG. 2 is an exploded perspective view of the modular unit including the hard disk drives. FIG. 2 shows a pair of opposing modular units 24 and 26 that are respectively inserted into the space in the chassis 10 from the front and rear surface sides thereof, and are mounted into the frame from the front and rear surface sides thereof. The modular unit denoted by the reference numeral 24 has the same configuration as the modular unit denoted by the reference numeral 26.

Figure 20:
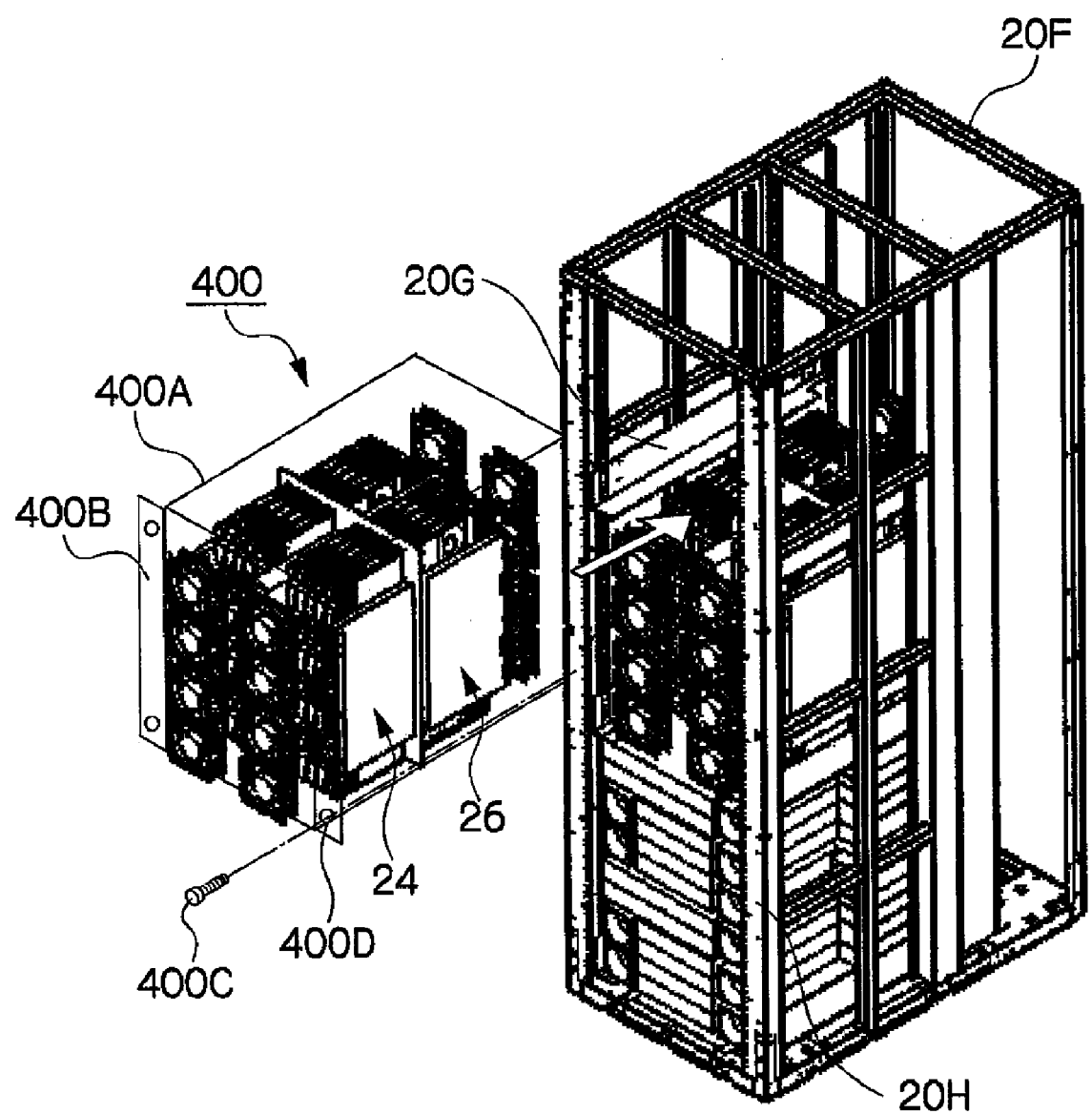
FIG. 20 is a perspective view showing how a modular configuration is accommodated inside of the chassis.

As shown in FIG. 20, the pair of modular units 24 and 26 configures a modular configuration 400 together with a casing 400A accommodating therein the modular units 24 and 26. The modular configuration 400 is inserted into a frame 20F (i.e., the chassis) as indicated by an arrow. This modular configuration 400 is disposed on a pair of right and left guides 20G that is positioned in the fore and aft direction of the chassis. A flange 400B of the modular configuration 400 is fixed to a frame body 20H on the front of the chassis of the frame body 20H by a screw 400C. The screw 400C is inserted into a screw hole 400D on the flange 400B and is screwed to the frame body 20H. As for the casing 400A, the front and rear surfaces not including the fan unit (will be described later) are left open, and the pair of modular units is exposed from these open surfaces.

As shown in FIG. 2, the modular units denoted by the reference numerals 24 and 26 are each provided with a box-shaped chassis (casing), including a platter (backboard) 30, a power supply unit 32, a memory unit 34 configured by a plurality of hard disk drives 15, and a cooling device 36. The box-shaped chassis is indicated by alternate long and short dashed lines 28.

The platter 30 is of a circuit configuration and has a circuit pattern for a power supply from the power supply unit 32 to the memory unit 34 and the cooling device 36. The platter 30 is located at the back, i.e., inside, of a chassis 28, and is connected with the power supply unit 32 and the hard disk drives 15. In FIG. 2, for convenience, the hard disk drives 15 and the power supply unit 32 are disposed away from the platter 30.

The power supply unit 32 is located at a position corresponding to the center of the platter 30. The power supply unit 32 is provided in a pair to each of the modular units 24 and 26 with one on the other in the vertical direction, i.e., is of a redundant configuration with which even when one of the power supply units is out of order, the remaining power supply unit takes charge of making a power supply to the hard disk drives 15 and the cooling device 36.

In the modular units 24 and 26, a plurality of hard disk drives 15 are arranged in two groups at regular intervals in the vertical and lateral directions with a pair of power supply units sandwiched between each of the two groups. These hard disk drives 15 are each connected to the platter 30. As shown in FIG. 2, the hard disk drives 15 are disposed vertically with respect to the chassis 28 of limited capacity, i.e., in the height direction of the chassis 28. With such a layout, compared with a layout with the hard disk drives disposed in the width direction of the chassis, i.e., disposed laterally, a larger number of hard disk drives can be accommodated in the chassis 28.

The modular unit 24 of FIG. 2 is mounted into the space in the chassis 20 of FIG. 1 from the front surface side thereof, i.e., in the direction of an arrow 18. The modular unit 26 is mounted into the space in the chassis 20 from the rear surface side thereof, i.e., in the direction of an arrow 22.

The modular units 24 and 26 are loaded into the chassis 10 by piling one on the other in the height direction of the chassis. Note that FIG. 1 is not showing the chassis for convenience.

On both sides on the front of the chassis, the cooling device 36 described above is provided integrally with or separately from the chassis. Alternatively, the cooling device may be attached to a general-purpose chassis or may be provided separately from the general-purpose chassis. The cooling device is of a configuration in which a plurality of fans 40 are aligned in the height direction of the chassis 28. Each of the fans correspond to a cooling unit or a cooling operation mechanism. The fans 40 of the modular unit 24 located on the front side of the chassis 20 rotate in a direction of supplying/guiding the air outside of the chassis into the chassis. That is, the fans on the front surface side are air-intake fans. The fans 40 of the modular unit 26 located on the rear of the chassis 20 rotate in a direction of exhausting the air in the chassis to the outside of the chassis. That is, the fans on the rear side are air-exhaust fans. Alternatively, the fans on the front surface side may serve as the air-exhaust fans, and the fans on the rear surface side may serve as the air-intake fans. That is, with such a configuration that one of the two groups of fans placed on the opposing surfaces of the chassis serve as the air-intake fans, and the remaining group of fans serve as the air-exhaust fans, the source of heat generation in the chassis can be cooled with good efficiency by the outside air of the chassis.

The modular unit 24 (26) has the layout characteristics that, in addition to including the hard disk drives in two groups arranged on the right and left sides with the power supply units 32 disposed between the two groups, the cooling device 36 is disposed each on the right and left sides of the chassis 28 so as to mainly cool the hard disk drives 15 that generate more heat than the power supply units 32. In FIG. 2 example, the cooling device is disposed on the right and left sides of the modular unit to oppose the hard disk drives that generate more heat than the power supply units. The idea of cooling the power supply units will be described later.

As shown in FIG. 2, the modular units 24 and 26 respectively located on the front and rear surface sides of the chassis 20 are inserted into the chassis respectively from the front and rear surface sides thereof to make their platters 30 directly oppose each other.

The cooling devices 36 located on the front of the modular unit is moved away from the memory unit 34, thereby leaving the front area of the memory unit 34 available for use in the modular unit. This accordingly enables the extraction of any of the hard disk drives 15 from the platter to the outside of the modular unit. This also enables the insertion of the hard disk drives into any of the modular unit.

For leaving the front area of the memory unit available for use, the modular unit or the chassis is provided with a drive mechanism for moving away the cooling device from the memory unit, e.g., a mechanism for causing the cool device to slide or rotate. To enable rotation of the cooling device 36, using a shaft, the modular unit 24 supports the cooling device on the right and left sides of the chassis. The cooling device rotates around the shaft. This is applicable to the modular 26.

With such a configuration that the power supply units 32 are disposed at the center of the platter 30, and a plurality of hard disk drives are disposed in two groups with the power supply unit sandwiched between the two groups, the total length can be of a small value for the power-supply pattern from the power supply units to each of the hard disk drives. This configuration enables a stable supply of current and voltage, and prevents any possible increase of size and thickness of the platter. Note that with a configuration where the power supply units are disposed at the end of the platter, the power-supply pattern is increased in total length, and the resistance is also increased. As a result, the platter has to be increased in size or thickness.

FIGS. 3A to 3C are each a general perspective view showing an exemplary layout of a plurality of hard disk drives 15 in the modular unit. FIG. 3A shows a layout in which a plurality of hard disk drives connected to the platter 30 are all oriented in the same direction irrespective of whether the disks are located on the front or rear surface side of the chassis. With such a layout, however, the hard disk drives located on the rear surface side of the chassis cannot be extracted from the front surface side of the chassis as indicated by an arrow.

FIG. 3B shows a layout including an area on the front of the chassis where the hard disk drives 15 are not disposed. This area is changed in position by the hard disk drives on the front surface side moving in the lateral direction as indicated by arrows, thereby allowing replacement of the hard disk drives 15 on the rear surface side of the chassis via this open area. The problem with such a layout is the reduction of the packing density of the hard disk drives on the front surface side of the chassis.

In consideration thereof, as shown in FIG. 3C, i.e., FIG. 2, the modular units are disposed inside of the chassis in such a manner that the hard disk drives are oriented in two different directions, i.e., to the front and rear surface sides of the chassis.

As shown in FIG. 2, on the right and left ends of the modular units 24 and 26, the cooling devices 36 are disposed along the height direction of the modular unit to be almost the same height as the modular unit. The cooling devices 36 are disposed so as to oppose a plurality of hard disk drives arranged in the height direction of the modular unit.

As shown in FIGS. 4A to 4C, a fan unit 42, which is a combination of a plurality of fans, each of the fans operating as the cooling device, is supported by a shaft 44, around which the fans rotate, leaving the front area of the hard disk drives 15 available for use. The fan unit 42 is supported in this manner in an area close to the side edge of the chassis 28 by the shaft 44, which is inserted into a groove of the chassis. The shaft 44 extends from the chassis 28 in a direction perpendicular to the fan unit 42. FIGS. 4A to 4C simply show the chassis, and to clarify the positional relationship with the hard disk drives, the hard disk drives are only partially shown.

FIG. 4A shows the fan unit 42 opposing the hard disk drives 15, and FIG. 4B shows the fan unit 42 rotated around the shaft 44.

In the state of FIG. 4B, the fan unit 42 can leave the front area of the hard disk drives available for use, though not perfectly, by rotating in front of the hard disk drives 15. Due to the imperfection as such, the front area of the hard disk drives is partially blocked by a side surface 46 of the fan unit, thereby generating a dead space that prevents the maintenance and replacement operation for the hard disk drives.

In consideration thereof, as shown in FIG. 4C, a hinge 48 is disposed between the fan unit 42 and the chassis 28. With this configuration, the hinge rotates and extends to move the fan unit away from the front area of the hard disk drives, thereby eliminating the problem of the dead space described above.

Figure 5A:
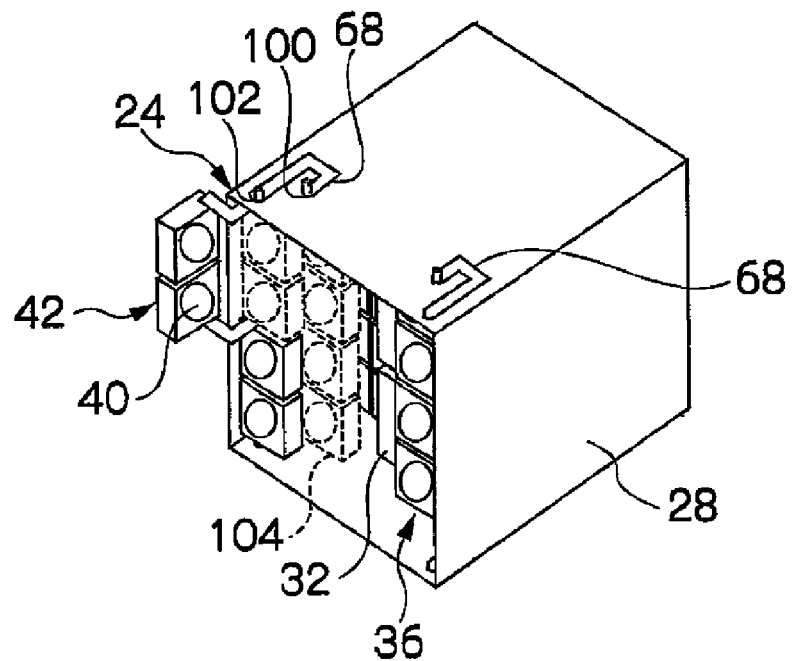
FIGS. 5A and 5B are perspective views showing how the cooling device is supported by the modular unit.
Figure 5B:
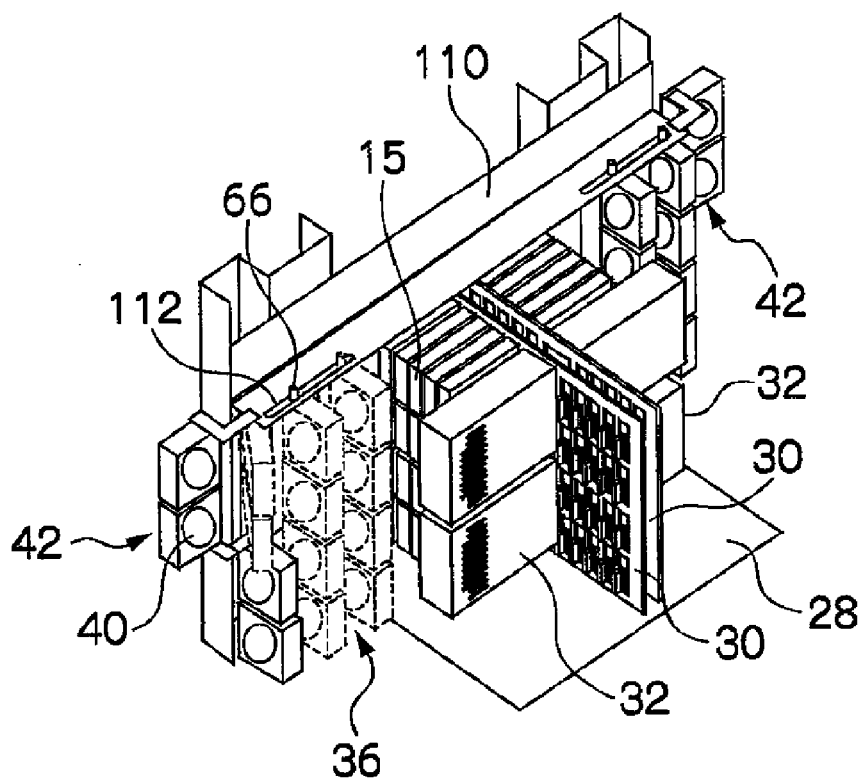

FIGS. 5A and 5B show two other layouts of supporting the cooling device 36 in the chassis 28. FIG. 5A shows a layout in which the cooling device 36 is attached to the chassis 28, and FIG. 5B shows a layout in which the cooling device 36 is attached to the chassis not directly but via reinforcements such as a rail 10 or any intermediate equipment. In FIG. 5B, for enhancement of the rail 10, only the bottom surface of the chassis is shown.

A moving device for use to move the cooling device 36 away from the modular unit is classified into two types as described above. One is of a type moving to slide the cooling device with respect to the modular unit, and the other is of a type rotating the cooling device with respect to the modular unit.

Figure 6:
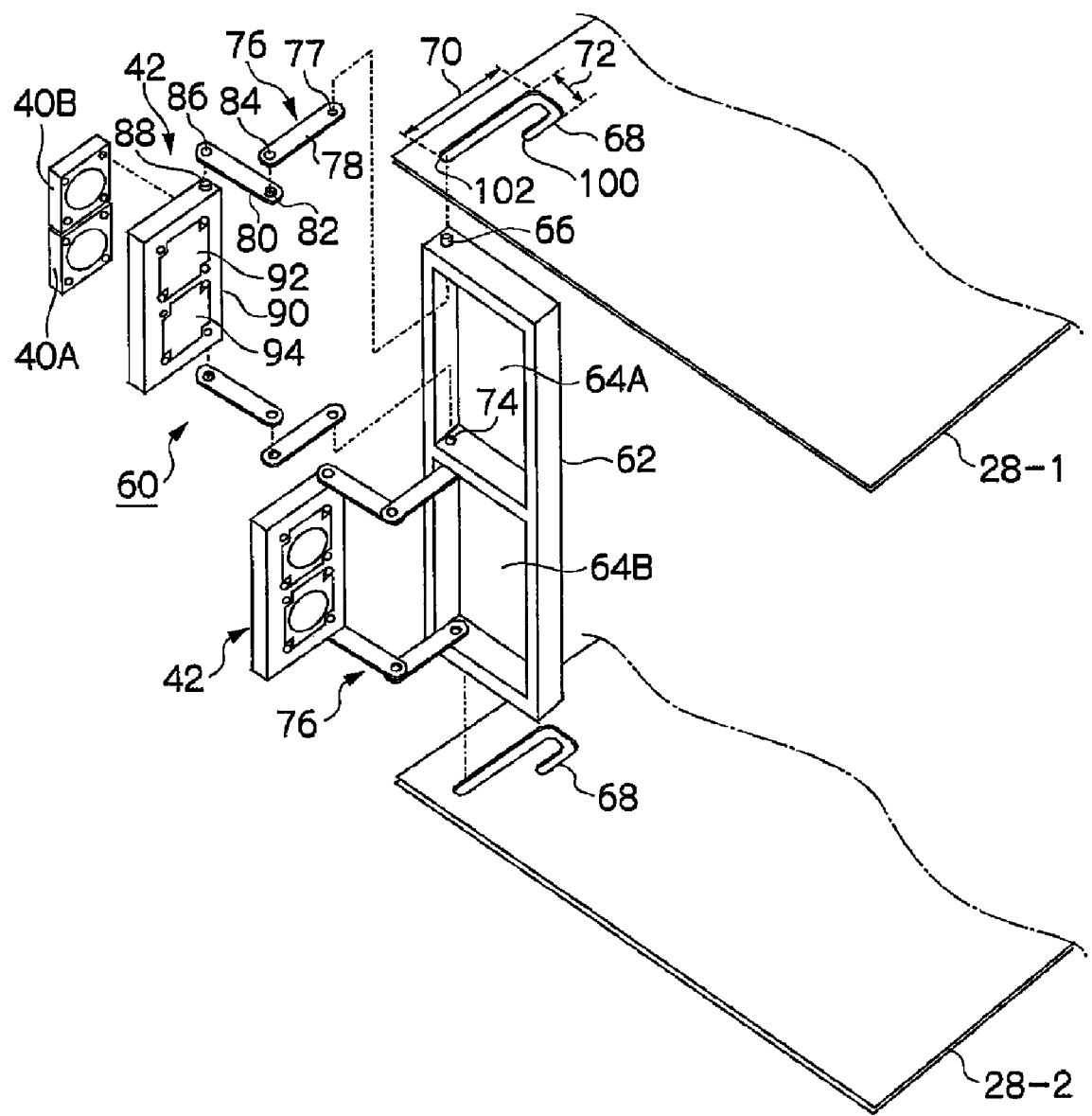
FIG. 6 is an exploded perspective view of the cooling device of FIG. 5A.

FIG. 6 is an exploded perspective view of the cooling device denoted by the reference numeral 42 in FIG. 4C, showing the detailed configuration thereof. A reference numeral 62 in FIG. 6 denotes a rectangular-shaped first frame body that supports the fan unit 42. A reference numeral 28-1 denotes a plane surface, i.e., upper surface, of the chassis 28, and a reference numeral 28-2 denotes a bottom surface (lower surface) of the chassis 28. The first frame body 62 includes two open spaces 64A and 64B, which each accommodate therein the fan unit 42. Note that, in FIG. 6, the cooling device including the two fan units 42 as such is entirely denoted by a reference numeral 60.

From upper and lower left ends of the first frame body 62, short shafts 66 are respectively protruded along the height direction of the chassis. This pair of upper and lower short shafts are respectively inserted into guide grooves 68 formed to the upper and lower surfaces of the chassis at the left side edge close to the front surface side. These guide grooves are each shaped substantially like a letter "J", i.e., extend from the front side of the chassis toward the depth, and is folded over. As such, the short shafts 66 and the guide grooves 68 are implementing a sliding mechanism of moving to slide the cooling device 60 along arrows 70 and 72.

In the two open spaces of the first frame body 62 close to the left edge thereof, small shafts 74 are protruding in a direction at right angles to the open spaces respectively from the upper and lower ends thereof. This pair of upper and lower small shafts is provided to each of the open spaces, and each pair of the small shafts is attached with a hinge 76 for supporting the fan unit 42 with respect to the first frame body. The hinges 76 are coupled to the upper and lower ends of the fan units 42, respectively. Note that, FIG. 6 shows an exploded view of only one of the two fan units located above.

The hinge 76 is configured by first and second small pieces 78 and 80. The first small piece 78 has an aperture 77 at the tip end thereof, and into the aperture 77, the upper small shaft in the open space of the first frame body 62 is inserted. The first small piece 78 has another aperture 88 at the rear end thereof, and into the aperture 88, a protruded shaft 82 at the tip of the second small piece 80 is inserted. The second small piece 80 has an aperture 86 at the rear end thereof, and into the aperture 86, a small protrusion 88 located at the upper left edge of a second frame body 90 configuring the fan unit is inserted. As such, the hinge couples together a rotation shaft 74 and the upper end of the fan unit 42. Similarly, the hinge couples together the rotation shaft 74 and the lower end of the fan unit.

The fan unit 42 is of a configuration that the two fans 40A and 40B are respectively fixed in open spaces 92 and 94 in the second frame body 90. The hinge 76 connects the pair of upper and lower fan units 42 to the first frame body 62. As such, the four fans on the right and left sides of the modular units are located on the front of the hard disk drives, thereby cooling the hard disk drives.

In FIGS. 5A and 6, a reference numeral 100 denotes an end of each of the upper and lower guide grooves 68, and when the first frame body 62 is disposed at this position, the fan unit 42 can be at the appropriate position. When the fan unit is at the appropriate position as such, the fan unit is allowed to move toward the inside of the modular unit, thereby being able to reduce any noise generated due to the rotation of the fans. The fan unit is also allowed to move closer to the hard disk drives, and to move toward the center of the module unit by a distance indicated by an arrow 72 of FIG. 6, thereby being able to cool, with good efficiency, a plurality of hard disk drives located in the width direction of the module unit, and the power supply unit located at the center thereof.

A user slides the cooling device 36 up to another end 102 of the guide groove 68, and then rotates the fan unit 42 to make available the front area of the hard disk drives. Such a process is described by referring to FIGS. 7A to 7E.

As shown in FIGS. 7A and 7B, the fan unit 42 is rotated with respect to the first frame body 62 together with the hinges 76. Thereafter, the second small pieces 80 are rotated with respect to the first small pieces 78 (FIG. 7C).

When the fan unit 42 is then rotated with respect to the second small pieces 80, the hinges are extended to a sufficient degree. With the hinges extended as such, the fan unit 42 is moved sufficiently away from the front surface of the modular unit 24s and 26 so that the front area of the hard disk drives is made widely available (FIG. 7D). Moreover, by rotating the first frame body 62 with respect to the chassis around the short shafts 66 (FIG. 7E), any obstacle can be favorably eliminated for maintenance and replacement of the hard disk drives.

Note that, preferably, the four fans 40 of the cooling device are provided in two groups, i.e., upper and lower groups, by the fan units 42. This is because if the four fans are fixed to a fan unit at the time of maintenance and replacement of the hard disk drives, the four fans will move away from the hard disk drives all at once, thereby failing to sufficiently cool the remaining hard disk drives not to be replaced. On the other hand, when these fans are allowed to individually rotate with respect to the first frame body, the configuration will be complicated.

In FIG. 5B example, a pair of upper and lower rails 110 are each formed with a linear guide groove 112. Into this guide groove, the small shaft 66 of the first frame body 62 is inserted. When the cooling device 36 is located at the base end of the groove 112, the cooling device 36 is located closest to the hard disk drives, thereby being able to cool the hard disk drives with good efficiency.

For replacement of any of the hard disk drives, the user moves the cooling device 36 to the tip end of the guide groove 112, and then rotates the fan unit 42 to be away from the front area of the hard disk drives.

Note that FIGS. 5A and 5B do not show the first frame body. The fan unit is freely attached/detached to/from the module unit via the hinges, so that the fan unit can be ready for replacement. In FIGS. 5A and 5B, the fan unit after the movement as such is indicated by solid lines, and the fan unit before or during such movement is indicated by broken lines.

Figure 8:
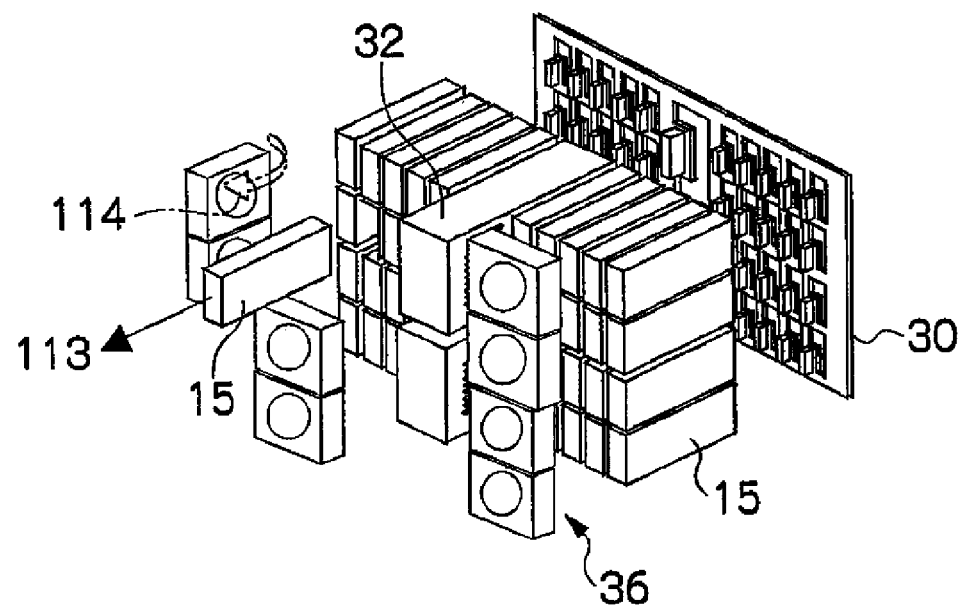
FIG. 8 is a perspective view showing the state in which a fan unit makes available an area in front of the hard disk drives to allow extraction of any of the hard disk drives from the modular unit toward the front side.

FIG. 8 shows the state in which the fan unit 42 makes available the area in front of the hard disk drives 15, and the hard disk drives are ready for extraction from the modular unit in the direction of a reference numeral 113.

By rotating the fan unit along a curved arrow 114, the front area of the hard disk drives can be made available for use. Via thus made-available area, the hard disk drives 15 can be extracted to the outside of the chassis.

One modular unit accommodates therein the hard disk drives 15 in a vertical direction, and piles up the hard disk drives in two groups on both sides of the power supply units 32 with five columns wide and four rows deep each, i.e., 40 hard disk drives in total. For replacement of any of the hard disk drives in the second row from the above in the left group, as shown in FIG. 8, one of the two fan units located above the other may be rotated.

Figure 9:
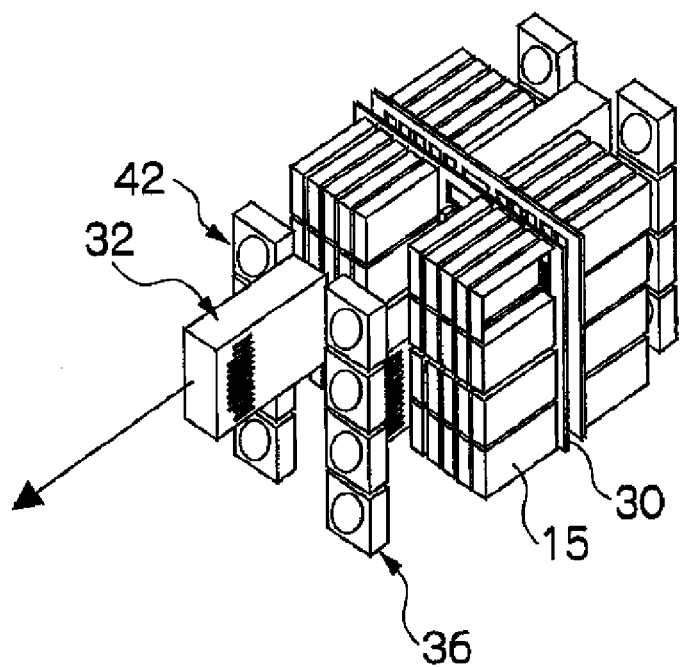
FIG. 9 is a perspective view showing the state in which a power supply unit can be pulled out from the modular unit toward the front side.

As shown in FIG. 8, the power supply units 32 are located at the center of a plurality of hard disk drives 15, and the fan unit 42 is not located in front of the power supply units 32. With such a configuration, as shown in FIG. 9, the power supply units 32 can be extracted from the modular unit as indicated by an arrow without moving the fan unit in position.

As described above, to allow the fan unit to be rotated with respect to the modular unit, the fan unit is supported by the shafts at the right and left side edge portions of the modular unit. As a result, the fan unit is prevented from being located in front of the power supply units located at the center of the modular unit, and there is some concern about the possibility that the power supply units may not be cooled to a sufficient degree.

In consideration thereof, as shown in FIG. 2, the power supply units 32 are protruded from the tip end of the groups of the hard disk drives 15 toward the side of the cooling devices 36. With such a configuration, the outside air from the cooling devices 36 is directed to the side surfaces of the power supply units, thereby cooling the power supply units.

Figure 10:
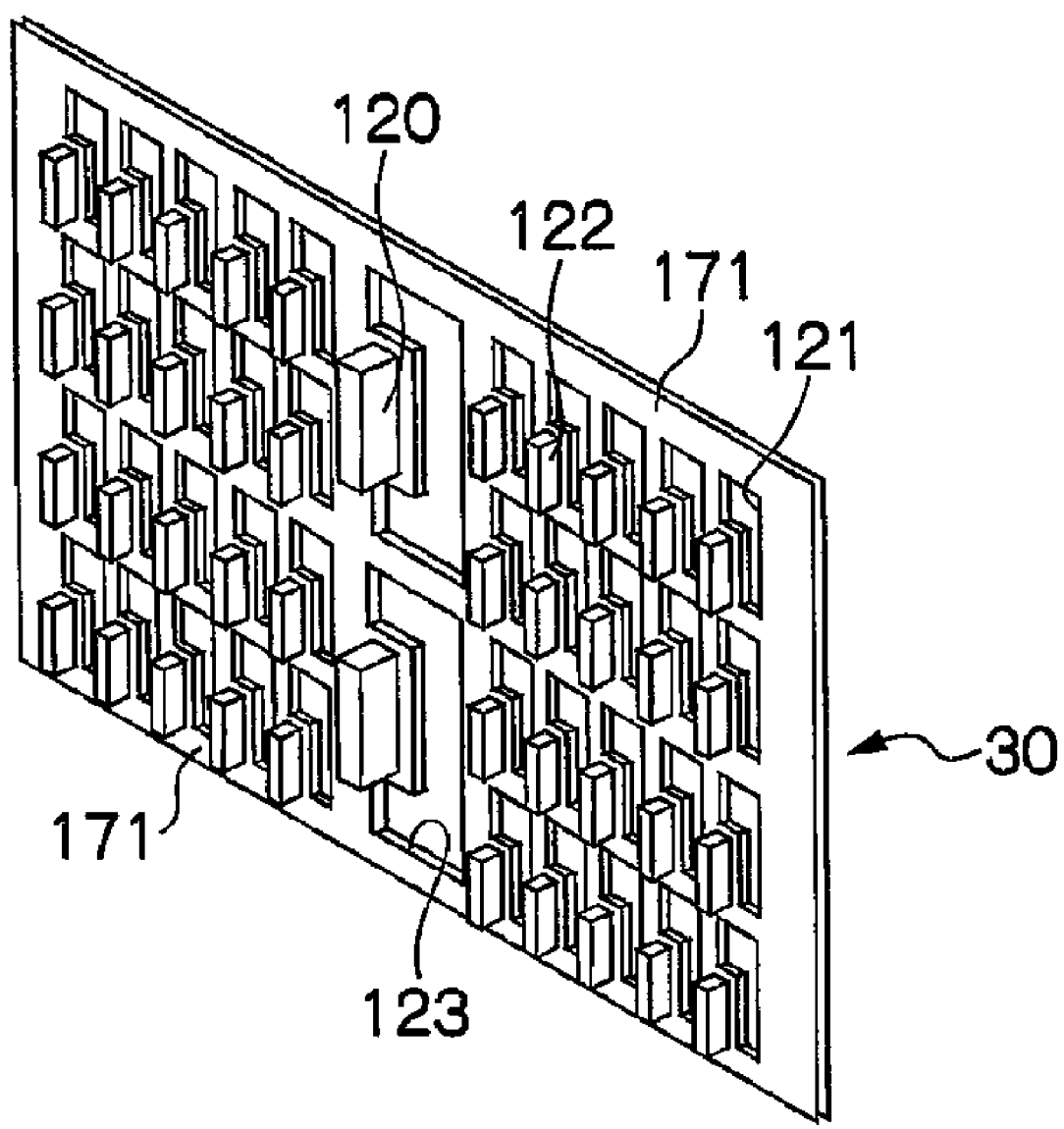
FIG. 10 is a perspective view of a platter.

FIG. 10 is a perspective view of the platter 30 described above. The platter has been previously provided to each of the hard disk drives, but such platters are combined together as a piece of platter 30, and at the center thereof, sockets 120 are formed respectively for use by the pair of upper and lower power supply units. This socket is connected with the power supply units 32.

On the right and left of the sockets 120 for use by the power supply units as such, a plurality of sockets 122 are formed at regular intervals for use by the hard disk drives 15. When the power supply units 32 are provided into the sockets 120 provided for use thereby, by the power-supply pattern in the platter 30, the sockets for use by the hard disk drives are each provided with a power for driving the hard disk drives.

Figure 11A:
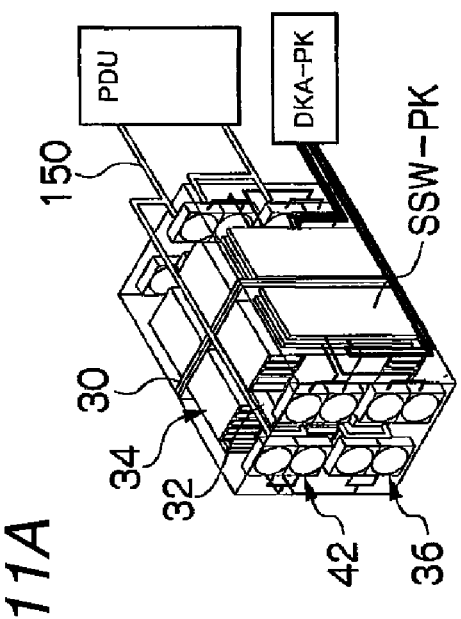
FIG. 11A is a perspective view of the modular unit for illustrating a power supply system and a signal system for fans and the hard disk drives.
Figure 11B:
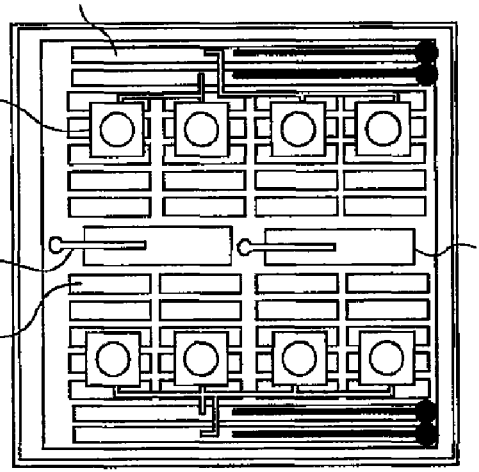
FIG. 11B is a front view of the modular unit of FIG. 11A.
Figure 11C:
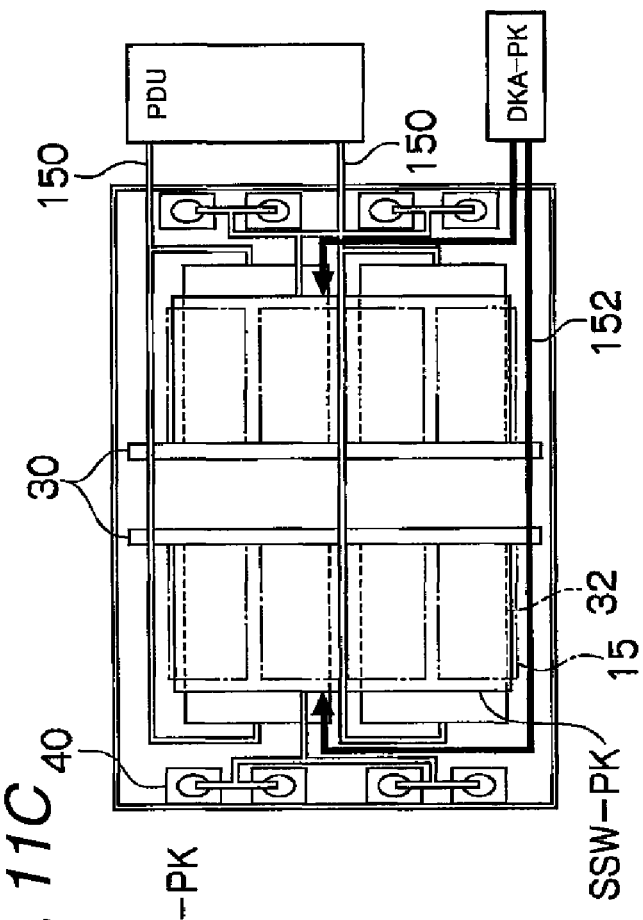
FIG. 11C is a side view of the modular unit of FIG. 11A.

FIGS. 11A to 11C each show the configuration of the modular unit, illustrating a power-supply system and a signal system for the fans and the hard disk drives. FIG. 11A is a perspective view of a pair of modular units located on the front and rear of the chassis, FIG. 11B is a front view of the modular unit of FIG. 11A, and FIG. 11C is a side view of the modular unit of FIG. 11A.

A PDU is a unit for allocating an external power supply, and is mounted to the rear surface side of the chassis. A power supply from the PDU to the power supply units 32 is made by a power supply cable 150. As is known from FIGS. 11A to 11C, the power supply cable from the PDU to the power supply units 32 on the front side goes through the pair of platters 30, and is connected to the front surface of the power supply units 32 on the front side after passing through the upper side of the power supply units 32 on the rear and front surface sides.

An SSW-PK (Saw Switch-Package) is a control circuit for making a supply of power and control signal to the hard disk drives (DKU) and the fans 40. This control circuit is mounted to the platter 30, and is disposed on the right and left sides of the modular unit to be mounted to the platter 30 with no interference with the memory units. The power is directed from the platter 30 to the SSW-PK. On the both side surfaces of the modular units on the front and rear surfaces, two of the SSW-PK are provided respectively. As shown in FIG. 11B, the SSW-PKs are each connected to the circuit of the fans in the respective fan units 42, i.e., fan package. The fan package is a control circuit on the side of the fan unit, and outputs a drive signal to the drive circuit of the fans. The fan package will be described later in more detail.

A DKA-PK (Disk Array-Package) is disposed on the rear surface side of the control unit (DKC), and is an interface for connecting together the DKC and the hard disk drive units (DKU). Signal connection between the DKC and the DKU is performed via the SSW-PK and the platter 30. A signal cable 152 from the DKA-PK to the SSW-PK on the front side is connected to the front surface of the SSW-PK on the front side after passing the lower side of the respective SSW-PKs on the front and rear surface sides.

Figure 12:
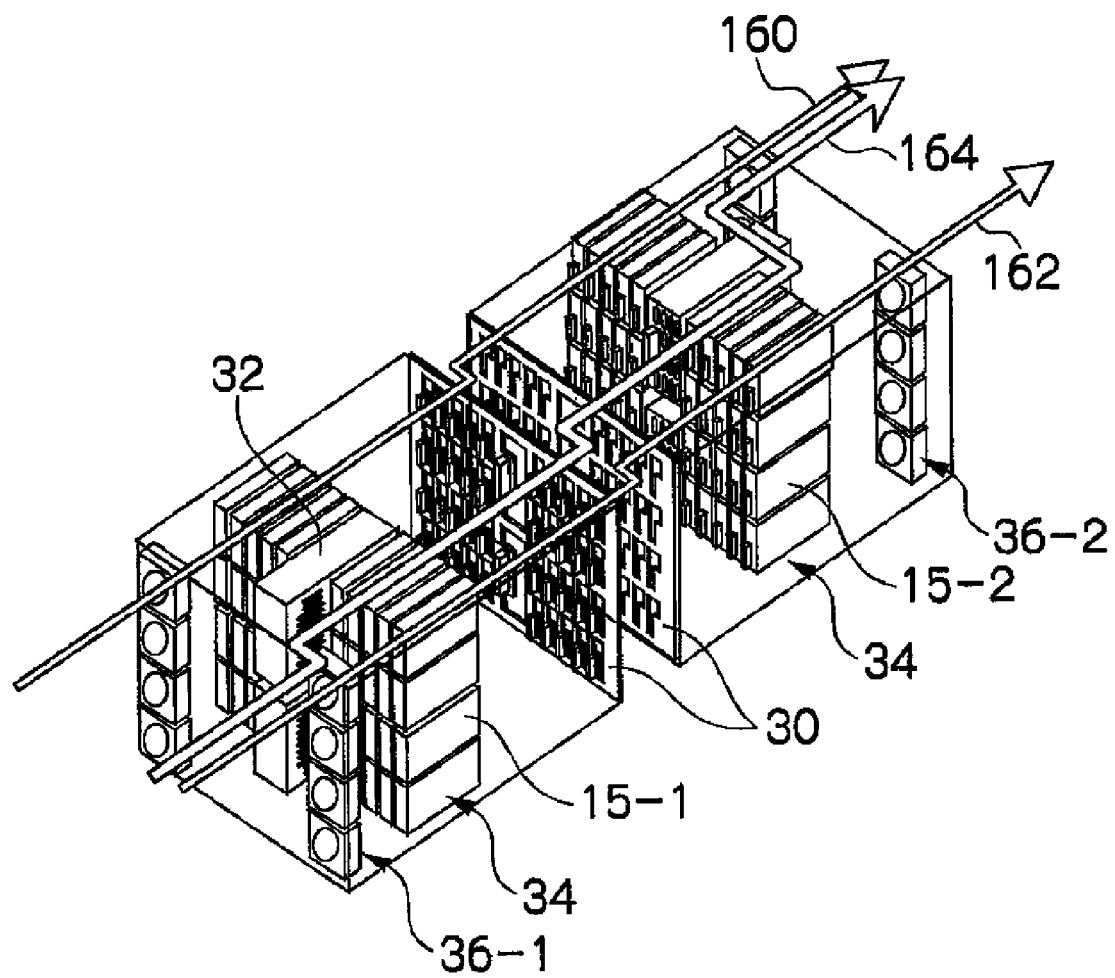
FIG. 12 is a schematic view showing an air-flow path for outside air sucked into the chassis from the cooling device on the front surface side of the chassis.

As shown in FIG. 12, air-flow paths 160 and 162 for the outside air sucked into the chassis from the cooling device 36-1 on the front surface side of the chassis are extended around the hard disk drive 15-1 on the front side, and then goes around the hard disk drive 15-2 on the rear surface side via the platter 30. The flow paths 160 and 162 are then directed to the outside of the chassis from the cooling device 36-2 on the rear surface side. The outside airflow denoted by a reference numeral 164 is used for cooling the power supply units.

As shown in FIG. 10, in the platter 30, the area around the connector for use by the hard disk drives is notched as denoted by a reference numeral 121, thereby allowing the outside air to pass through the platter.

A notch 123 is formed also in the vicinity of the connector 120 in the platter for use with the power supply units. With this configuration, an air-flow path 164 for the outside air coming from the cooling device 16-1 on the front abuts the side surface of the power supply units 32, and the air reaches the side surfaces of the power supply units on the rear surface side after passing through the notch 123 around the power-supply connector of the platter. The air is then exhausted from the cooling device 36-2 on the rear surface side. The platter 30 on the rear surface side is also provided with a notch similar to that provided to the platter on the front surface side.

For further reduction of the resistance against the air flow, the notches preferably cover a larger area of the platter. When the notches cover a larger area of the platter as such, however, the platter may be reduced in strength, and a problem may occur with respect to the power-supply pattern and the signal pattern to be formed on the platter. As such, the notches may be defined by size as appropriate considering the balance between the notches.

Figure 13B:
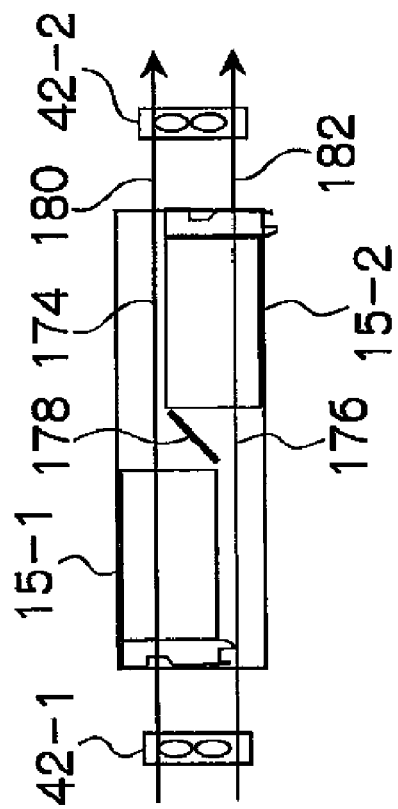
FIGS. 13A and 13B are each a schematic diagram showing the temperature change observed in the outside air provided into the chassis.
Figure 13A:
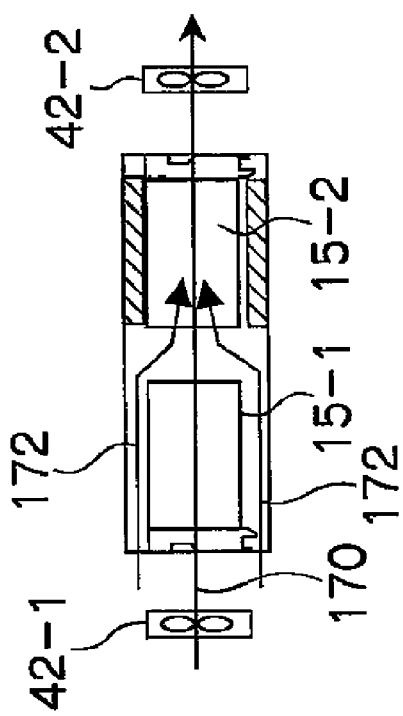

FIGS. 13A and 13B are each a schematic view showing the temperature change with respect to the outside airflow provided into the storage device. As shown in FIG. 13A, an outside airflow 170 coming from the fan 42-1 on the front and flowing around the hard disk drive 15-1 on the front is increased in temperature by the hard disk drive 15-1.

Thereafter, the outside airflow 170 reaches the hard disk drive 15-2 on the rear, and thus the cooling performance with respect to the hard disk drive 15-2 on the rear is not sufficient enough.

In consideration thereof, as shown in FIG. 12, a plurality of fans in the cooling device 36 are so arranged as to cover the height of the arrangement of a plurality of hard disk drives. With such a configuration, as shown in FIG. 13A, the hard disk drive 15-2 on the rear surface side can be cooled by an outside airflow not having been passed through the side surfaces of the hard disk drive 15-1 on the front but through the area above and below the hard disk drive 15-1, i.e., an outside airflow 172 that is not heated by the hard disk drive 15-1.

The outside airflow 172 collides against the upper and lower ends 171 of the platter 30 of FIG. 10 formed with no notch, and then is guided to the notch 121 formed around a connector 122 for use by the hard disk drives. While passing through the notch 121, the outside airflow 172 is mixed with the outside air 170.

As such, the outside airflow 170 passes through the hard disk drive 15-2 on the rear while being cooled by the outside airflow 172, the efficiency of cooling the hard disk drives on the rear can be favorably increased.

On the other hand, as shown in FIG. 13B, the hard disk drives 15-1 and 15-2 on the front and rear sides may be offset in the vertical direction of the chassis so as to discriminate an outside air 174 passing through the hard disk drive 15-1 on the front side from an outside air 176 passing through the hard disk drive 15-2 on the rear side. Between the front-side hard disk drive 15-1 and the rear-side hard disk drive 15-2, a partition 178 may be provided for separating the outside air 174 from the outside air 176.

Figure 14:
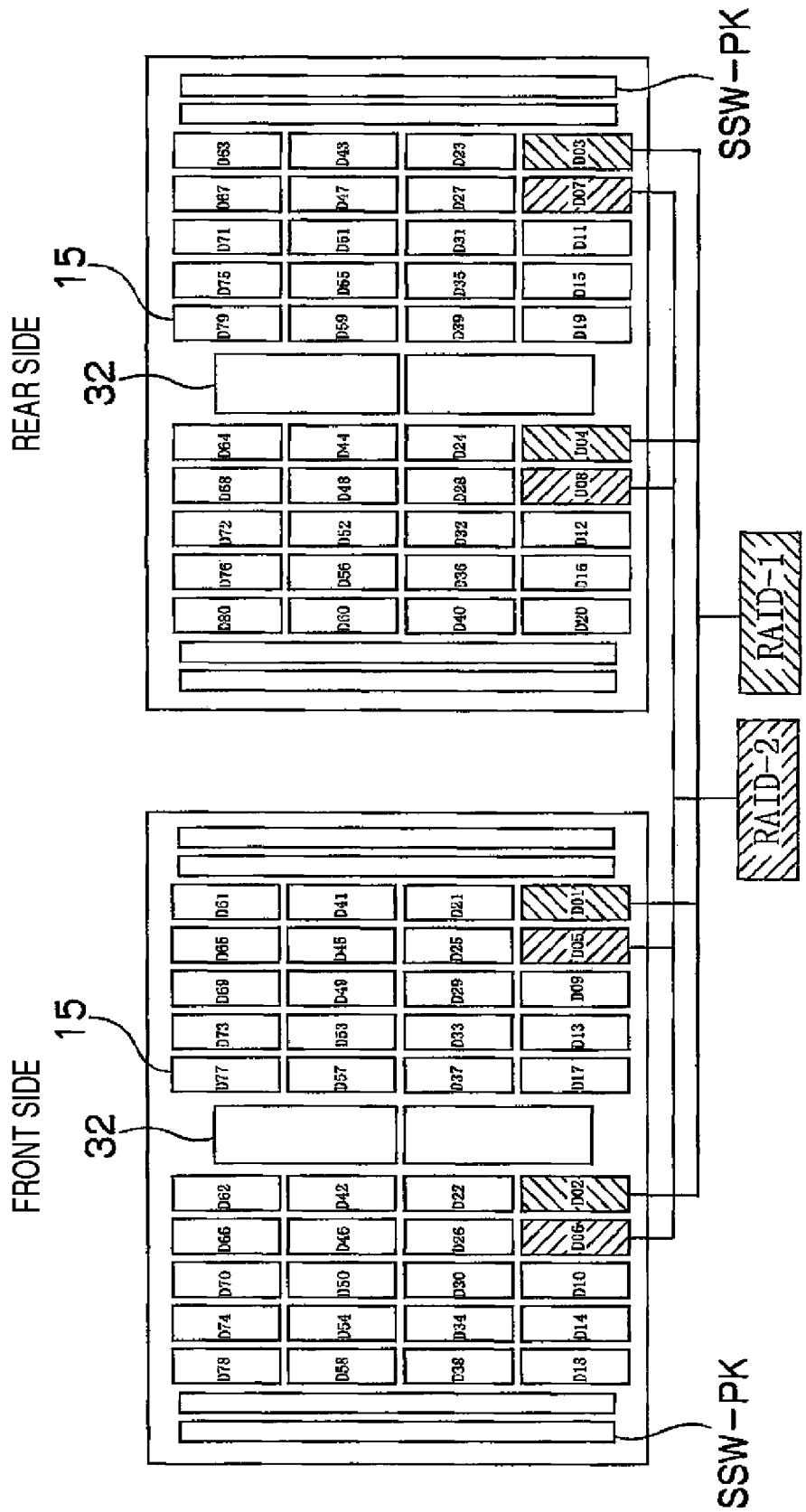
FIG. 14 is front and rear views of the modular unit, showing a RAID group formed by hard disk drives on the front surface side and those on the rear surface side.

As shown in FIG. 14, by the hard disk drives being mounted into the chassis from the front and rear surface sides thereof, the front-side hard disk drives and the rear-side hard disk drives form a RAID group. The left side in FIG. 14 shows the front surface of the modular unit on the front side, and the right side in FIG. 14 shows the front surface of the modular unit on the rear side. FIG. 14 shows that the hard disk drives D01 to D04 form a RAID-1, and the hard disk drives D05 to D08 form a RAID-2.

Any other RAID groups are configured as shown in a management table of FIG. 15. This management table is recorded in a shared memory (not shown) of the DKC.

Figure 16:
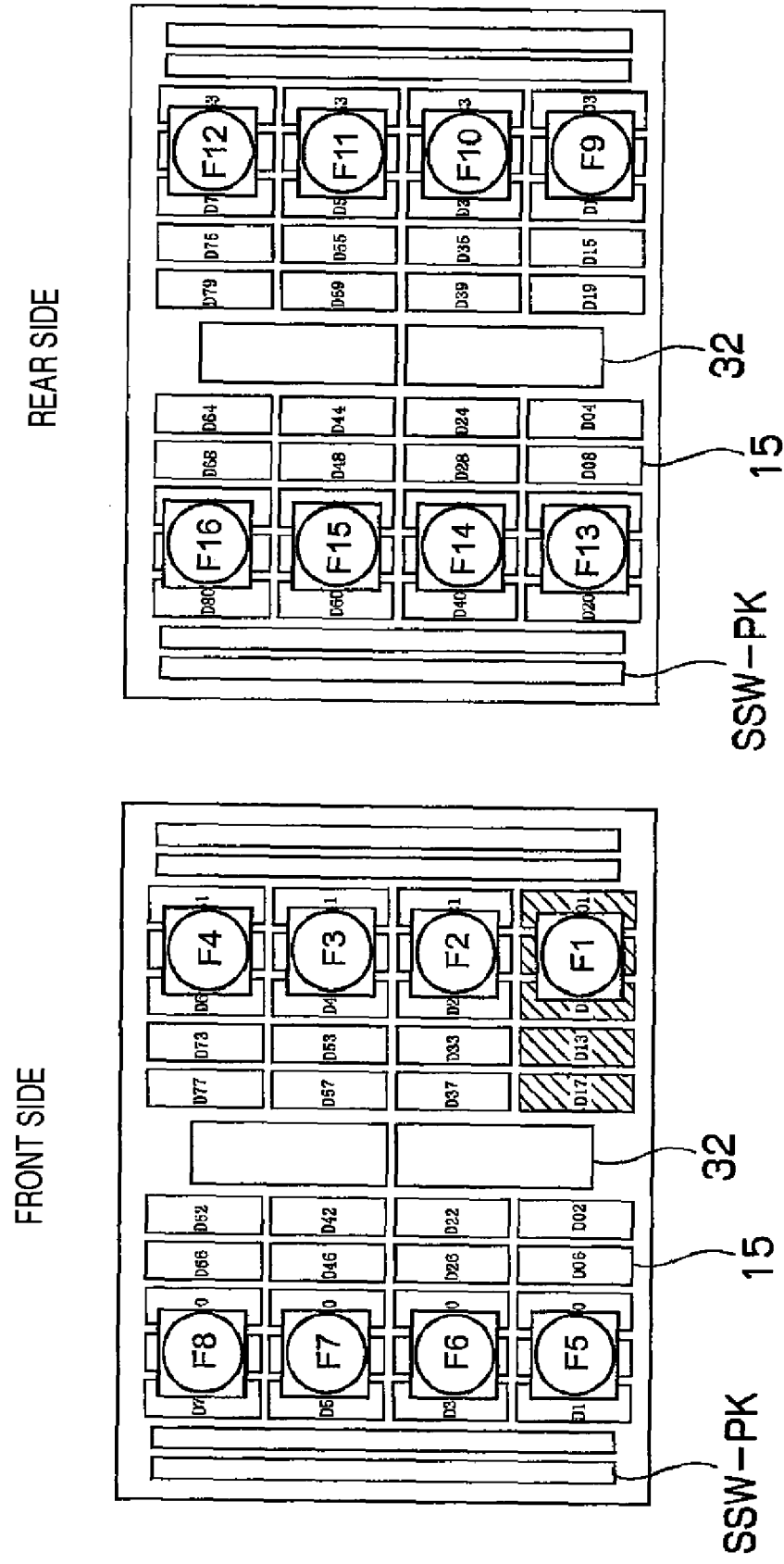
FIG. 16 is front and rear views of the modular unit showing the positional relationship between the fans and the hard disk drives.

FIG. 16 shows the positional relationship between the fans (F1 to F13) and the hard disk drives 15. The left side in FIG. 16 shows the front surface of the modular unit on the front side, and the right side in FIG. 16 shows the front surface of the modular unit on the rear side.

Any of the fans and the hard disk drive corresponding thereto, are grouped, and their relationship is recorded in the above-described shared memory as a management table of FIG. 17. This management table shows that the hard disk drives to be cooled mainly by the fan F1 are D01, D05, D09, D13, and D17, for example. As shown in FIG. 16, the fan F1 is located in front of these hard disk drives D01, D05, D09, D13, and D17.

FIG. 18 is a management table showing the hard disk drives configuring a RAID group (3D+1P), and which of the fans are to be stopped in operation when any of the hard disk drives is closed in the RAID group. This management table is also recorded in the shared memory.

Figure 19:
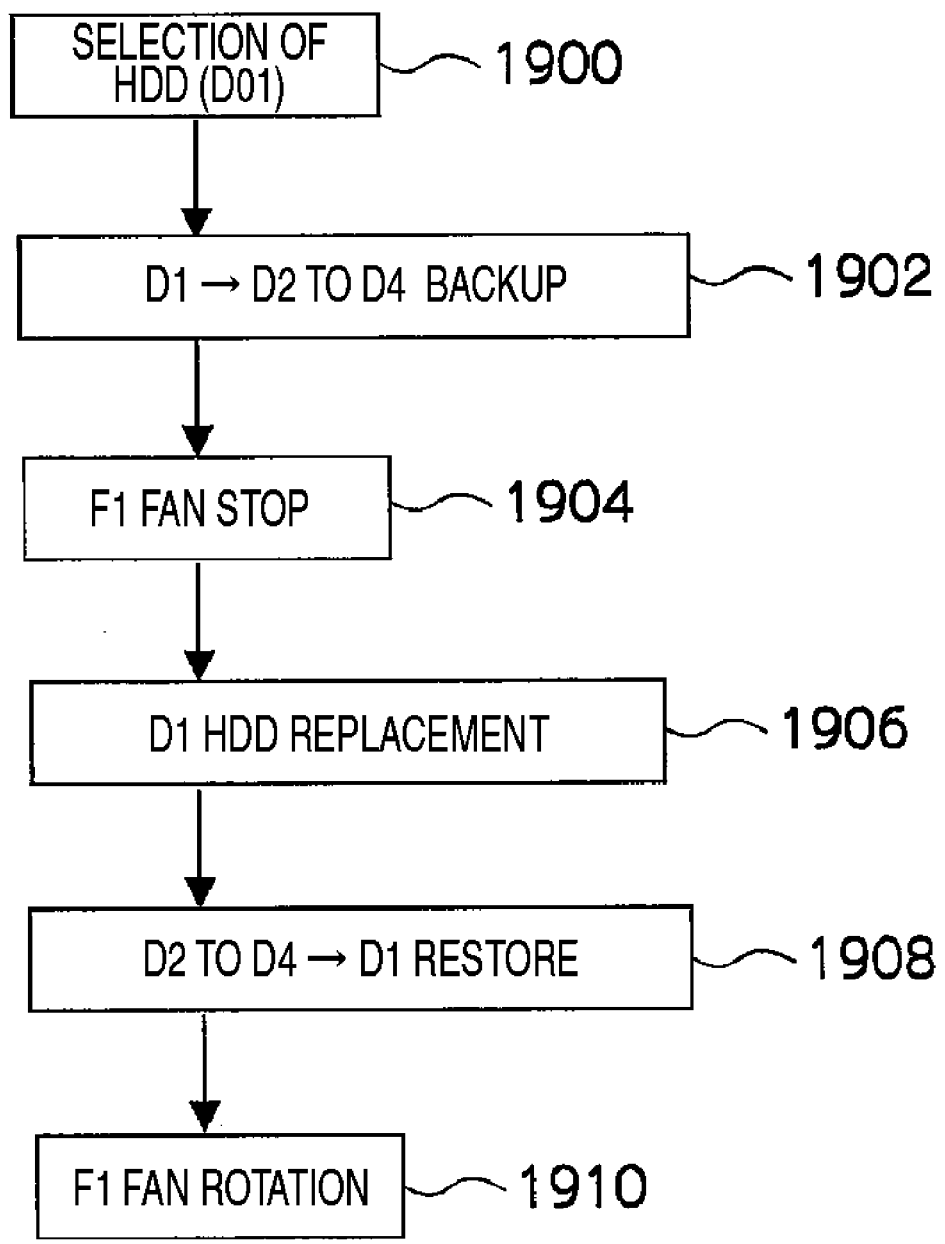
FIG. 19 is a flowchart of a process for closing any of the hard disk drives.

FIG. 19 is the flowchart of a process for closing any of the hard disk drives for replacement purpose. The hard disk drive D01 of FIG. 16 is taken as an example for description below.

When a management operator selects any of the hard disk drives for closing at his or her end, i.e., hard disk drive D01 (1900), the information is forwarded to the DKC from a management terminal via a management interface.

Thereafter, the DKC refers to the management table of FIG. 15, and backs up the data of the hard disk drive D01 to any other hard disk drive(s) configuring the same RAID group (1902).

The DKC then refers to the management table of FIG. 18, and determines that the fan F1 is the one corresponding to the hard disk drive D01 to be closed. The DKC forwards a command for stopping the fan to the control circuit SSW-PK in charge of the fan for control. The SSW-PK then responsively stops the operation of the fan F1 (1904).

After being notified by the management terminal that the fan is stopped in operation, the operator accordingly replaces the hard disk device D01 with another (1906), and then makes an input to the management terminal to inform that the replacement of the hard disk drive is completed. When the DKC receives such a notification of replacement completion of the hard disk drive from the management terminal, data restoring is performed from any other hard disk drives in the same RAID group to the replaced hard disk drive (1908). The DKC also forwards a command to the SSW-PK for resuming the operation of the fan F1 that has been stopped in operation. In response thereto, the fan that has been stopped in operation starts rotating again (1910).

Note that, while the fan F1 on the front side is being stopped in operation, the air is guided from the rear surface side of the rack toward the hard disk drives D05, D09, D13, and D17 by the fan F9 opposing the fan F1. These hard disk drives are thus continuously cooled at the least possible level.

Alternatively, the rotation speed of the fan F9 may be increased while the fan F1 is being stopped in operation. When any of the fans on the rear side is being stopped in operation, the fan corresponding thereto on the front side may be increased in rotation speed.

Still alternatively, a sensor may detect sliding movement or rotation of the cooling device with respect to the modular units, and the fans may be stopped rotating in accordance with the detection result. Still alternatively, a temperature sensor may be provided inside of the chassis to control the rotation speed of the fans.

Figure 21:
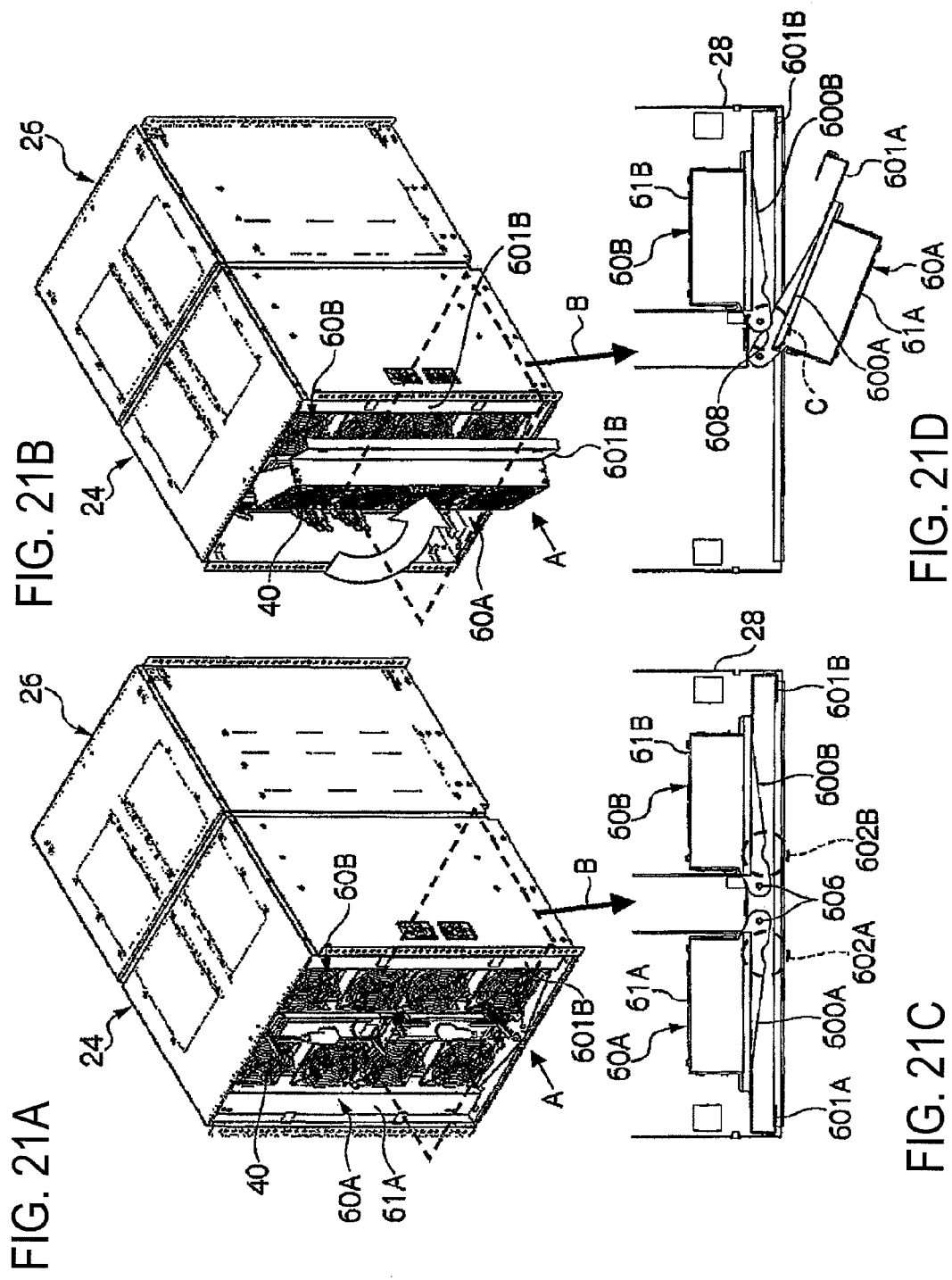
FIGS. 21A to 21D are perspective views and others of any other embodiment in which the front surface of a modular unit is made available by rotating or sliding a cooling device, for example.

Described next is another embodiment of making available the front surface of a modular unit by rotating or sliding a cooling device, for example. FIGS. 21A to 21D shows the embodiment, where FIG. 21A therein is a perspective view of a cooling unit (cooling device) covering the front surface of a modular unit, and FIG. 21B is a perspective view of the cooling unit leaving available the front surface of the modular unit for use. Also, FIG. 21C is a general view of a part of the bottom area of the modular unit indicated by dotted lines in FIG. 21A (arrow B), and FIG. 21D is another general view of a part of the bottom area of the modular unit indicated by dotted line in FIG. 21B (arrow B). In FIGS. 21A and 21B, the modular units 24 and 26 are viewed from the front side, i.e., from an arrow A.

In FIGS. 21A and 21B, although the rack is not shown, the two modular units 24 and 26 oppose each other, and are accommodated in the rack. A reference numeral 60A denotes a cooling unit disposed on the front left side of the modular unit, and a reference numeral 60B denotes another cooling unit disposed on the front right side thereof. Hereinafter, the letter "A" after the reference numeral means that the component is disposed on the left side, and the letter "B" means that the component is disposed on the right side. The components on the right and left sides share almost the same configuration. Therefore, the features that are the same for both components will not necessarily be repeated for each component in the discussion that follows.

Figure 34:
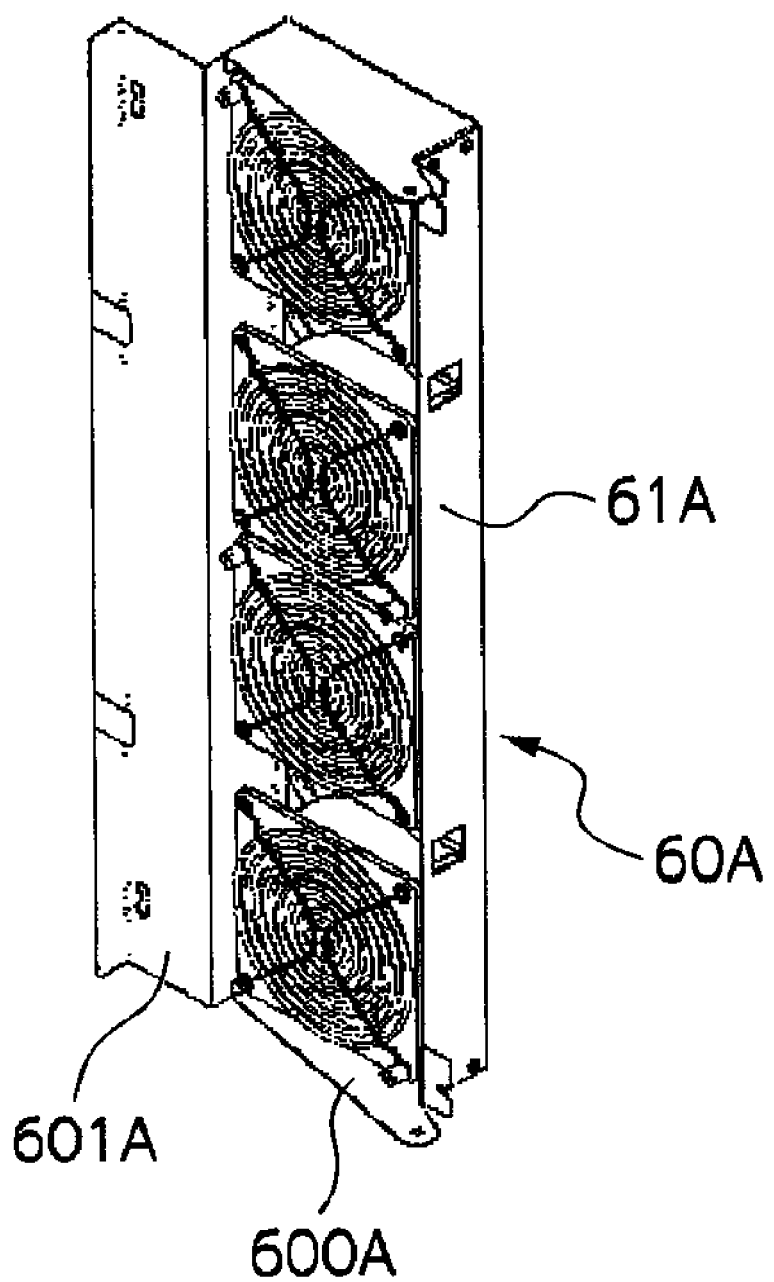
FIG. 34 is a perspective view of a fan unit in which fans are fixedly accommodated in a fan box.
Figure 35:
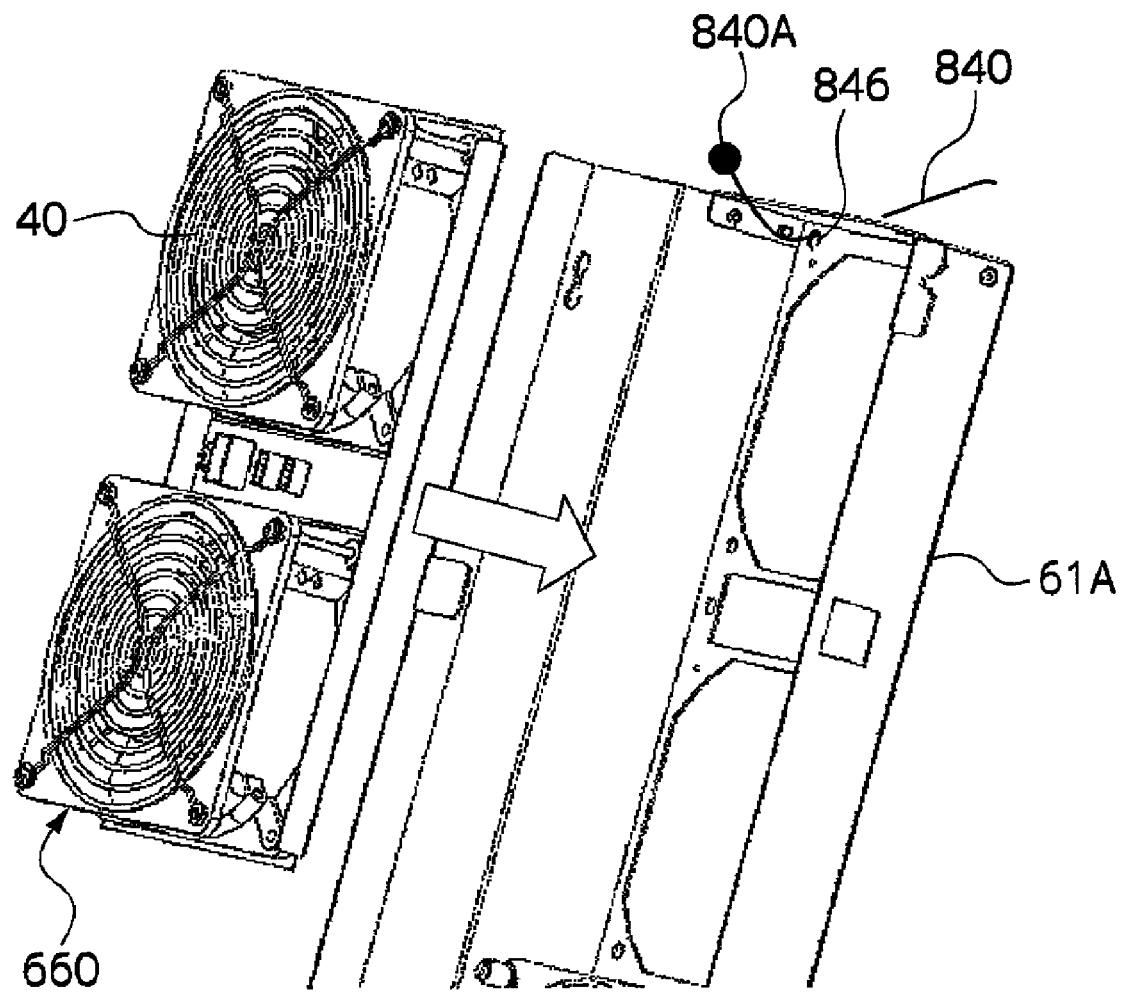
FIG. 35 is a front perspective view of the fan box for illustrating the configuration of fixing a wire to the fan box (unit cover)

The cooling unit 60A has the configuration in which a unit cover 61A is fixed with fans. Referring to FIGS. 34 and 35 will facilitate the understanding of this configuration. FIG. 34 shows the perspective of the cooling unit 60A in its entirety viewed from the front side. FIG. 35 shows how a sub unit 660, which is a combination of the two fans 40, is attached to the unit cover 61A in the direction indicated by the arrow. The cooling unit 60A has the configuration in which the unit cover 61A is fixed with the two sub units 660. By referring to FIGS. 21A to 21D, 34, and 35, a more detailed description is given below.

The unit cover 61A is so shaped as to accommodate the two sub units 660. The unit cover 61A is so designed as to move like a door, i.e., rotates the cooling unit 60A about the end portion closer to the center of the modular unit in a counterclockwise direction as indicated by an arrow in FIG. 21B. By rotating the cooling unit 60A as such, the cooling unit is moved away from the hard disk drives and the power supply units in the modular unit, thereby making available the front of the modular unit. The unit cover 61A is provided with, on the plane and bottom surfaces, a bow-shaped plate 600A (refer FIG. 21C) formed with a shaft hole 606 for insertion of the rotation shaft. Such a shaft hole 606 is formed on the side closer to the center of the plate 600A.

As such, as for the unit cover 61A, the left end portion rotates in the counterclockwise direction about the shaft hole 606 as shown in FIG. 21B. The plate 600A is formed with, in the vicinity of the shaft hole, a shallow groove 602A shaped like a concave dented toward the outside of the modular unit. In the behavior process of the cooling unit 61A from FIG. 21C TO 21D, a head portion 608 on the rotation side of the plate 601B enters into the groove 602A of the plate 601A, thereby increasing the rotation angle of the cooling unit 60A. Accordingly, the cooling unit 60A is moved further away from the memory unit in the modular unit 24, and the front surface of the modular unit 24 is left wide open from the left surface toward the center thereof. The shaft hole 606 is being inserted with the rotation shaft protruding into the modular unit from the top and bottom surfaces thereof.

Figure 22:
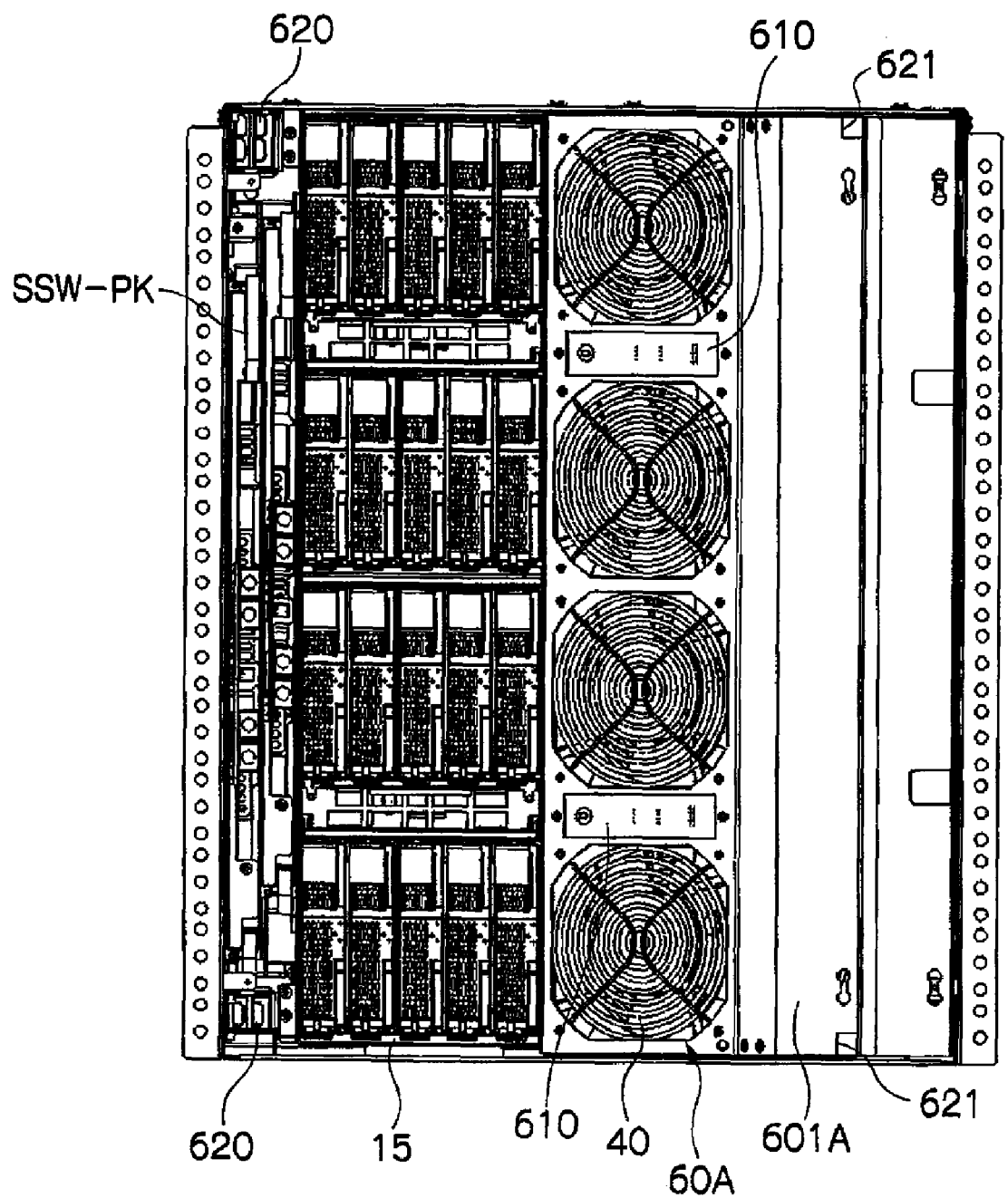
FIG. 22 is a front view of the modular unit, showing a cooling unit leaving the front surface of the modular unit widely available for use.

FIG. 22 is a front view of the modular unit showing the cooling unit 60A leaving wide open the front surface of the modular unit 24. A plurality of hard disk drives are exposed from the left side of the modular unit 24. The control circuit (SSW-PK) is also exposed on the left edge of the modular unit 24. A reference numeral 620 denotes a wiring pull-in section for accommodating wiring connecting together the DKU and DKC. The portion of the unit cover 61A corresponding to this pull-in section is provided with a rectangular-shaped concave section 621 to prevent any possible interference with wiring denoted by the reference numeral 620 when the unit cover 61A is rotated.

Note that, as shown in FIGS. 21A to D, and FIG. 34, a left-side edge area 601A of the unit cover 61A shields a hollow space formed between the cooling fans 40 and the left-side end portion of the modular unit 24. With shielding as such, the outside air directed into the modular unit from the cooling fans 40 is prevented from escaping into the portion of hollow space, thereby ensuring the flow of outside air to be directed into the hard disk drives. In FIG. 22, a reference numeral 610 denotes a drive-control circuit for the fans 40, i.e., fan package. Driving of the fans is controlled by the SSW-PK as described above, and the fan package interacts or assists the control of the SSW-PK over the fans.

Figure 23:
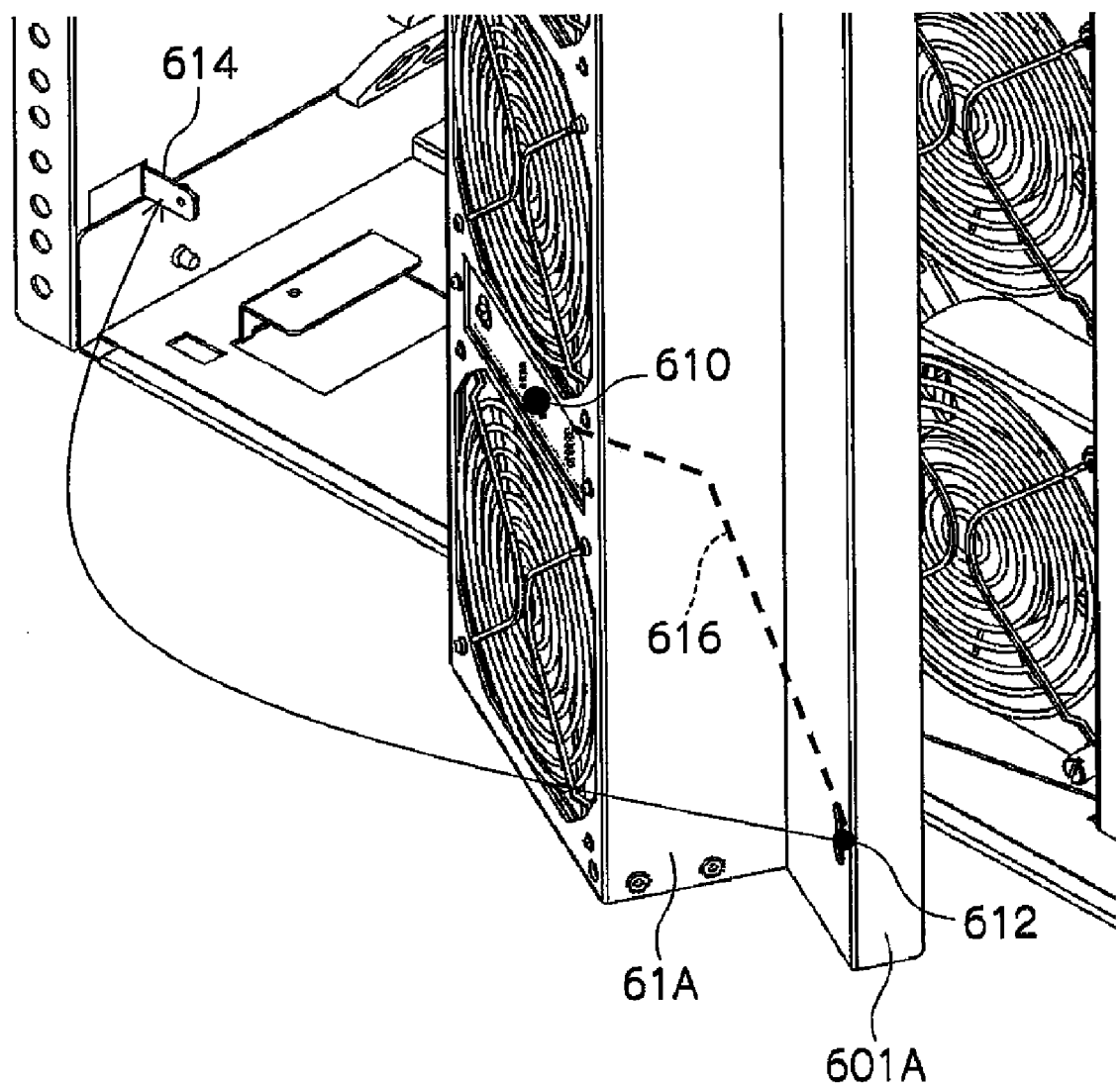
FIG. 23 is a perspective view of a rotated unit cover with an enlargement of the lower end portion thereof.
Figure 24:
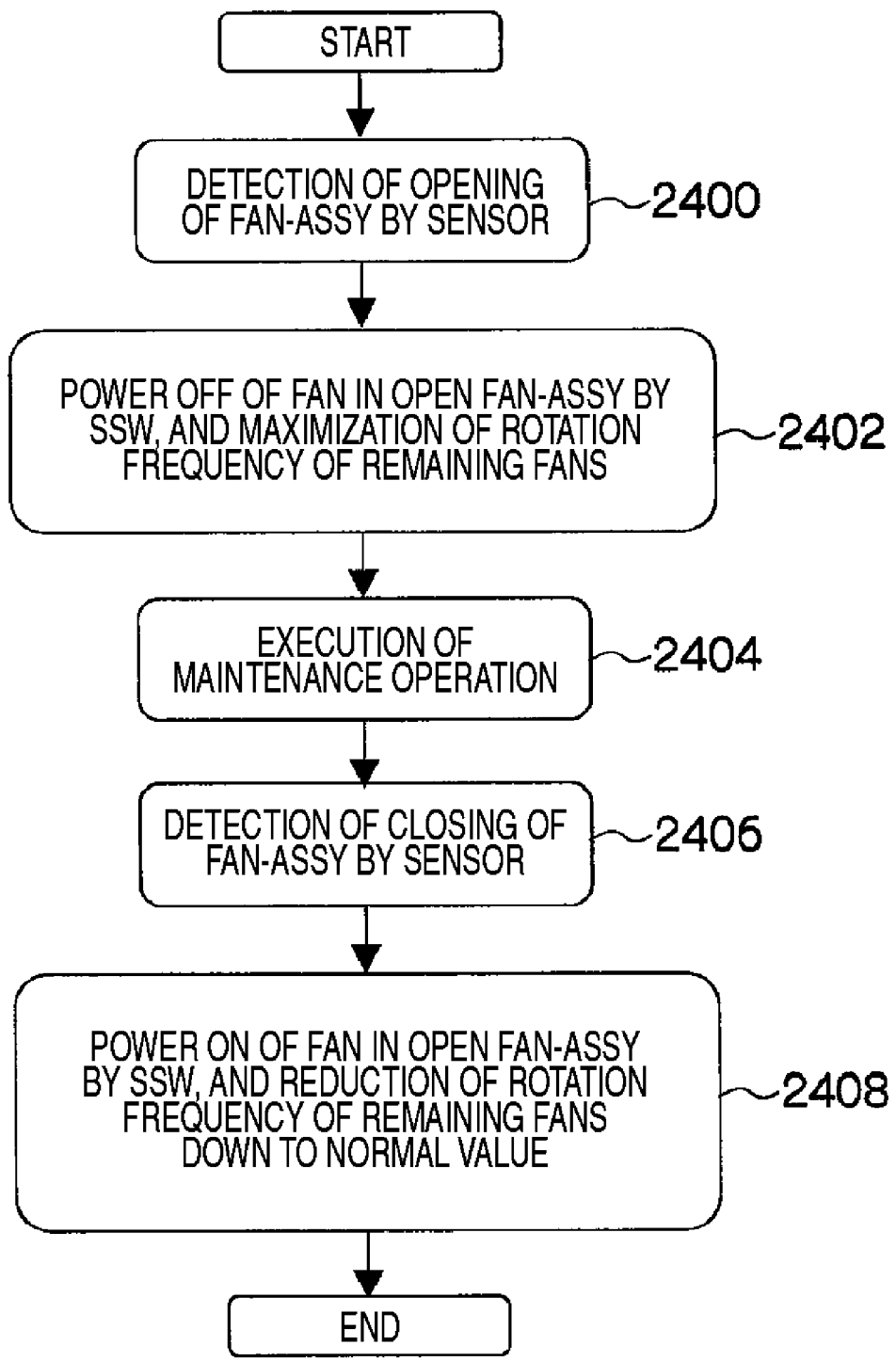
FIG. 24 is a flowchart of a process for stopping/resuming rotation of fans when a fan box is opened.

Described next is an exemplary operation of the fan package by referring to FIGS. 23 and 24. FIG. 23 is a perspective view of the rotated unit cover 61A with an enlargement of the lower end portion thereof. FIG. 24 is a flowchart of this exemplary operation. In FIG. 23, a reference numeral 612 denotes a sensor attached to the back surface of the left-side edge area 601A of the unit cover 61A directed toward the modular unit 24. A reference numeral 614 denotes a piece of hardware protruding at 90° into the modular unit from the lower left side surface of the housing on the side of the modular unit 24. When the unit cover 61A is not rotating with respect to the modular unit, the sensor 612 comes in contact with the hardware 614, and the sensor does not output a control signal to the fan package 610.

On the other hand, when the unit cover 61A is opened as shown in FIG. 23, the sensor 612 is moved away from the hardware 614, and a control signal is forwarded to the control circuit of the fans over a control signal transmission line 616. The operation at this time is described specifically by referring to the flowchart of FIG. 24. Herein, the sensor is not restrictive in type.

When detecting that the unit cover (FAN-ASSY) 61A is opened, the sensor 612 forwards a control signal to the fan package 610 (2400). The fan package then forwards the control signal to the SSW-PK. The SSW-PK forwards a control signal to the fan package through with control signal output for turning OFF the fans of its own, i.e., fans fixed to the opened unit cover. The SSW-PK also forwards a control signal for maximizing or increasing the rotation speed of any other fans, i.e., fans fixed to the closed unit cover. The control signal is directed to the fan package in charge of controlling the fans (2402).

The reasons of turning OFF the fans fixed to the opened unit cover are as below. That is, the safety for an operator is taken into consideration, and if the fans fixed to the opened unit cover remain rotating, when these fans come close to the fans of the closed unit cover, the air coming from the former fans will prevent the flow of air coming from the latter fans from being directed correctly.

As shown in FIG. 21B and FIG. 22, the operator then executes a maintenance operation to the exposed hard disk drives or others via the area of the modular unit 24 left available by the fan unit 60A, for example (2404). After the maintenance operation, when the operator closes the open unit cover 61A, the SSW-PK determines that the unit cover 61A is closed via the sensor 612 and the fan package 610. The SSW-PK thus turns ON the fans that have been stopped in operation in step 2404, starts rotating the fans at normal rotation speed, and reduces the rotation speed of the fans that are rotating at a maximum value down to a normal value (2408).

Described next is another embodiment for moving the fan unit away from the modular unit at the time of maintenance check. FIGS. 25A to 25D show this embodiment. FIG. 25A shows an exploded perspective view of this embodiment, FIG. 25B shows a perspective view of the assembly of a plurality of components, FIG. 25C shows a perspective view with an enlargement of a part (724) in FIG. 25B, and FIG. 25D shows a part in FIG. 25B viewed from the side. First of all, a description is given by referring to FIGS. 25A and B. In FIGS. 25A and 25B, the modular units 24 and 26 are not shown in their entirety, and the top plate 28-1 and the bottom plate 28-2 of the modular unit are only shown.

A reference numeral 62 denotes a fan box (frame body) for fixing the four fans. The fan box corresponds to the unit cover 61A of FIGS. 21A to 21D. This fan box is supported to be able to rotate with respect to the top and bottom plates 28-1 and 28-2. Such a support mechanism is configured as below. That is, the upper and lower surfaces of the fan box are fixed, via a sliding arm 700, to the top and bottom plates of the modular unit to be able to rotate via the sliding arm 700. The sliding arm allows the fan box 62 to move close to and away from the modular unit in the length direction of the sliding arm. An area close to one end of the sliding arm in the length direction thereof is fixed to the fan box 62, and the other end thereof is fixed to the top plate 28-1 or the bottom plate 28-2.

Figure 26:
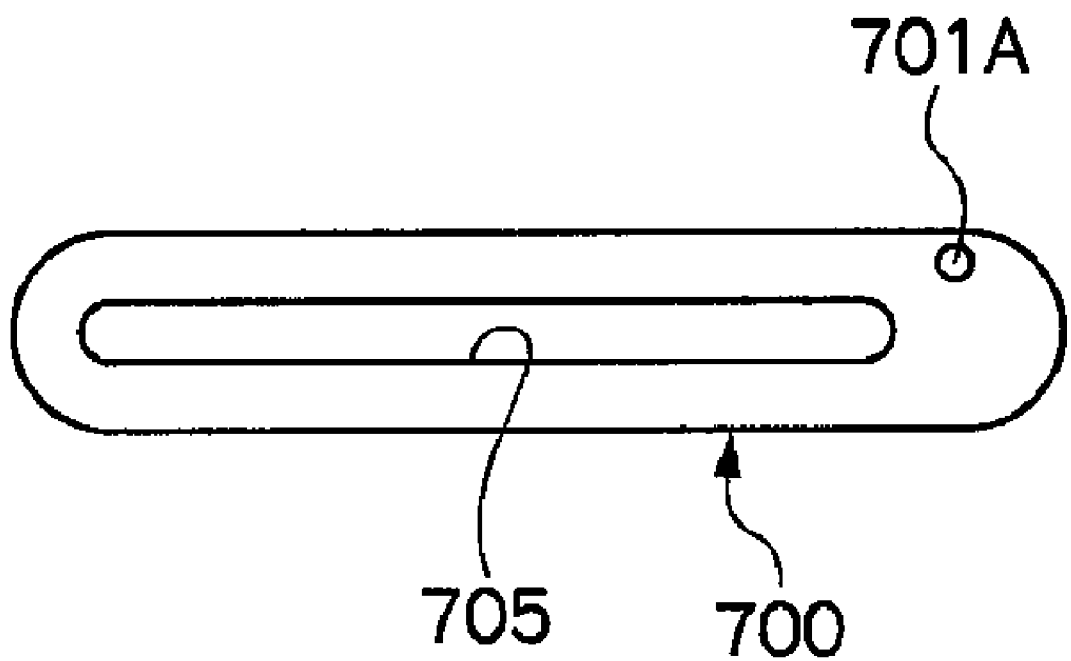
FIG. 26 is a plan view of a sliding arm.

A reference numeral 701 is a small pin fixed to the top or bottom surface to extend short and inward in a direction at an angle 90°. One end of the sliding arm is fixed to the small pin 701 to be able to rotate via a small collar 702. FIG. 26 shows a plan view of the sliding arm, and an elliptic-shaped concave groove 705 is formed at the center thereof. The sliding arm 700 allows the fan box 62 to move back and forth in the range of this concave groove. In FIG. 26, a reference numeral 701A denotes a shaft hole for insertion of the small pin 701. This shaft hole is provided to the end portion of the sliding arm on the side of the modular unit, i.e., provided off-center, and closer to one of the sides of the sliding arm. The reason thereof is left for later description.

By referring back to FIGS. 25A to 25D, the area at the end opposite to the modular unit of the sliding arm 700 is fixed to the upper or lower surface of the fan box 62 by a washer plate 706 via a screw 708 and the small collar 704. This washer plate serves to fix together the fan box 62 and the sliding arm 700, and implement and restrict the fan box to move close to and away from the sliding arm. The washer plate moves back and forth in the length direction of the sliding arm 700 together with the fan box 62 (an arrow 722 in FIGS. 25B and 25C).

The two small collars 704 going through the screw holes of the washer plate respectively come in contact with the tip ends of the concave groove 705 of the sliding arm in the length direction thereof, thereby restricting the sliding amount of the fan unit. Note that, as described above, the sliding arm 700 rotates in two directions around the small pin 701 (indicated by an arrow 720 in FIG. 25B).

With the longer distance allowed for the fan box 62 to slide along the sliding arm 700, i.e., when the sliding arm is increased in length in its entirety, the fan box can be moved further away from the modular unit, and thus is advantageous because the wider space can be left available on the front of the modular unit for maintenance use. The concern here is that, however, the sliding arm cannot remain parallel to the fan unit, thereby making unstable the ability of the fan unit to slide. In consideration thereof, the fan box 62 is fixed to the sliding arm 700 using the washer plate 706 and the small collar 704. The height of the collar 704 is set to a value derived by adding a size value of space to the thickness of the sliding arm, thereby being able to keep the fan box parallel to the fan unit with good accuracy. As such, the fan box becomes able to slide with stability.

Also with the configuration that the washer plate is fixed to the fan box at two positions using the screws 708, the washer plate can be increased in length, thereby being able to increase the strength for fixation therebetween. The fan box can be extracted along the sliding arm until the color 704 at the tip end side of the washer plate comes in contact with the tip end of the concave groove 705 in the sliding arm on the side of the fan box.

FIGS. 27A to 27I show the operation of the moving mechanism of the cooling device described by referring to FIGS. 25A to 25D, and FIGS. 27A to 27E are perspective views of the modular unit 24 viewed from the front during the operation. FIG. 27F is a front view of the modular unit in the state shown in FIG. 27A, and FIGS. 27G o 27I are front views of the modular units in the states shown in FIGS. 27C to 27E, respectively. FIG. 27A shows right and left fan boxes 62A and 62B being closed with respect to the modular unit 24. As shown in FIG. 27B, on the front of the fan box, a protection cover 62-1 is provided to the modular unit. The protection cover 62-1 is the one including a protection area 62-2 for shielding a space between the fan box and the housing of the modular unit.

The operator removes the protection cover 62-1 from the modular unit 24. FIG. 27B shows the protection cover provided to the front left side of the modular unit. As shown in FIG. 27C, by removing the protection cover 62-1 as such, the area denoted by X in FIG. 27G is exposed, and the operator can perform maintenance on the SSW-PK located in this area (insertion of substrate and accessing to cable). A reference numeral 740 denotes a direction of extracting the substrate of the SSW-PK from the modular unit via the exposed area denoted by X.

As shown in of FIG. 27D, the operator rotates the fan box 62A in the direction of an arrow 742. As described above, the fan box 62A rotates about the sliding arm 700 on the side of the modular unit. When the fan box 62A is rotated as such, as shown in FIG. 27H, the hard disk drives 15 located in the area denoted by a reference numeral 746 are exposed, thereby enabling the operator to perform maintenance on the hard disk drives 15 opposing this area. On the other hand, the thickness of the fan box 62A becomes an obstacle, and thus a portion overlaying the area of a reference numeral 747 is not available for maintenance on the hard disk drives 15.

In consideration thereof, as shown in FIG. 27E, when the fan box in the state of 4 is moved to slide in the direction of an arrow 744, the area 747 is eliminated, and the area on the front of the modular unit (reference numeral 748) is entirely left available for use. As such, any portion of the front area of the hard disk drives 15 that has been blocked by the area denoted by the reference numeral 747 and thus remained not exposed can be made available for use so that the hard disk drives become all available for maintenance. Note that, in FIG. 26, because the shaft hole of the sliding arm 700 serving as the rotation center is provided closer to the end portion of the modular unit, the fan unit can be rotated farther with respect to the modular unit without changing the distance available for the fan boxes 62A and 62B, i.e., without increasing the length of the sliding arm.

Figure 28:
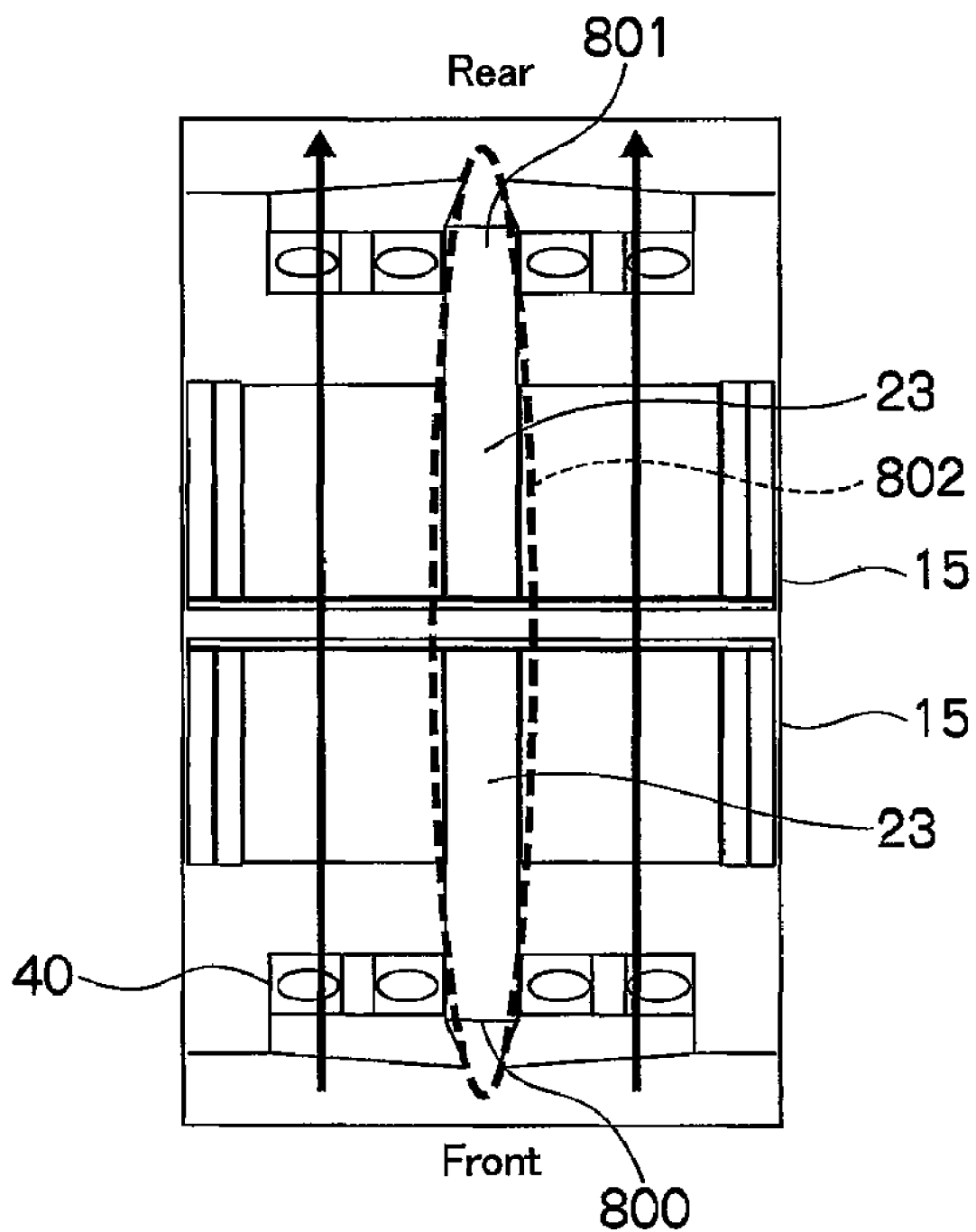
FIG. 28 is a general plan view of a pair of modular units for illustrating the configuration of enabling a supply of outside air into the power supply unit.

Described next is an embodiment in which the cooling performance is enhanced with respect to a power supply unit 23. As described above, for increasing the cooling performance of the power supply unit, the power supply unit is protruded toward the front side of the modular unit more than the hard disk drives, and thus the protruded side surfaces of the power supply unit are exposed to outside air. The configuration of enabling a supply of outside air into the power supply unit is not described above. FIG. 28 shows a modified type of embodiment for such improvement. FIG. 28 is a diagram simply showing a pair of modular units, showing only plan surfaces thereof. In the drawing, arrows each indicate the flow of outside air for supply into the modular units. The front surface of the power supply unit on the front side is provided with a ventilation port 800, and the front surface of the power supply unit 23 on the rear side is provided with a ventilation port 801. With this configuration, because the outside air from the fans is not directed to the power supply unit, the outside air cannot be guided into the power supply unit.

Figure 29:
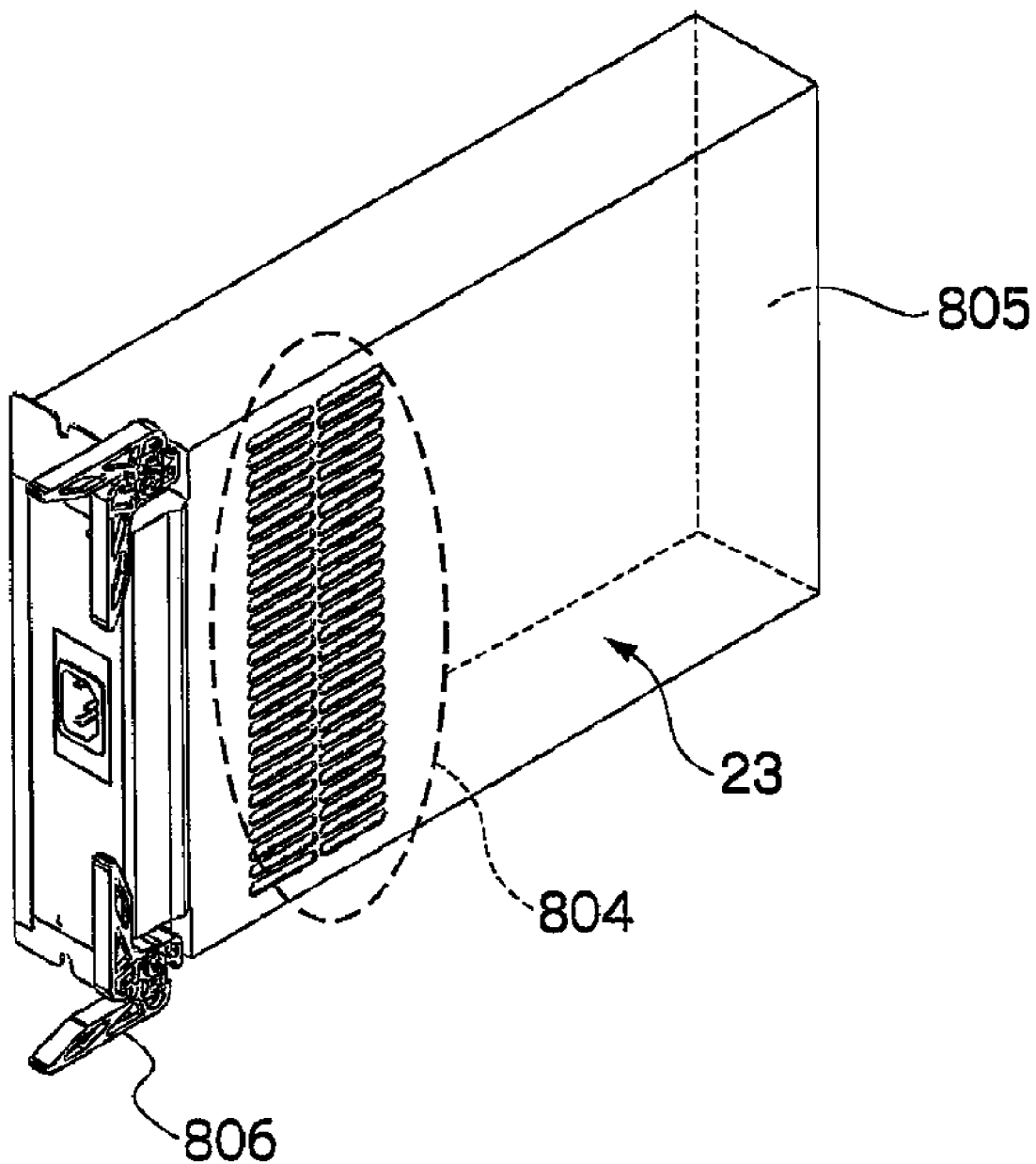
FIG. 29 is a perspective view of the power supply unit formed with an aperture section serving as a plurality of air-intake ports on the right side surface of the power supply unit.

In consideration thereof, as shown in FIG. 29, an aperture section 804 is provided for use as a plurality of air-intake ports on the right side surface of the power supply unit, thereby guiding the outside air from the side surface of the power supply unit. This aperture section 804 serves also as air-exhaust ports for exhausting the outside air provided into the power supply unit. Note that a rear surface side 805 of the power supply unit is left open as is the power supply unit located thereabove or therebelow along the flow of outside air. This is for causing the outside air coming from the aperture section 804 to flow into the power supply units, and for causing a supply of the outside air to flow into the power supply unit on the lower side. Note that, in FIG. 29, a member denoted by a reference numeral 806 is a lever for use by an operator to insert the power supply units into the modular unit, or to pull out the power supply units from the modular unit.

Figure 30:
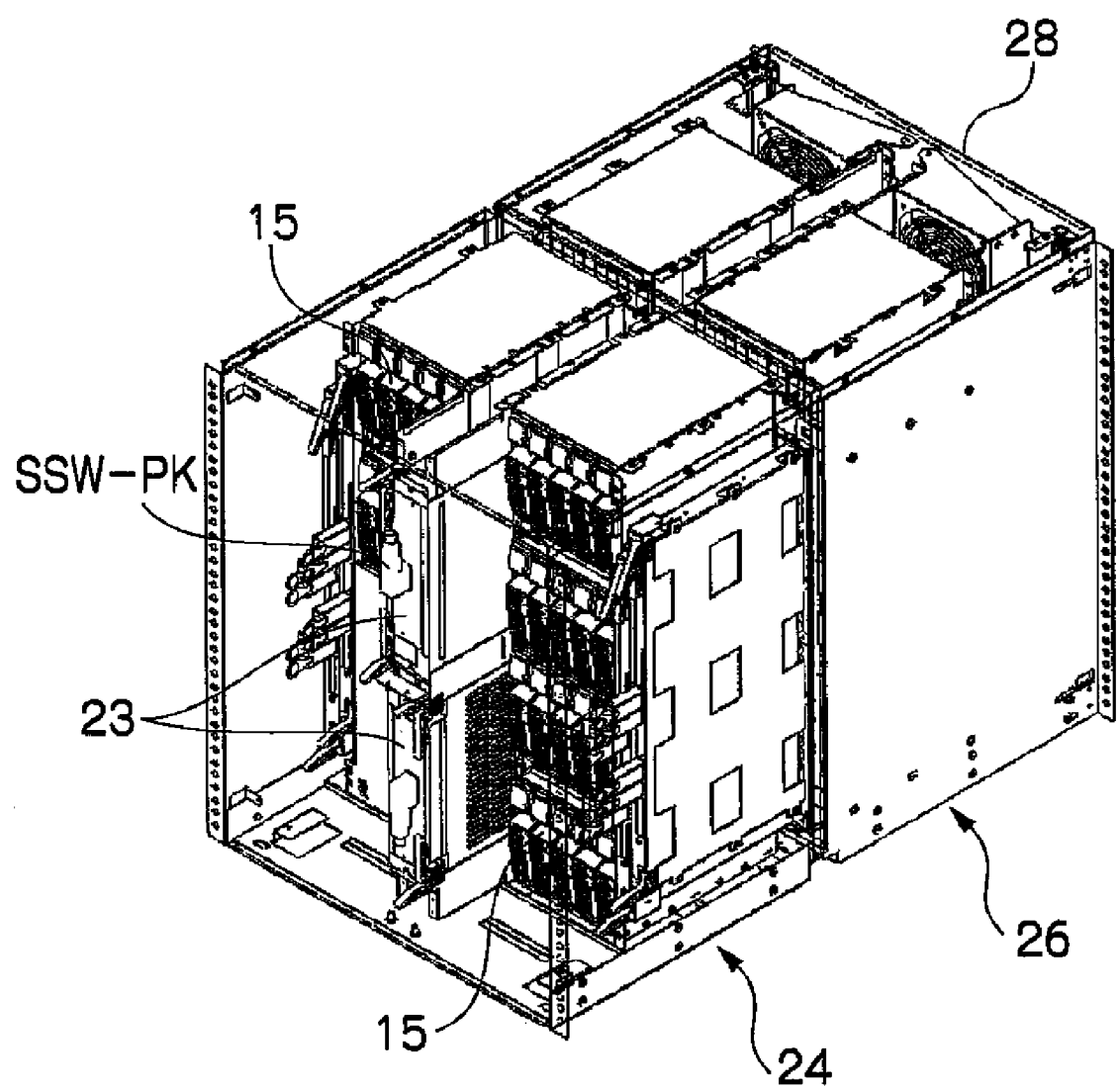
FIG. 30 is a front perspective view of a pair of modular units each provided with the power supply unit of FIG. 29.

FIG. 30 is a perspective view of a pair of modular units 24 and 26 viewed from the front, and the modular units 24 and 26 are each provided with a pair of upper and lower power supply units 23. As is known from the drawing, the power supply unit on the lower side is disposed in the modular unit in such a manner that the aperture section 804 thereof is located on the right side when the modular unit 24 is viewed from the front, and the power supply unit on the upper side is disposed in the modular unit in such a manner that the aperture section 804 is located on the left side. The pair of upper and lower power supply units (not shown) disposed in the modular unit 26 is similarly disposed in the modular unit 26 in that their aperture sections are opposed to each other.

Figures 31A, 31B, 31C:
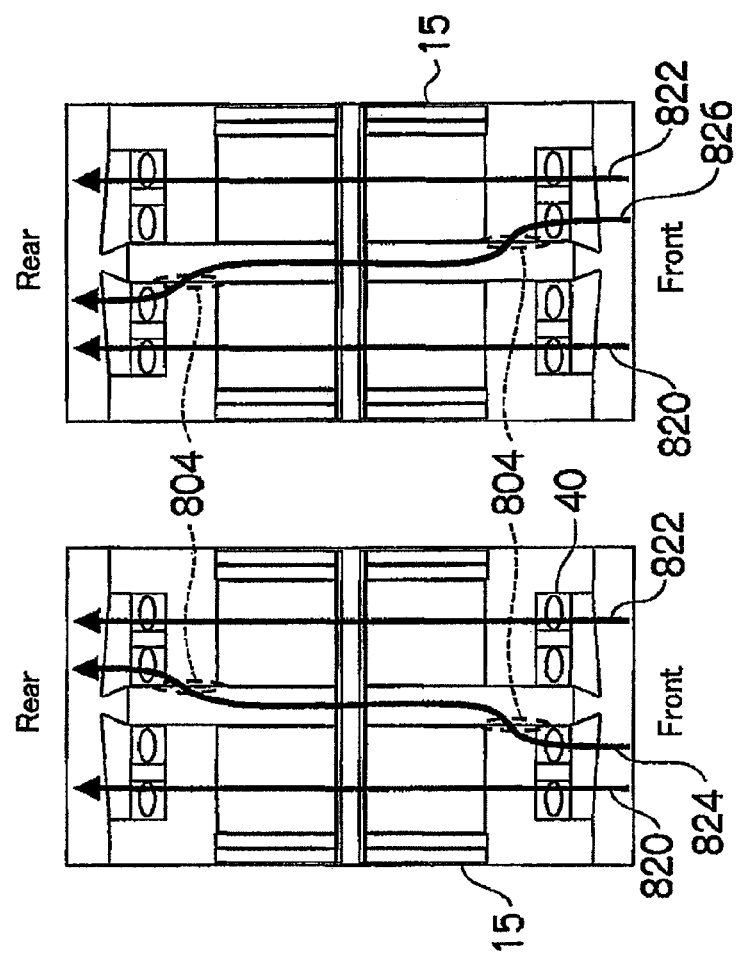
FIGS. 31A to 31C are diagrams showing the flow of outside air in the power supply unit, specifically.

FIGS. 31A to 31C illustrate the flow of the outside air with respect to the power supply units. In FIG. 31A is a perspective view of a pair of modular units in their entirety being opposed to each other in a general-purpose chassis, FIG. 31B is a general plan view of an area enclosed by a line II in FIG. 31A, and FIG. 31C is a general plan view of an area enclosed by a line III in FIG. 31A. In FIGS. 31B and 31C, reference numerals 820 and 822 each denote a flow of outside air coming from the fans 40 toward the front area of the hard disk drives 15. A reference numeral 824 denotes an air-flow path of the outside air to be supplied from the fans into the power supply units through the aperture section 804 on the left side surface of the power supply unit on the upper side. The outside air is then exhausted from the aperture section 804 on the right side surface of the power supply unit on the lower side. A reference numeral 826 denotes a flow of outside air to be supplied from the aperture section 804 on the right side surface of the power supply unit on the upper side. The outside air is then exhausted from the aperture section 804 on the left side surface of the power supply unit on the lower side.

Such a configuration enables a supply of outside air into the power supply units on the upper and lower sides in view of the outside airflow, and achieves the effects of cooling not only the hard disk drives but also the power supply units without fail.

Figure 32A:
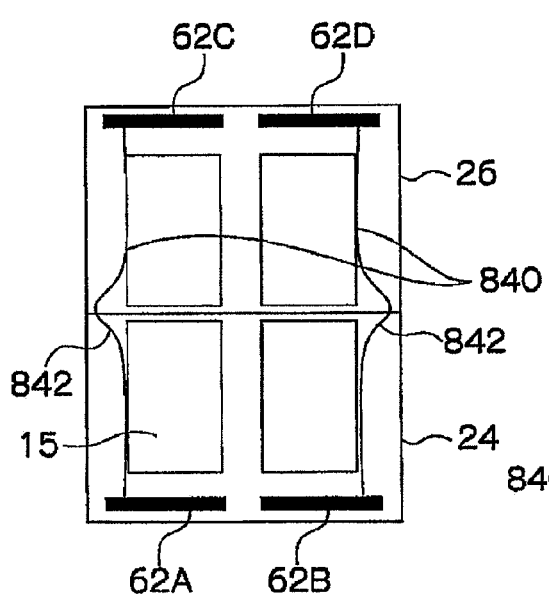
FIGS. 32A and 32B are general plan views of a pair of modular units in an embodiment considering open/close control of the fan unit over the modular units, and specifically
Figure 32B:
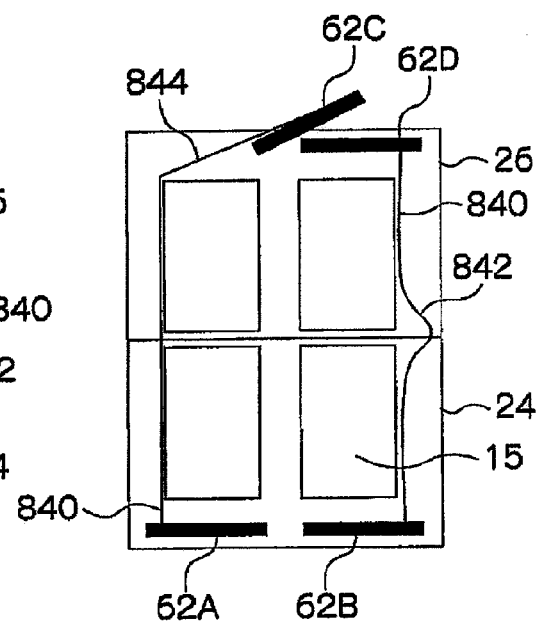

Described next is an embodiment considering the control over the modular unit of the fan unit (fan box or fan cover) in terms of opening and closing. FIGS. 32A and 32B are general plan views of a pair of modular units in this embodiment. FIG. 32A shows a plan view of the fan box (unit cover) not being opened, and FIG. 32B shows a plan view of the fan box being opened. As shown in FIG. 32A, the fan box 62A located on the left side when the modular unit 24 is viewed from the front is connected with a fan box 62C located on the right side when the modular unit 26 is viewed from the front by coupling means 840 such as wire. The fan box 62B is coupled to a fan box 62D in a similar manner. A reference numeral 842 denotes an allowance of the wire, i.e., curved portion.

Assuming that the fan box 62C in the state of 1 is opened as shown in 2, as denoted by a reference numeral 844, the allowance 842 of the wire 840 is pulled toward the fan box 62C, thereby generating the tension to the wire 840. By this tension, the wire 840 coupled to the fan box 62C restricts the opening of the fan box 62A. As such, the reason of restricting, when anyone of the fan boxes is opened, the opening of the remaining fan box(s) is that if a plurality of fan boxes are opened all at once, there is a possibility of reducing the supply level of the outside air into the modular units. Thus, such a restriction is applied to eliminate this possibility.

That is, such restriction is applied to eliminate a possibility that, when the fan boxes 62A and 62C are opened at the same time, the outside air therebetween is prevented from being directed into the modular units, and thus a plurality of hard disk drives disposed along the flow of outside air cannot be cooled at all. Accordingly, the fan boxes 62A and 62C are so configured as not to be opened at the same time, and this is the same to the fan boxes 62B and 62D.

Figure 33A:
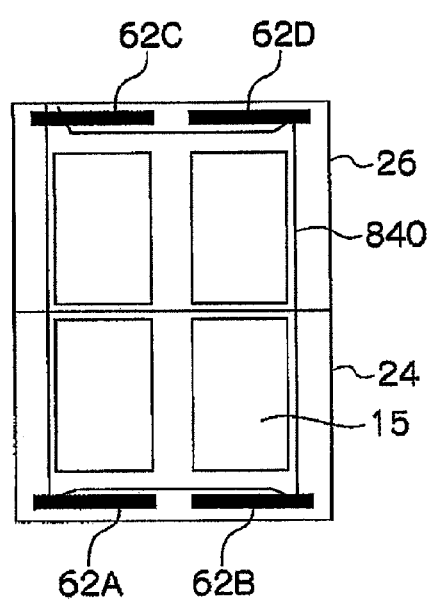
FIGS. 33A and 33B are plan views of an embodiment related to a modified example of FIGS. 32A and 32B.
Figure 33B:
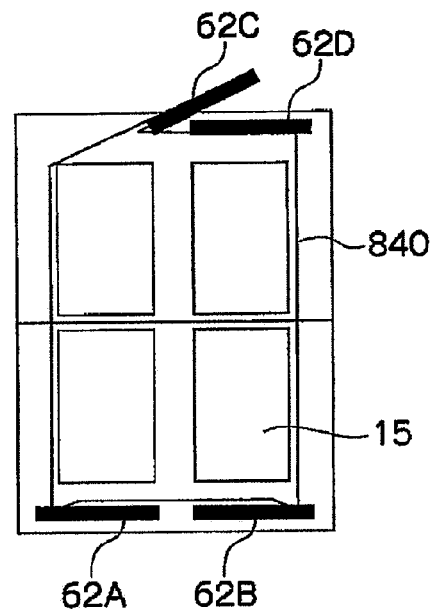

FIGS. 33A and 33B are modified examples of FIGS. 32A and 32B, respectively. In this example of FIGS. 33A and 33B, as shown in FIG. 33A, all of the fan boxes 62A to 62D are coupled together by a single piece of wire 840, and as shown in FIG. 33B, one of the four fan boxes is allowed to be opened. Note that, the wire 840 of FIGS. 33A and 33B is provided with an allowance of a level for opening one of the fan boxes. FIG. 35 is a perspective view of the fan box viewed from the front for illustrating the configuration of fixing the wire 840 to the fan box, i.e., unit cover. The fan box is formed with a small hole 846 for the wire 840 to go through.

Figure 36:
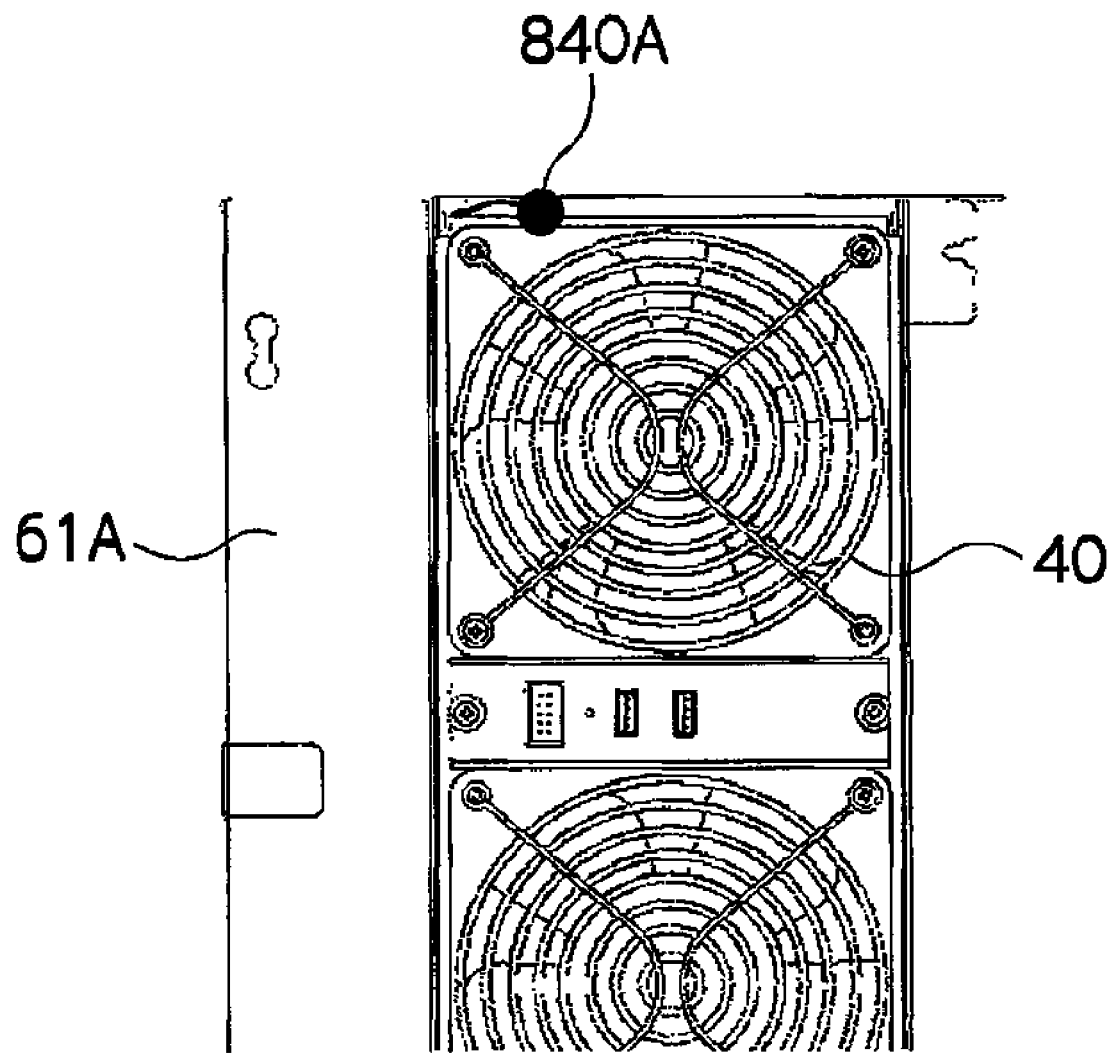
FIG. 36 is a front view of the fan box fixed with the wire.

After the wire 840 goes through the small hole 846, a ball 840A is fixed at the tip end of the wire 840, whereby the wire 840 can be fixed to the fan box 61A without falling off from the small hole 846. FIG. 36 shows the front view of the fan box in the state that the ball 840A of the wire 840 is fixed to the small hole 846.

Figure 37:
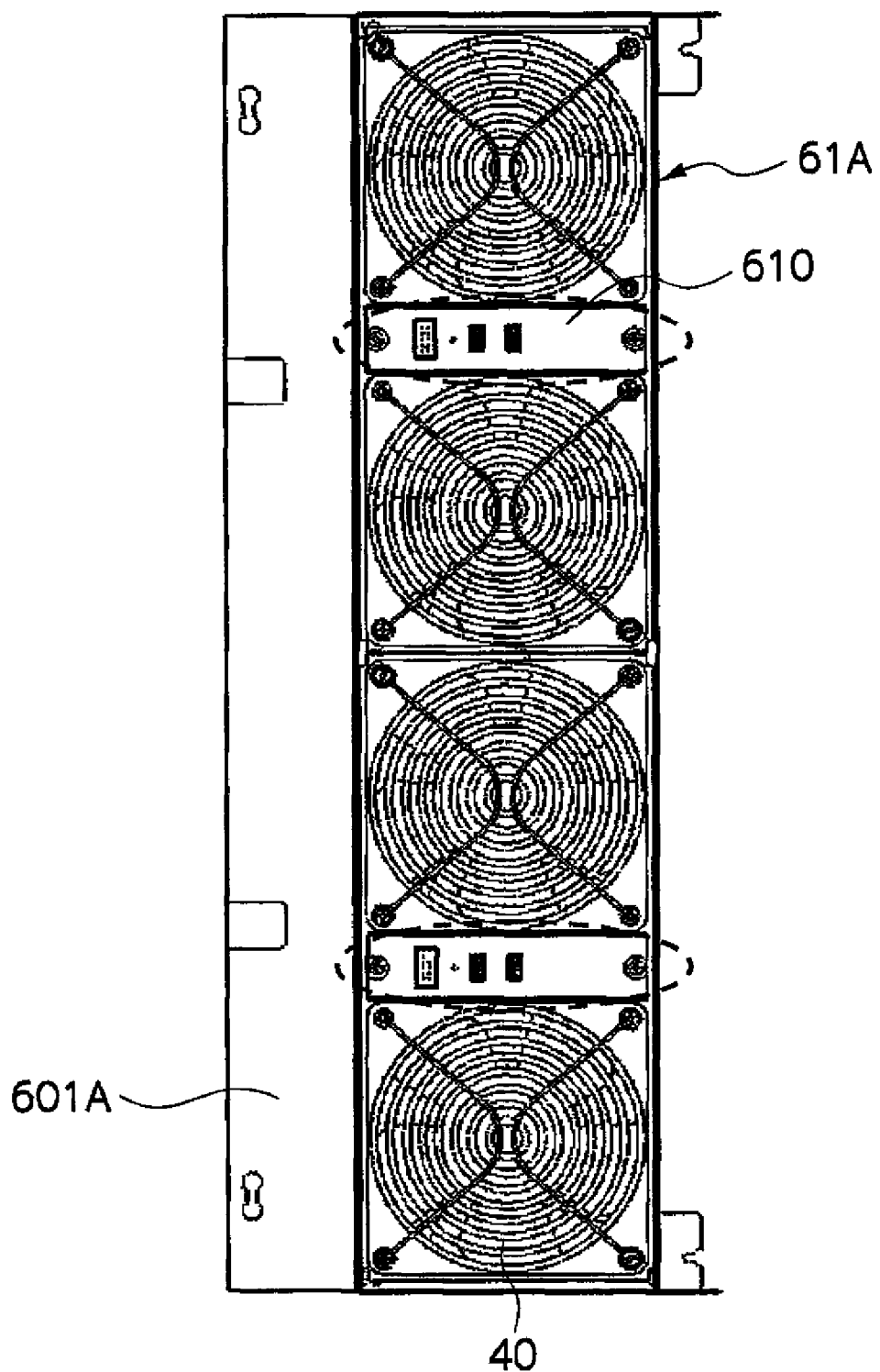
FIG. 37 is a front view of the fan unit in which the fans are fixed to the unit cover.
Figure 38:
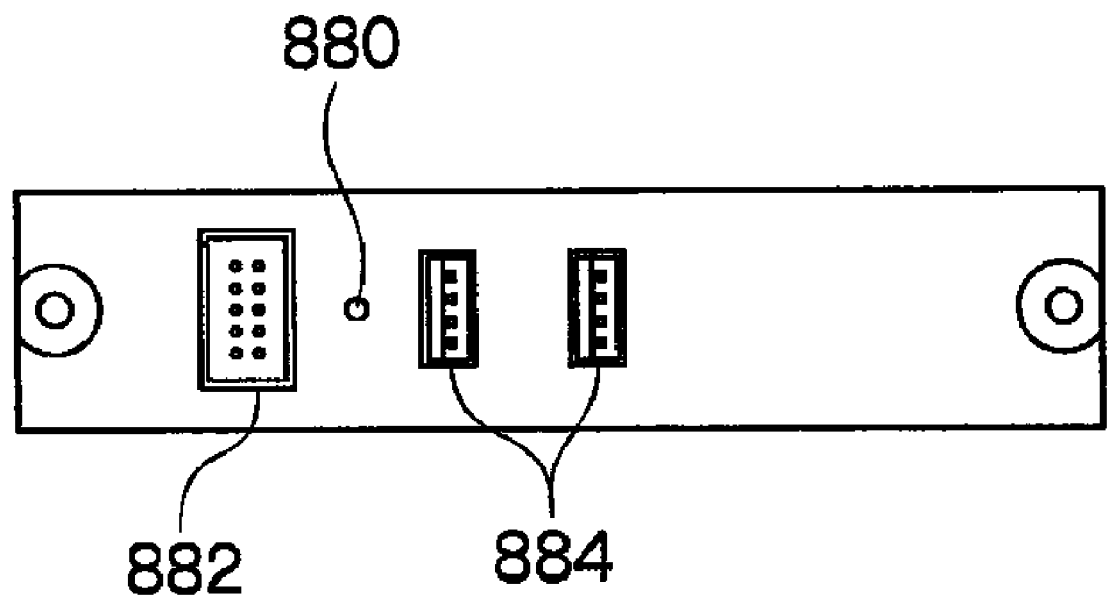
FIG. 38 is an enlarged view of a fan package viewed from the front.
Figure 39:
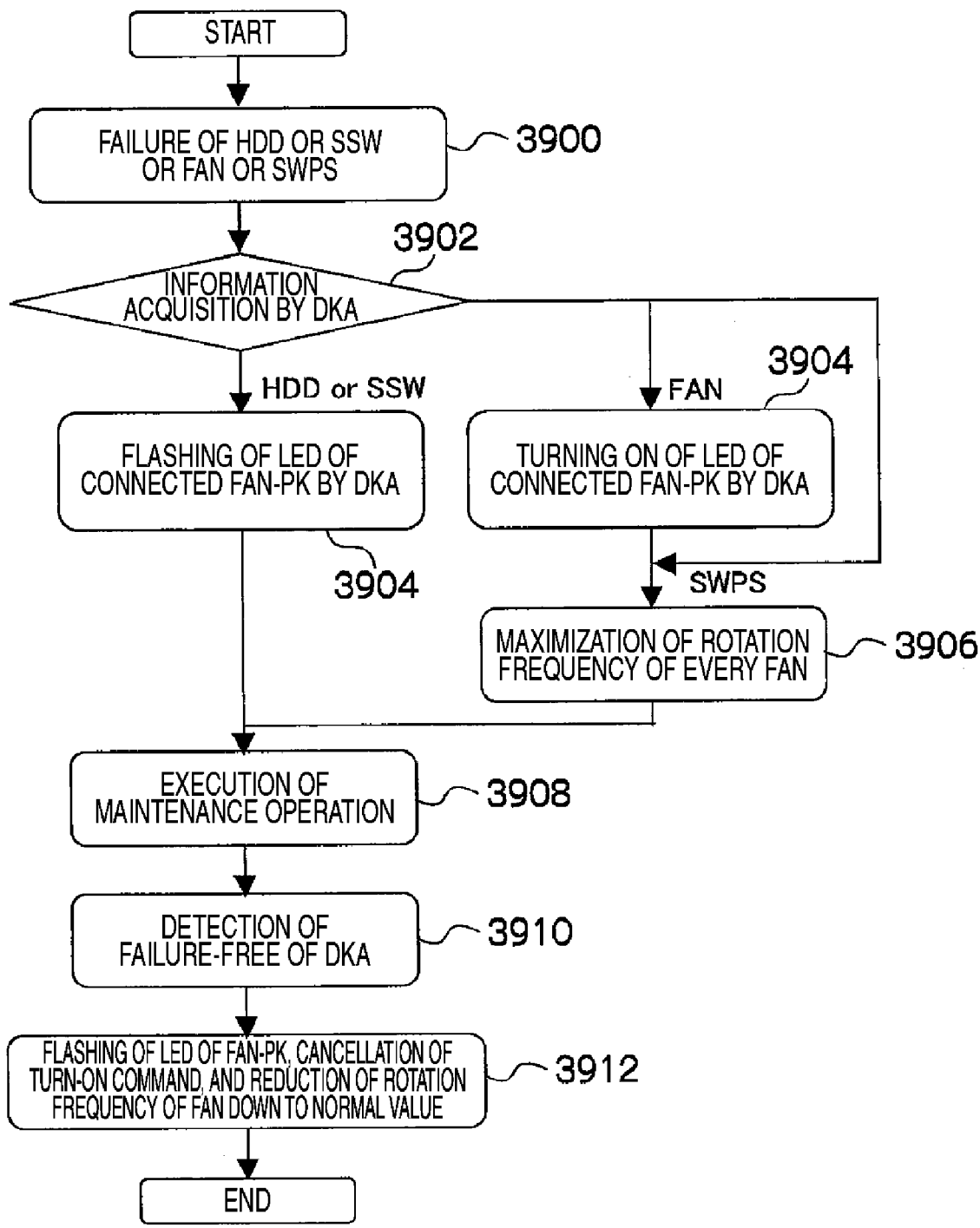
FIG. 39 is a flowchart of a process for controllably turning ON an LED.

FIG. 37 is a front view of a fan unit in which the fans 40 are fixed to the unit cover 61A. On the front surface of the fan unit, the above-described fan packages 610 are provided at two positions in the vertical direction. FIG. 38 is an enlarged view of the fan package 610 viewed from the front. A reference numeral 882 denotes a connector for connection with a cable from the SSW-PK, and a reference numeral 884 denotes a connector for connection with a cable from the fans. A reference numeral 880 denotes an LED (Light-Emitting Diode) for notifying a user of any failure occurred to the hard disk drives, the fans, the SSW-PK, and an SWPK (Switching Power Supply: power supply unit). FIG. 39 is a flowchart of a process for controllably turning ON the LED.

In step 3900, a controller of the DKA detects whether any failure occurred to the hard disk drives, the SSW-PK, the fans, or the SWPS. The DKA-PK receives, at regular intervals, at least a status signal from the hard disk drives, for example, and from the status signal, the DKA-PK determines where the failure occurred, i.e., in the hard disk drives, the fans, or the SWPS (3902). In step 3904, when the DKA-PK determines that the hard disk drives and/or the SSW are under abnormal conditions, the LED 880 is flashed.

On the other hand, when the fans are determined as being under abnormal conditions, the LED is remained ON (step S3904). When the SWPS is determined as being under abnormal conditions, the fans are all maximized in rotation speed (3906). The fans are always monitored in terms of rotation speed and the rotation frequency, and when the detected value falls out of a range of specific threshold value, an alarm signal is forwarded to high-end control means (to the SSW via the fan package). When any of the fans is determined as being under abnormal conditions, the remaining failure-free fans are maximized in load for rotation. When the failure-occurred fan(s) are through with maintenance, the load of the failure-free fans is reduced down to a normal value. When a power supply is determined as being under abnormal conditions, such a procedure is similarly executed. In this example, one platter is connected with two power supply units.

When one of the two power supply units is out of order, the remaining power supply unit takes charge of making a power supply to the fans and the hard disk drives with a load (power) higher than usual. As a result, the amount of heat generation by the power supply is increased, and thus the fans are operated with the maximum load, and the remaining failure-free power supply unit is mainly cooled down.

Thereafter, the operator performs maintenance on any component determined as being under abnormal conditions (3908). When the DKA-PK is detected as being failure free, the DKA-PK or the SSW-PK turns OFF the LED or stops flashing thereof, and reduces the rotation speed of the fans down to a normal value. As such, when any component is determined as being under abnormal conditions, e.g., hard disk drives, the fan package of the fan unit located in the vicinity of the component notifies the user of such abnormality by turning ON or flashing the LED, the operator can know which fan unit is to be left open for maintenance purpose.

When detecting that any of the fans is under abnormal conditions, the SSW-PK notifies the operator of the abnormality via the LED, whereby the operator can correctly replace the failure-occurred fan(s) with a normal fan(s). Alternatively, the SSW-PK may stop the operation of the failure-occurred fan(s) immediately. If this is the case, the rotation speed of a part of or all of the remaining failure-free fans may be increased, e.g., up to the maximum possible value. Preferably, the failure-free fans to be increased in rotation speed may be those in the downstream or upstream of the failure-occurred fan(s) and those to be exposed by the same outside airflow.

Figure 40:
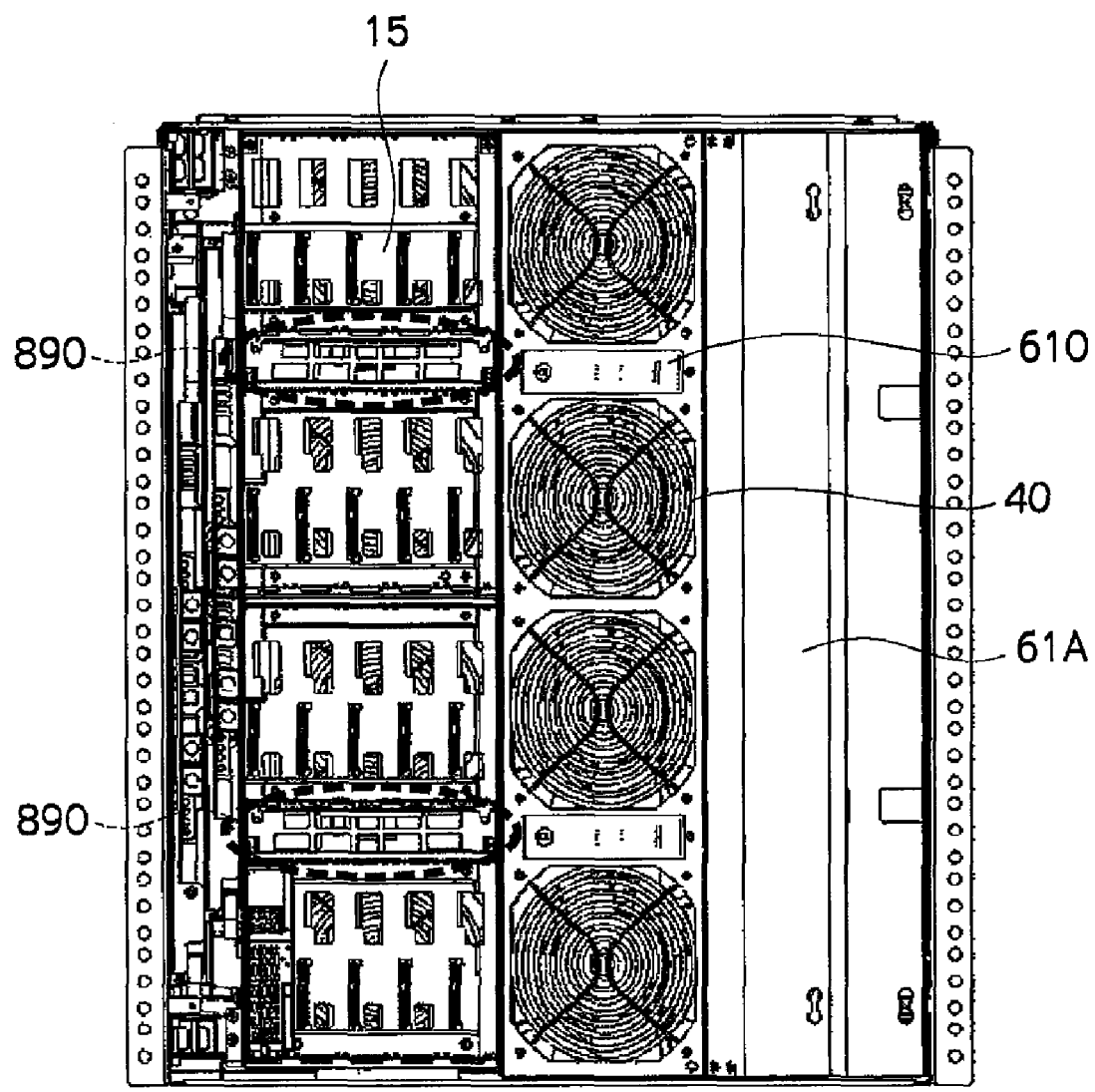
FIG. 40 is a front view of the modular unit in which the fan unit is opened.

FIG. 40 shows the front view of the modular unit in which the fan unit is opened. On the front area of the DKU in this modular unit, an LED package 890 is provided for indicating the state of the hard disk drives. Because there is the fan unit 60 on the front area of the DKU box in the modular unit, the operator cannot see a status display of the hard disk drives from the outside of the DKU box. In consideration thereof, the LED package 890 is provided on the surface of the DKU box, and as shown in the flowchart of FIG. 39, when the operator opens the cover as is recognized that any of the hard disk drives is under abnormal conditions by the LED 610 provided on the surface of the fan unit cover 61A, he or she can identify which of the hard disk drives is under abnormal conditions by checking the LED display of the LED package 890 on the DKU box.

Figure 41:
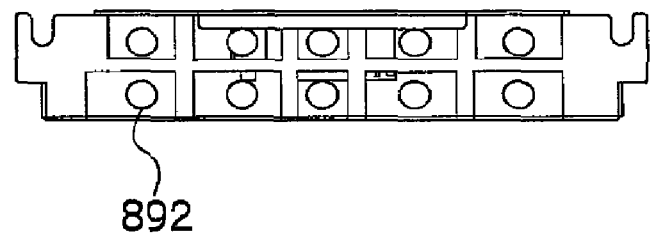
FIG. 41 is an enlarged front view of an LED package including a plurality of LEDs.

In the RAID device, disk insertion and extraction on a hard disk drive basis is essential, and informing the operator of which HDD is supposed to be inserted or extracted at the maintenance is important. FIG. 41 shows an enlarged view of the LED package including a plurality of LEDs 892. The LEDs and the HDDs have a one-to-one relationship. Any LED corresponding to the hard disk drive being under abnormal conditions is turned ON or flashed.

Figure 42:
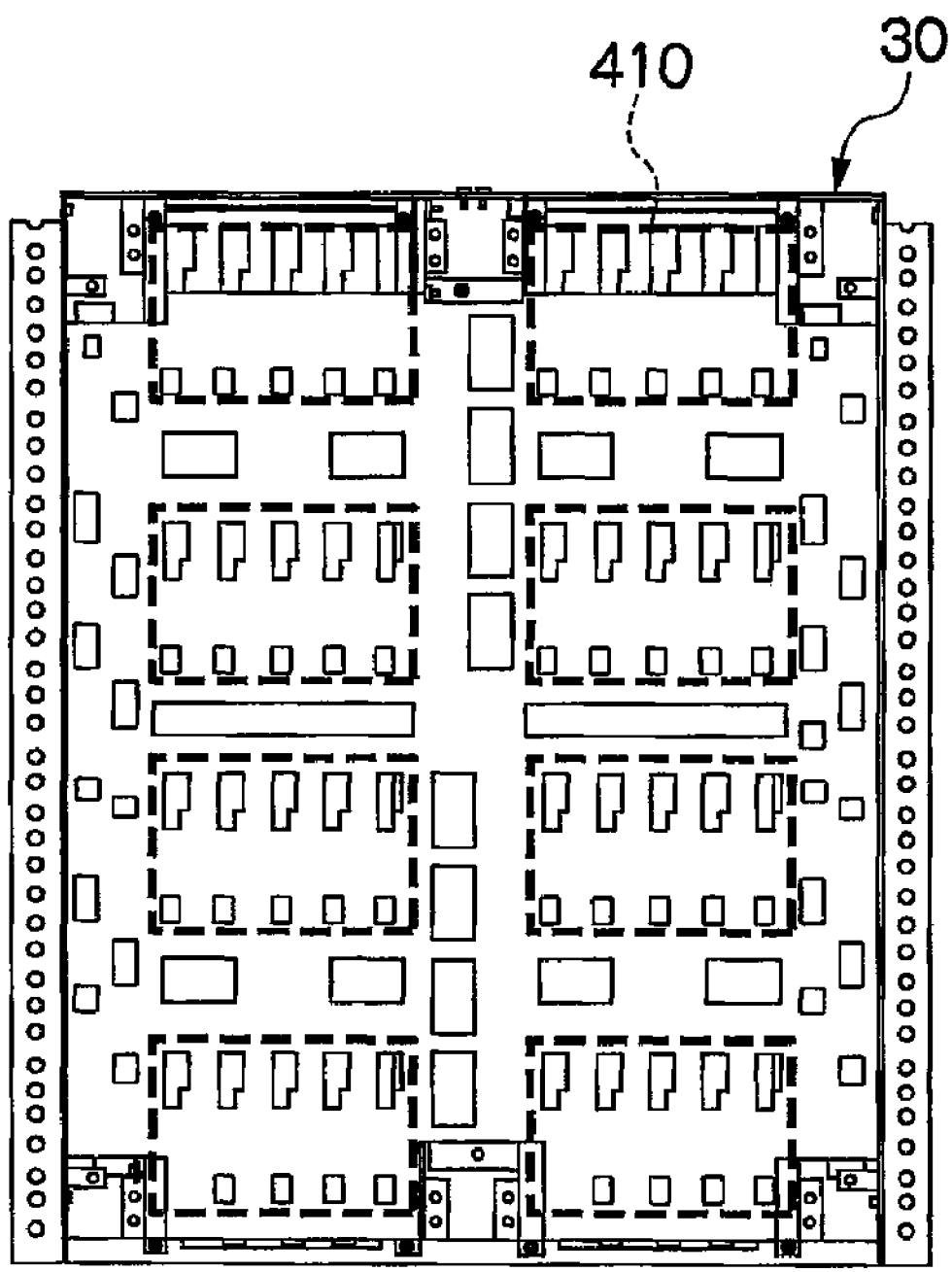
FIG. 42 is a front view of a platter.

Described next is an embodiment of implementing the cooling configuration described by referring to FIGS. 13A and 13B. FIG. 42 shows the front view of the platter. Into an area enclosed by dotted lines with a reference numeral 410, the outside air is guided for cooling the hard disk drives. With such a platter, however, the outside air used for cooling the hard disk drives on the front side of the modular unit is merely directed to the hard disk drives on the rear surface side as it is.

Figure 43:
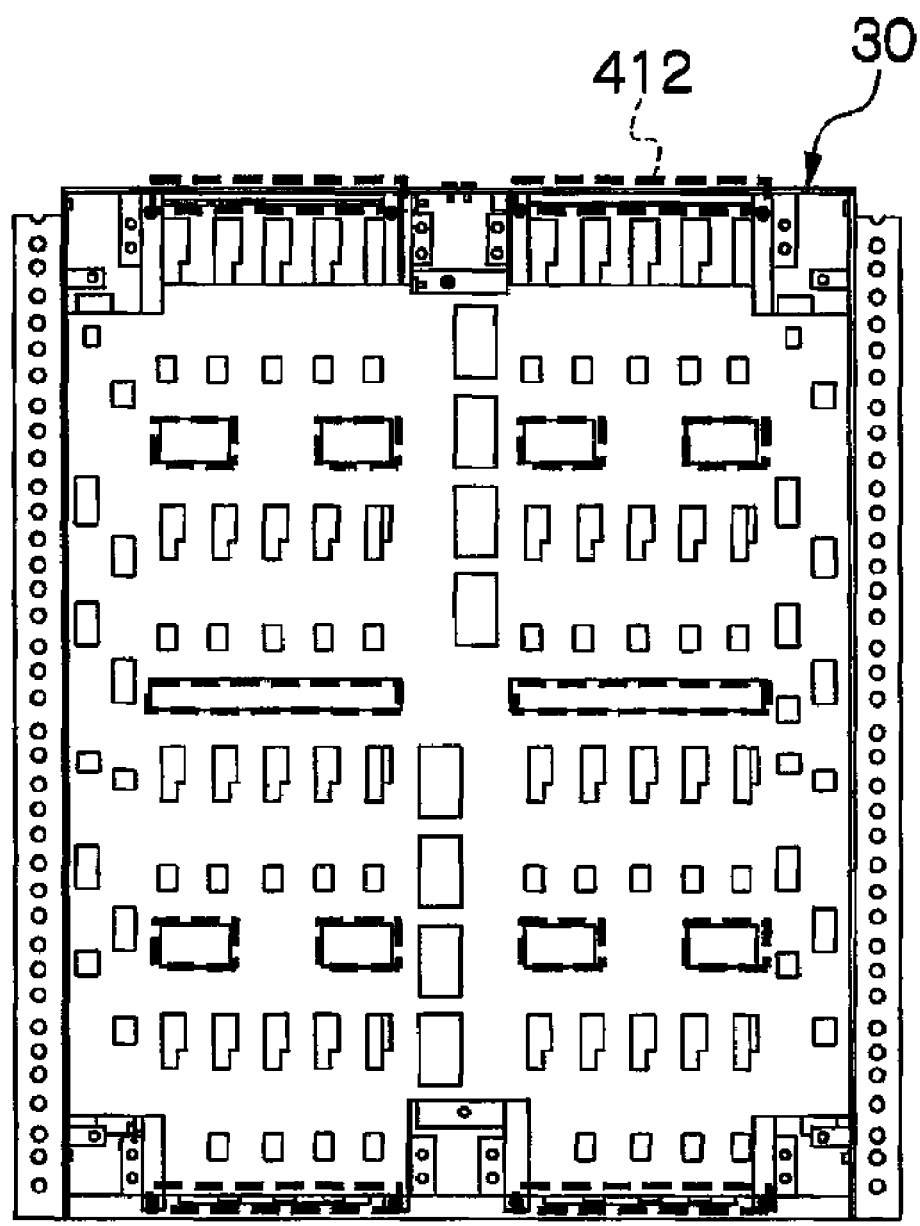
FIG. 43 is a front view of the platter provided with newly-formed aperture ports.

In consideration thereof, to a platter of FIG. 43, an area enclosed by dotted lines with a reference numeral 412 is formed with a new aperture. In this area formed with such a new aperture, there is no hard disk drive, and the outside air is thus directly guided to the modular unit on the rear side without going through the hard disk drives.

Figure 44:
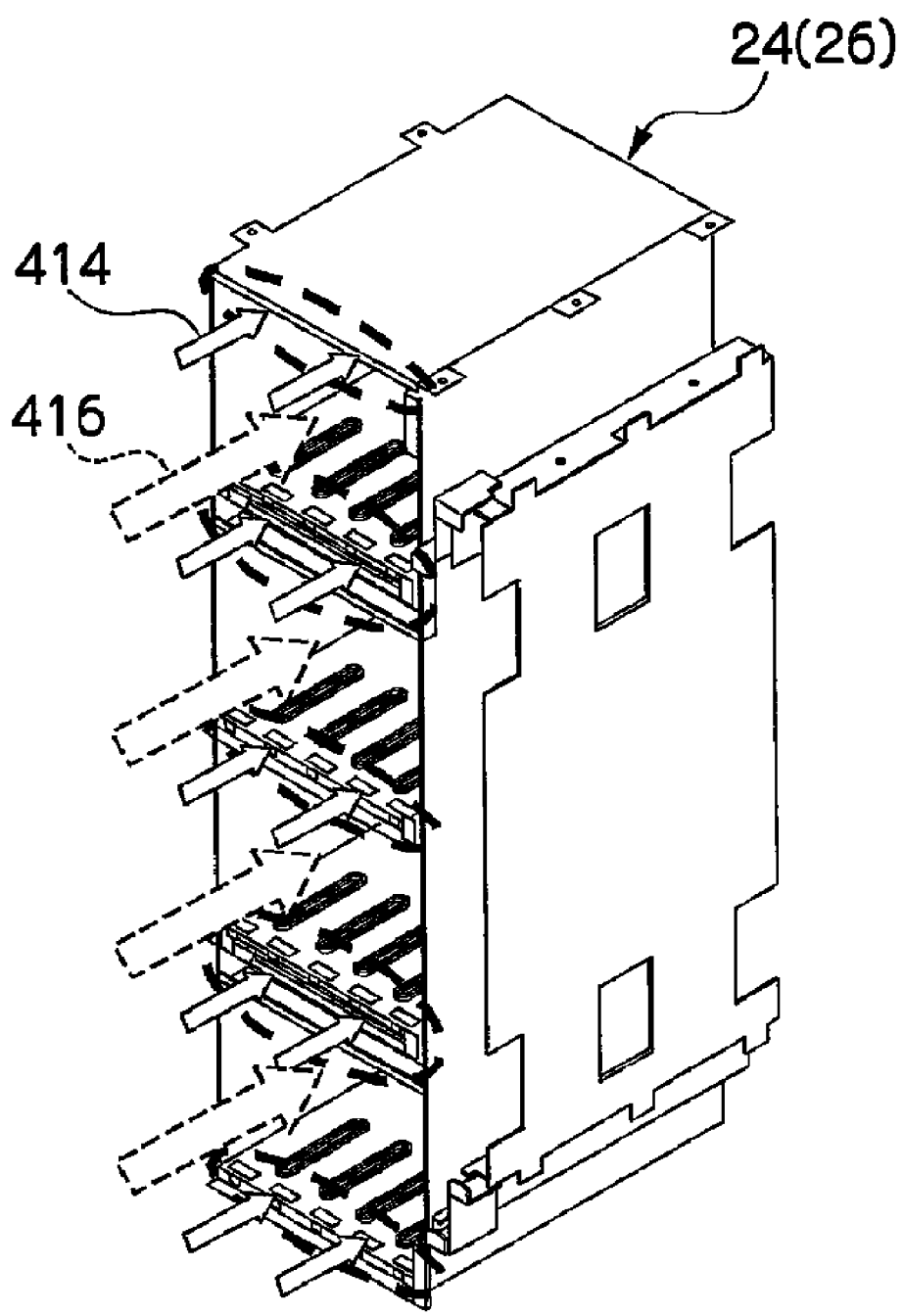
FIG. 44 is a front perspective view of the modular unit showing a flow of outside air for a supply into the modular unit.
Figure 45:
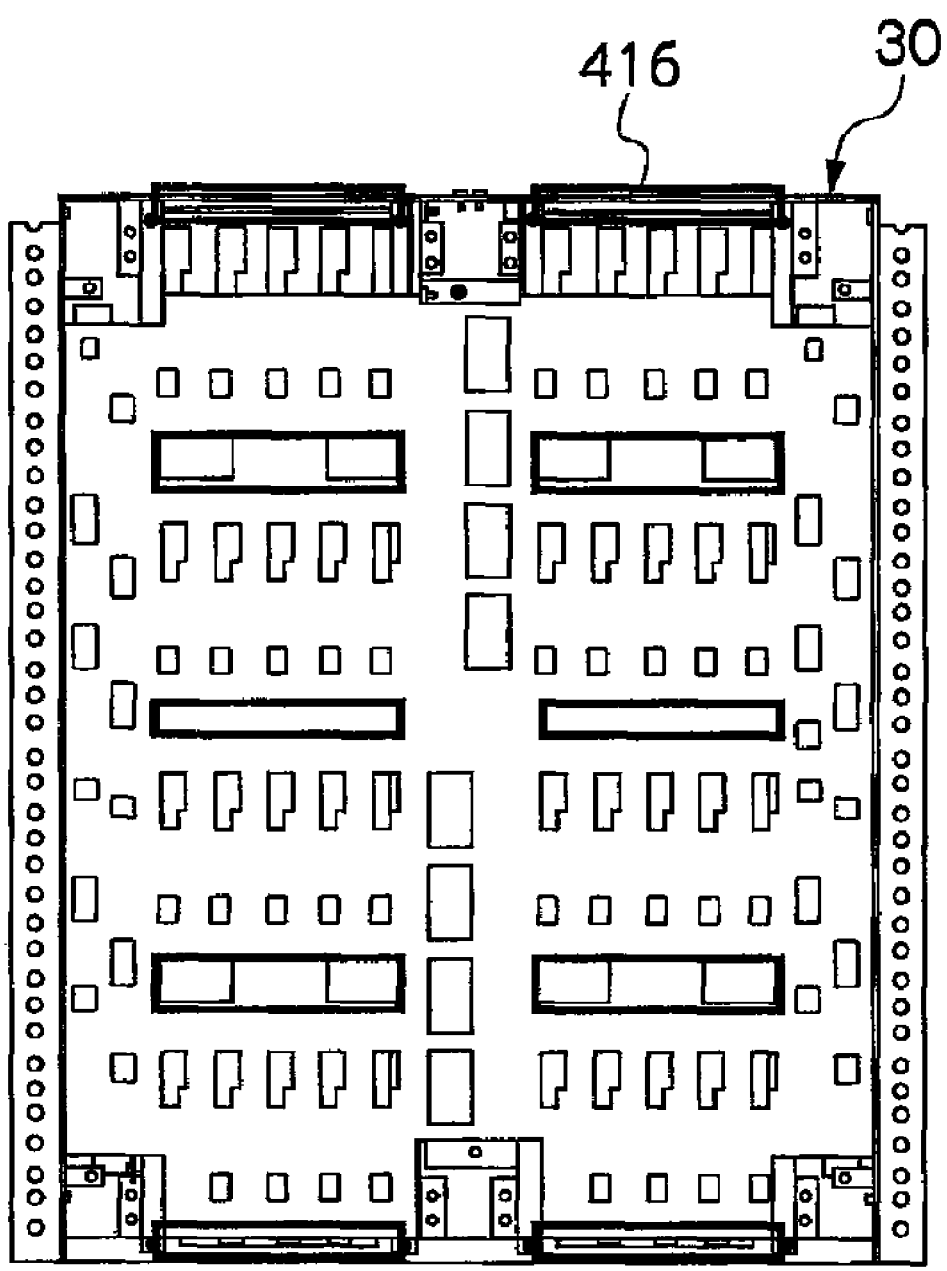
FIG. 45 is a front view of a platter on the rear surface side.

FIG. 44 is a front perspective view of the modular unit, showing a flow of outside air for a supply into the modular units. A reference numeral 414 denotes a flow of outside air directed to the hard disk drives on the rear side of the modular unit by passing through the platter 30 without going through the hard disk drives on the front side. A reference numeral 416 denotes a flow of outside air directed to the hard disk drives on the rear side after passing through the hard disk drives on the front side. For the purpose of allowing the outside air 414 to be mixed with the outside air 416 immediately before reaching the hard disk drives on the rear side, as shown in FIG. 45, with the platter on the rear side, the aperture corresponding to the reference numeral 412 (FIG. 42) is shielded by a filler.

Figure 46:
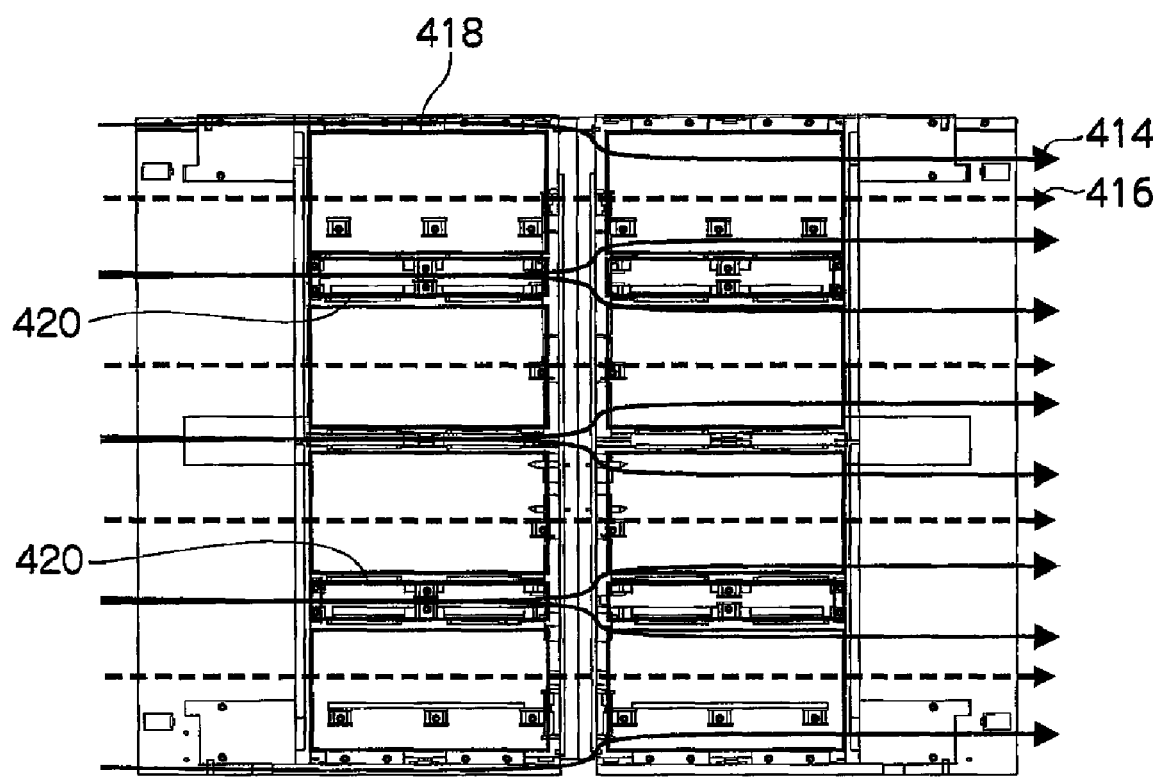
FIG. 46 is a general side view of the modular unit.

FIG. 46 is a general side view of the modular unit. The air 414 provided into the modular unit without passing through the hard disk drives in the DKU unit on the front side is blocked ahead by the shield, and thus is changed in direction toward the flow of the outside air 416. As such, the outside air 414 is mixed together with the outside air 416, and then is directed to the hard disk drives in the DKU unit on the rear side.

Figure 47:
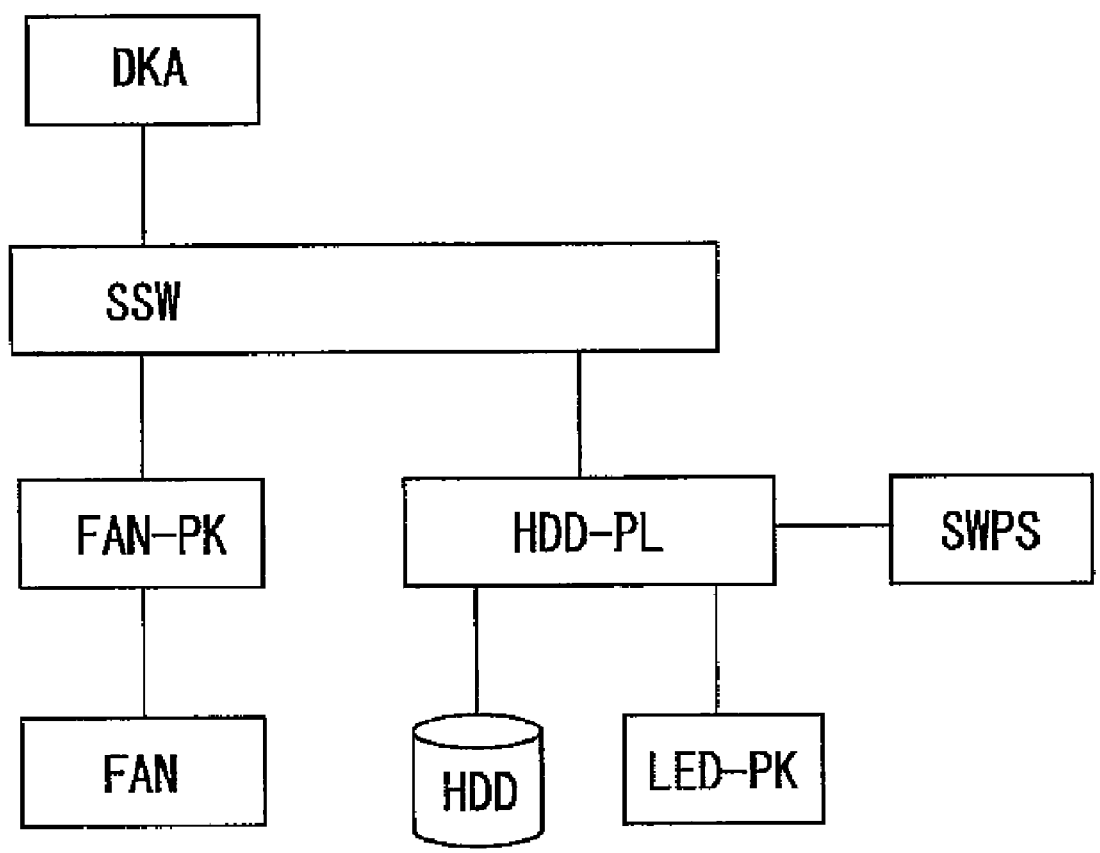
FIG. 47 is a block diagram of a control circuit for use to control the fans.

Described next is the control means and the control circuit for drive control over the fans. FIG. 47 is a block diagram thereof. The chassis is provided with two SSWs each on the right and left front sides and the right and left rear sides. One SSW is a unit configured by two fans, and performs control over the fans. Each on the right and left front sides and the right and left rear sides, a plurality of fans in two units are disposed.

As shown in FIG. 37, the DKA being a part of the DKC, and serving as an interface control section with the memory devices such as hard disk drives is connected with the SSW, and a control signal is forwarded to the SSW from the DKA. The SSW is connected with the fan package (FAN-PK), and the FAN-PK is connected to the fans (FAN). To the fans, via the fan package, a supply of power and control signal is made from the SSW. The SSW (hard disk) and the platter (HDD-PL) are connected together. The HDD-PL is connected with the power supply unit (SWPS). The power supply to the SSW is made from the SWPS via the HDD-PL.

The HDD-PL is connected with the hard disk drive and the LED package (LED-PK), and a supply of power and control signal is made from the HDD-PL to the hard disk drive and the LED package. The SSW takes charge of control over the fans, and relays and controls access between the DKA and the hard disk drive, i.e., transfer of data and commands. The power supply to the DKAs is made not by the power supply of the DKU (SWPS) but from the power supply device on the DKC side.

Figure 48:
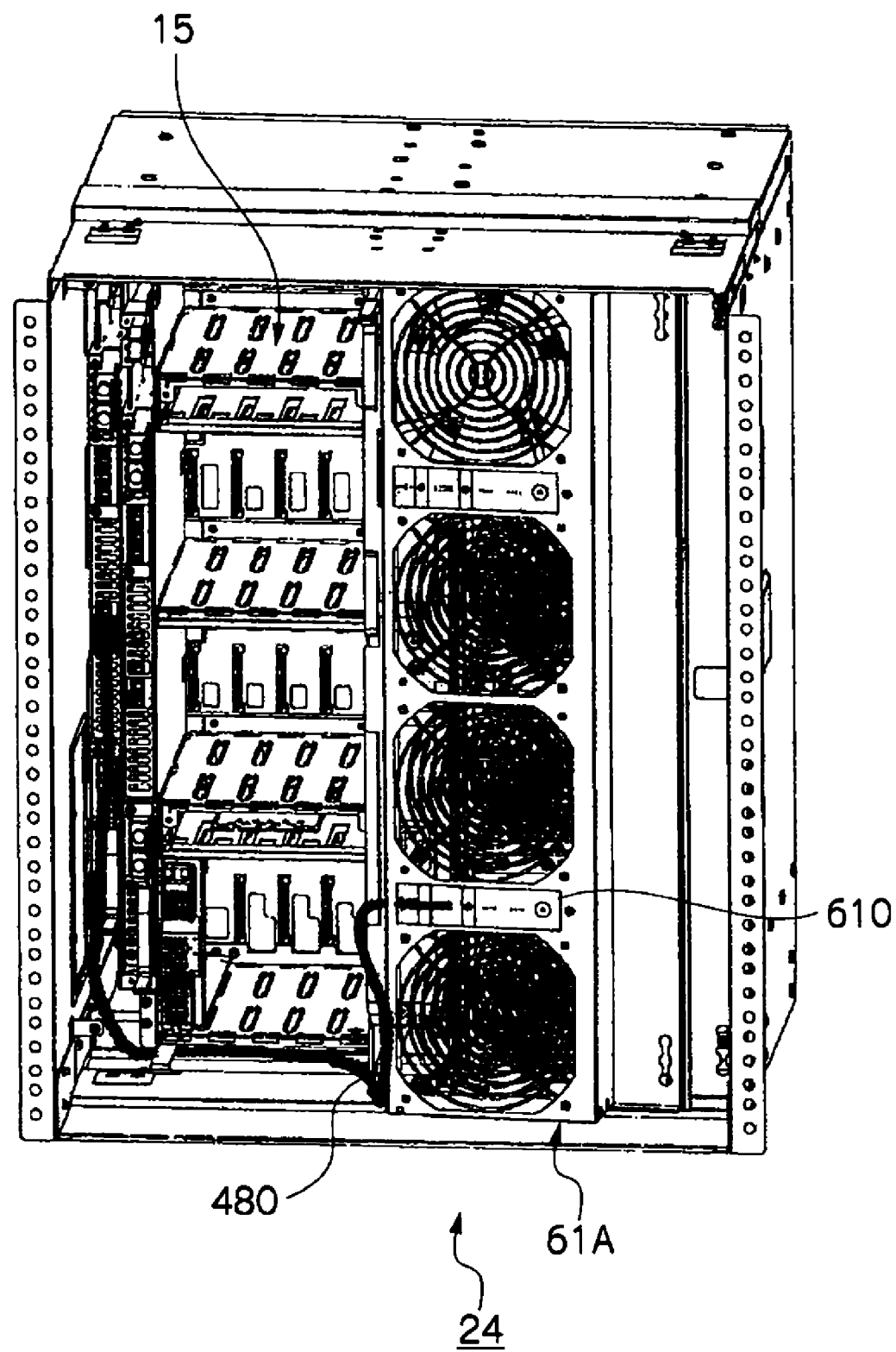
FIG. 48 is a perspective view of the modular unit for illustrating a cable to be set from an SSW to the fan package.

Note that FIG. 48 is a perspective view showing the layout of a cable in charge of exchanging a control signal and supplying a power between the SSW and the fan package. FIG. 48 is a perspective view of the modular unit 24 in which the fan unit 61A on the front left side is rotated, and the back surface of the fan unit is exposed as shown in 2 of FIG. 21 and FIG. 23. A cable 480 extended from the SSW on the front left side is moved to the lower portion of the modular unit, and the bottom surface of the modular unit is moved toward the center thereof on the front area of the hard disk drives therein. The cable is then directed to outside of the fan unit from the right side of the fan unit, and is moved upward from the outside of the fan unit to the fan package 610 on the front of the fan unit, thereby being connected to the fan package from the front. As shown in FIG. 48, the allowance in the length direction enough for the fan unit to rotate as shown in FIG. 48 is provided to the cable 480.

What is claimed is:

1. A storage device, comprising:
a general-purpose chassis including therein a space accessible from both front and rear surfaces thereof;
a first memory unit inserted into the space from the front surface of the general-purpose chassis;
a second memory unit inserted into the space from the rear surface of the general-purpose chassis;
a first cooling device disposed to face the front surface of the general-purpose chassis;
a second cooling device disposed to face the rear surface of the general-purpose chassis;
a first drive circuit that drives the first cooling device;
a second drive circuit that drives the second cooling device;
a first moving device that allows the first cooling device to move between a first position of coming close to the first memory unit and a second position of being away from the first memory unit;
a second moving device that allows the second cooling device to move between a third position of coming close to the second memory unit and a fourth position of being away from the second memory unit;
a control device that controls a cooling operation mechanism of at least either the first or second cooling device;
a first power supply unit; and
a second power supply unit,
wherein the first memory unit accommodates therein another plurality of memory devices on right and left sides of the first power supply unit, and
wherein the second memory unit accommodates therein a plurality of memory devices on right and left sides of the second power supply unit.

2. The storage device according to claim 1,
wherein the first moving device at least includes either a first mechanism that moves the first cooling device to be close to and away from the first memory unit or a second mechanism that rotates the first cooling device with respect to the first memory unit, and
wherein the second moving device at least includes either a third mechanism that moves the second cooling device to be close to and away from the second memory unit or a fourth mechanism that rotates the second cooling device with respect to the second memory unit.

3. The storage device according to claim 1,
wherein the first cooling device is disposed to be able to freely rotate with respect to the general-purpose chassis at each front right and left end of the general-purpose chassis, and
wherein the second cooling device is disposed to be able to freely rotate with respect to the general-purpose chassis at each rear right and left end of the general-purpose chassis.

4. The storage device according to claim 1,
wherein the first cooling device is disposed to be able to freely rotate with respect to the general-purpose chassis at the front center of the general-purpose chassis, and
wherein the second cooling device is disposed to be able to freely rotate with respect to the general-purpose chassis at the rear center of the general-purpose chassis.

5. The storage device according to claim 1,
wherein the first cooling device is provided along a length of the first memory unit disposed from the front surface of the general-purpose chassis, and
wherein the second cooling device is provided along a length of the second memory unit disposed from the rear surface of the general-purpose chassis.

6. The storage device according to claim 1,
wherein the first cooling device is provided with an air-intake fan that guides outside air into the general-purpose chassis, and
wherein the second cooling device is provided with an air-exhaust fan that exhausts, to outside of the general-purpose chassis, the outside air guided into the general-purpose chassis by the air-intake fan.

7. The storage device according to claim 2,
wherein the second mechanism includes:
a first shaft that supports the first cooling device to be able to freely rotate with respect to the general-purpose chassis; and
a first hinge mechanism disposed between the first shaft and the first cooling device, and
wherein the fourth mechanism includes:
a second shaft that supports the second cooling device to be able to freely rotate with respect to the general-purpose chassis; and
a second hinge mechanism disposed between the second shaft and the second cooling device.

8. The storage device according to claim 1,
wherein the first power supply unit protrudes from the plurality of memory devices of the first memory unit to a side of the first cooling device, and
wherein the second power supply unit protrudes from the plurality of memory devices of the second memory unit to a side of the second cooling device.

9. The storage device according to claim 1,
wherein an end surface of the first memory unit on a side of the rear surface of the general-purpose chassis is provided with a first backboard being connected with the plurality of memory devices and the first power supply unit, and including a power-supply pattern from the first power supply unit to the plurality of memory devices, and
wherein an end surface of the second memory unit on a side of the front surface of the general-purpose chassis is provided with a second backboard being connected with the plurality of memory devices and the second power supply unit, and including a power-supply pattern from the second power supply unit to the plurality of memory devices.

10. The storage device according to claim 9, wherein the first and second backboards are opposed to each other, and are disposed in the general-purpose chassis.

11. The storage device according to claim 6, wherein an outside-air flow path extending from the first to second cooling device includes a first flow path that passes through memory devices of the second memory unit on a side of the rear surface of the general-purpose chassis without passing through memory devices of the first memory unit on a side of the front surface of the general-purpose chassis.

12. The storage device according to claim 6, wherein an outside-air flow path extending from the first to second cooling device includes a second flow path that passes through memory devices of the second memory unit on a side of the rear surface of the general-purpose chassis with a mixture of outside air flowing over a first flow path after passing through memory devices of the first memory unit on a side of the front surface of the general-purpose chassis.

13. The storage device according to claim 1, wherein the control device includes a detection section that detects at least either a movement of the first cooling device from the first position to the second position or a movement of the second cooling device from the third position to the fourth position.

14. A storage device, comprising:
a general-purpose chassis including therein a space accessible from both front and rear surfaces thereof;
a first memory unit inserted into the space from the front surface of the general-purpose chassis;
a second memory unit inserted into the space from the rear surface of the general-purpose chassis;
a first cooling device disposed to face the front surface of the general-purpose chassis;
a second cooling device disposed to face the rear surface of the general-purpose chassis;
a first drive circuit that drives the first cooling device;
a second drive circuit that drives the second cooling device;
a first moving device that allows the first cooling device to move between a first position of coming close to the first memory unit and a second position of being away from the first memory unit;
a second moving device that allows the second cooling device to move between a third position of coming close to the second memory unit and a fourth position of being away from the second memory unit;
a control device that controls a cooling operation mechanism of at least either the first or second cooling device;
wherein the first cooling device includes a first cooling unit group configured by a plurality of cooling units opposing the first memory unit located on a side of the front surface of the general-purpose chassis,
wherein the second cooling device includes a second cooling unit group configured by another plurality of cooling units opposing the second memory unit located on a side of the rear surface of the general-purpose chassis, and
wherein the storage device includes:
a first memory that stores a correlation between the plurality of cooling units of the first cooling unit group and a plurality of memory devices of the first memory unit located on a side of the front surface of the chassis;
a second memory that stores a correlation between the plurality of cooling units of the second cooling unit group and another plurality of memory devices of the second memory unit located on a side of the rear surface of the chassis; and
a control circuit that stops, by referring to first and second memories, when closing any predetermined one of the plurality of memory devices, a cooling operation of any of the cooling units corresponding to the predetermined memory device.

15. A storage device, comprising:
a general-purpose chassis including therein a space accessible from both front and rear surfaces thereof;
a first memory unit inserted into the space from the front surface of the general-purpose chassis;
a second memory unit inserted into the space from the rear surface of the general-purpose chassis;
a first cooling device disposed to face the front surface of the general-purpose chassis;
a second cooling device disposed to face the rear surface of the general-purpose chassis;
a first drive circuit that drives the first cooling device;
a second drive circuit that drives the second cooling device;

a first moving device that allows the first cooling device to move between a first position of coming close to the first memory unit and a second position of being away from the first memory unit;

a second moving device that allows the second cooling device to move between a third position of coming close to the second memory unit and a fourth position of being away from the second memory unit;

a control device that controls a cooling operation mechanism of at least either the first or second cooling device, wherein the control device includes a detection section that detects at least either a movement of the first cooling device from the first position to the second position or a movement of the second cooling device from the third position to the fourth position, and wherein the detection section detects at least either the movement of the first or second cooling device, and when detecting a detection signal from the detection section, the control device stops the cooling operation mechanism of the movement-detected cooling device.

16. The storage device according to claim 15, wherein the control device is configured to increase a load of the cooling operation mechanism of the movement-not-detected cooling device.

* * * * *